(12) United States Patent
Inoue et al.

(10) Patent No.: US 8,718,629 B2
(45) Date of Patent: May 6, 2014

(54) INFORMATION COMMUNICATION PROCESSING DEVICE, INFORMATION COMMUNICATION TERMINAL, INFORMATION COMMUNICATION SYSTEM, FUNCTION SWITCHING METHOD AND FUNCTION SWITCHING PROGRAM

(75) Inventors: Hiroaki Inoue, Tokyo (JP); Masato Edahiro, Tokyo (JP)

(73) Assignee: NEC Corporation, Tokyo (JP)

( * ) Notice: Subject to any disclaimer, the term of this patent is extended or adjusted under 35 U.S.C. 154(b) by 652 days.

(21) Appl. No.: 12/309,423

(22) PCT Filed: Jul. 18, 2007

(86) PCT No.: PCT/JP2007/064534
§ 371 (c)(1),
(2), (4) Date: Jan. 16, 2009

(87) PCT Pub. No.: WO2008/010598
PCT Pub. Date: Jan. 24, 2008

(65) Prior Publication Data
US 2009/0247142 A1 Oct. 1, 2009

(30) Foreign Application Priority Data

Jul. 18, 2006 (JP) ................................. 2006-195192

(51) Int. Cl.
*H04B 17/00* (2006.01)
*H04M 3/00* (2006.01)
*G06F 13/00* (2006.01)
*G06F 13/28* (2006.01)
*G06F 9/46* (2006.01)

(52) U.S. Cl.
USPC ......... 455/418; 455/67.13; 711/100; 718/100

(58) Field of Classification Search
USPC ......... 711/118–120, 127–128, 130, 147–153, 711/163–164; 708/404; 455/418
See application file for complete search history.

(56) References Cited

U.S. PATENT DOCUMENTS

| | | | |
|---|---|---|---|
| 5,212,792 A | 5/1993 | Gerety et al. | |
| 6,058,164 A | 5/2000 | Ibuka et al. | |
| 6,314,501 B1* | 11/2001 | Gulick et al. | 711/153 |
| 6,507,904 B1 | 1/2003 | Ellison et al. | |
| 6,993,547 B2* | 1/2006 | Jaber | 708/404 |
| 7,225,446 B2 | 5/2007 | Whitton | |

(Continued)

FOREIGN PATENT DOCUMENTS

| | | |
|---|---|---|
| JP | 2522162 B | 5/1996 |
| JP | 2000-076087 A | 3/2000 |

(Continued)

*Primary Examiner* — Kent Chang
*Assistant Examiner* — Nathan Brittingham
(74) *Attorney, Agent, or Firm* — Foley & Lardner LLP

(57) ABSTRACT

Provided is the information communication processing device capable of executing terminal function switching control in linkage with an external communication content on one information communication processing device based on the external communication content without a problem in switching. The information communication processing device has at least one information processing device having a plurality of function environments for executing an application, and a switching control unit for switching a function environment, in which the switching control unit determines a function environment to be switched based on contents of communication with the outside of the information communication processing device and sets context of the function environment to be switched at context of a function environment being executed, thereby executing switching to the function environment to be switched.

57 Claims, 33 Drawing Sheets

(56) References Cited

U.S. PATENT DOCUMENTS

| | | | |
|---|---|---|---|
| 2002/0033488 A1* | 3/2002 | Kawashima et al. | 257/202 |
| 2002/0116436 A1* | 8/2002 | Whitton | 709/100 |
| 2002/0183051 A1* | 12/2002 | Poor et al. | 455/418 |
| 2003/0033488 A1* | 2/2003 | Gruner et al. | 711/145 |
| 2004/0088710 A1 | 5/2004 | Ronkka et al. | |
| 2004/0196265 A1* | 10/2004 | Nohr | 345/169 |
| 2005/0066208 A1 | 3/2005 | Koie et al. | |
| 2006/0057966 A1* | 3/2006 | Mise et al. | 455/67.13 |
| 2008/0288878 A1* | 11/2008 | Hayashi et al. | 715/762 |

FOREIGN PATENT DOCUMENTS

| | | |
|---|---|---|
| JP | 2000-330806 A | 11/2000 |
| JP | 2002-287985 A | 10/2002 |
| JP | 2003-229950 A | 8/2003 |
| JP | 2004-500666 A | 1/2004 |
| JP | 2004-252776 A | 9/2004 |
| JP | 2004-355309 A | 12/2004 |
| JP | 2005-099960 A | 4/2005 |
| JP | 2005-348233 A | 12/2005 |
| JP | 2006-074477 A | 3/2006 |
| JP | 2006-155285 A | 6/2006 |

* cited by examiner

1102 ACCESS ALLOWANCE DATA

|  | START POINT | END POINT | ALLOWANCE BIT |
|---|---|---|---|
| RAM | 0x32000000 | 0x32FFFFFF | R·W |
| ROM | 0x01000000 | 0x017FFFFF | R |

FIG. 20

CURRENT TERMINAL FUNCTION ENVIRONMENT NUMBER — 3001a

| |
|---|
| A |

SWITCHABLE TERMINAL FUNCTION ENVIRONMENT — 3001b

| TERMINAL FUNCTION ENVIRONMENT | EXISTENCE/NON-EXISTENCE |
|---|---|
| A | EXISTENCE |
| B | EXISTENCE |
| C | NON-EXISTENCE |

SET DATA TO COMMUNICATION INTERPRETATION UNIT (TABLE OF CORRESPONDENCE BETWEEN TERMINAL FUNCTION ENVIRONMENT AND COMMUNICATION DEVICE) — 3001c

| TERMINAL FUNCTION ENVIRONMENT | COMMUNICATION DEVICE |
|---|---|
| A | 2 |
| B | 1 |
| C | — |

SET DATA TO RESOURCE SEPARATION UNIT — 3001d

| |
|---|
| TERMINAL FUNCTION ENVIRONMENT A: ADDRESS CONVERSION DATA, ACCESS ALLOWANCE DATA |
| TERMINAL FUNCTION ENVIRONMENT B: ADDRESS CONVERSION DATA, ACCESS ALLOWANCE DATA |
| TERMINAL FUNCTION ENVIRONMENT C: |

CONTEXT OF TERMINAL FUNCTION ENVIRONMENT — 3001e

| |
|---|
| TERMINAL FUNCTION ENVIRONMENT A: REGISTER VALUE, FF STATE, MEMORY CONTENTS ETC. |
| TERMINAL FUNCTION ENVIRONMENT B: REGISTER VALUE, FF STATE, MEMORY CONTENTS ETC. |
| TERMINAL FUNCTION ENVIRONMENT C: |

INFORMATION COMMUNICATION PROCESSING DEVICE, INFORMATION COMMUNICATION TERMINAL, INFORMATION COMMUNICATION SYSTEM, FUNCTION SWITCHING METHOD AND FUNCTION SWITCHING PROGRAM

TECHNICAL FIELD

The present invention relates to an information communication processing device and, more particularly, an information communication processing device, an information communication terminal, an information communication system, a function switching method and a function switching program which enable a plurality of processing and functions to be switched.

BACKGROUND ART

It was a common practice in an information communication terminal such as a cellular phone or PDA to have a group of processing necessary for realizing functions of the information communication terminal (e.g. a telephone incoming call function, an electronic mail transmission/reception function, a browsing function in Internet access and a multimedia function whose representative is camera or music) incorporated into the information communication terminal together with an operating system (called "OS"). Therefore, the information communication terminal and terminal functions (programs) which can be executed by the information communication terminal are so strongly correlated that when a user of the terminal uses a plurality of terminal functions, he/she needs to own a plurality of information communication terminals.

FIG. 57 is a diagram schematically showing one example of arrangement formed by a plurality of information communication terminals capable of executing a plurality of terminal functions. Shown in FIG. 57 is the example formed of two information communication terminals 10000A and 10000B.

In such arrangement, a terminal user is assumed to hold the plurality of information communication terminals 10000A and 10000B all the time and execute a terminal function he/she wants to use from an individual terminal (10000A or 10000B).

Under these circumstances, various systems are proposed which enable a single information communication terminal to execute a plurality of terminals functions. In the following, outlines will be shown with respect to several typical examples.

FIG. 58 is a diagram showing one typical example of a structure for statically switching a terminal function in order to execute a plurality of terminal functions. Shown in FIG. 58 is the example of a structure using two ROM in which terminal functions (programs) for switching are written.

In such a structure, an information communication terminal 10000 comprises an ROM entry necessary for start-up. In an ROM 20000A, a terminal function environment 60A is written and in an ROM 20000B, a terminal function environment 60B is written.

Assume here that a certain terminal user executes the terminal function environment 60A on the information communication terminal 10000. The terminal user once turns off power of the information communication terminal 10000. Then, insert the ROM 20000A in which the terminal function environment 60A he/she wants to use is written into the information communication terminal. Thereafter, by supplying power to re-start, the terminal function environment 60A stored in the inserted ROM is read into the information communication terminal 10000 and executed.

Thus, in such a structure as shown in the above-described FIG. 58, insertion of the ROM enables one information communication terminal to use a plurality of terminal functions.

The ROM system shown in FIG. 58, however, has the following shortcomings.

In the ROM system shown in FIG. 58, switching of a terminal function is manual switching realized by replacing an ROM through cut-off of power and re-start.

Moreover, the ROM system shown in FIG. 58 fails to cope with an external communication request such as a call or mail to a terminal function not inserted into the information communication terminal 10000.

As a technique for coping with such a request is the system using a plurality of telephone numbers as recited in Patent Literature 1. Disclosed in Patent Literature 1 is a system, with a plurality of external memories in which terminal functions (programs) for switching are written, which allows one cellular phone to make a call by switching a telephone number according to an occasion of use similarly to the structure shown in FIG. 58 (see Patent Literature 1). Described in Patent Literature 1 is that with held telephone numbers registered in a relay device, the system has a unit for transferring, when a call to other telephone number (telephone number in sleep) arrives than a telephone number selected as being in operation after switching, the telephone call to the telephone number in operation, thereby allowing a telephone call to arrive at its own telephone number as of before switching.

In the system recited in Patent Literature 1, however, for switching a telephone number in operation to a telephone number in sleep in practice, it is necessary to replace an external memory by one corresponding to each telephone number. The system recited in Patent Literature 1 accordingly has a problem that operation of an information communication terminal should be stopped such as cut-off of power or re-start in switching operation.

Next, FIG. 59 is a diagram showing one typical example of a structure for executing a plurality of terminal functions. In the example shown in FIG. 59, the structure has a switching control software 40 for switching two terminal function applications 50A and 50B in software which are incorporated into one information communication terminal, which is provided on a CPU 10, an OS 20 and a middle ware 30 which provides processing necessary for a terminal function application.

In such a structure, the terminal function applications 50A and 50B operate on the CPU 10, the OS 20 and the middle ware 30.

Assume here that a certain terminal user switches the terminal function application 50A being currently executed to another terminal function application 50B. At this time, instruct the switching control software 40 to execute switching to the terminal function application 50B. Upon receiving the instruction, the switching control software 40 uses the OS 20 and the middle ware 30 to stop operation of the terminal function application 50A being currently executed. Then, similarly using the OS 20 and the middle ware 30, resume the operation of the terminal function application 50B to be executed.

Thus, the system shown in FIG. 59 enables high-speed switching by realization of switching control in software. The terminal user is allowed to dynamically switch a terminal function by instructing the switching control software 40 about a terminal function (50A or 50B) to be used.

The system shown in FIG. 59, however, has the following problems.

More specifically, the system shown in FIG. 59 is not allowed to use other functions than a group of terminal functions adapted to the OS 20 or the middle ware 30 mounted on the information communication terminal. The reason is that shown in FIG. 59 is the system in which the OS 20 and the middle ware 30 originally incorporated into the information communication terminal are shared by a plurality of terminal functions, so that the plurality of terminal functions are executed on the OS 20 or the middle ware 30. As a result, in the system shown in FIG. 59, because when the OS 20 or the middle ware 30 incorporates a terminal function set up on a different execution environment, an extremely large number of software implanting steps are required to limit execution of terminal functions, thereby disabling terminal functions to be freely incorporated according to external environments or the like.

Moreover, even in a case where a terminal function meeting the above-described limitation is implanted, the system shown in FIG. 59 might be largely affected when the implanted terminal function has verification omission. More specifically, since the OS 20 and the middle ware 30 are shared by a plurality of terminal functions in the system shown in FIG. 59, when the terminal function application 50B develops a fault, switching by an instruction from the switching control software 40 fails to operate or even if switching is made, damages to data necessary for the terminal function application 50A by the fault might cause the operation of the terminal function application 50A to have a problem.

Other shortcoming of the system shown in FIG. 59 is that, when a terminal function to be used is realized by closed software, it is impossible to make a combination itself of relevant terminal functions and impossible to cope with such an external communication request as a call or mail to the terminal function application 50 not in operation.

Further, disclosed is a telephone set having two modes, an automatic telephone message recording function and a simple pager function in advance whose mode shifts according to an incoming call and key operation similarly to the structure shown in FIG. 59 (see Patent Literature 2). In the structure recited in Patent Literature 2, the automatic telephone message recording function is automatically started upon detection of an incoming call when an extremely small volume is set. However, since both the functions are executed on the same execution environment in advance, the system has the same problem as that described above that a terminal function not adapted to an execution environments mounted cannot be incorporated to limit a terminal function to be incorporated.

On the other hand, also known is a system which has execution environments corresponding to a plurality of terminal function applications and switches them, not using the same execution environment for the plurality of terminal functions as is described above. This system has, for example, such a structure as shown in FIG. 60 which is called a virtualization technique in the field of a personal computer.

In such a structure, a CPU 11 has a hypervisor mode 13 other than a common user supervisor mode 12. The terminal function environment 60A having the terminal function application 50A operating on an OS 20A and a middle ware 30A and the terminal function environment 60B having the terminal function application 50B operating on an OS 20B and a middle ware 30B execute switching operation on the user supervisor mode 12. In such a structure, the OS 20A may be Linux (registered trademark), the OS 30B may be Symbian OS (registered trademark), different kinds of OS, for example.

A switching control software 41 executed on the hypervisor mode 13 separates an address space required by the terminal function environment 60A and an address space required by the terminal function environment 60B by controlling a memory management unit 14 at the time of switching. The memory management unit 14 is capable of preventing the user supervisor mode 12 from referring to a memory region used by the hypervisor mode 13.

Then, the switching control software 41 has a function of preserving and re-setting a data class necessary for terminal function environments, that is, context such as a register value or control information in a CPU.

Shift from the user supervisor mode 12 to the hypervisor mode 13 in the CPU 11 is realized by execution of a special switching instruction in the OS 20. In other words, the OS 20A and the OS 20B give an instruction to the switching control software 41 on switching by using the above-described instruction.

Here, description will be made of a manner of switching from the terminal function environment 60A to the terminal function environment 60B. An application executed in the terminal function environment 60A requests the OS 20A for switching to the terminal environment 60B. The requested OS 20A issues the above-described special instruction for switching to call up the switching control software 41 operating on the hypervisor mode 13. The called switching control software 41 preserves the context of the terminal function environment 60A being currently executed. Then, by re-setting the context of the terminal function environment 60B already preserved, the terminal function environment 60B starts operation.

Thus, such a structure as shown in FIG. 60 enables not only dynamic switching control by software but also execution of switching to a terminal environment whose OS is different.

The system using a virtualization technique shown in FIG. 60, however, fails to show switching of a terminal function in linkage with an external communication content.

Description will be made of the above point. The system shown in FIG. 60 is recited, for example, in Patent Literature 3 and Patent Literature 4.

Recited in Patent Literature 3 is a processor with a separation region provided in a system memory, which has a normal execution mode and a separation execution mode. The normal execution mode recited in Patent Literature 3 is equivalent to the user supervisor mode in FIG. 60 and the separation execution mode is equivalent to the hypervisor mode in FIG. 60. In Patent Literature 3, switching between the normal execution mode and the separation execution mode is neither executed by a processor which executes switching upon receiving an external request nor executed taking contents of communication of the processor with other processor, for example, into consideration.

Patent Literature 4 discloses a structure comprising a real machine and a plurality of terminal devices to switch and execute a plurality of operating systems through a virtual machine monitor. In the system recited in Patent Literature 4, the plurality of operating systems are shared by the plurality of terminal devices with a terminal control unit arranged in an address space shared therebetween. In Patent Literature 4, switching of the plurality of operating systems is executed upon reception of a message transmission/reception requesting task or a message transmission/reception request from the plurality of the operating systems by the terminal control unit. This system, however, fails to execute switching control according to an individual content of each request. This system, therefore, has no such manner of controlling switching with priority assigned to each request or controlling switching timing.

As described in the foregoing, the system shown in FIG. 60 and the systems recited in Patent Literature 3 and Patent Literature 4 are incapable, when while switching to one terminal function is executed in response to one request, other request is made to other terminal function as of before switching, of accepting other request because no switching control is executed based on contents of external communication.

In a case, for example, where such system as described above is applied to a portable information terminal which communicates with other portable information terminal through telephone or the like without any modification, when while switching from one terminal function of the portable information terminal to other terminal function is executed, an incoming call is made to one terminal function as of before switching, the system is incapable of coping with such a case, so that the incoming call is not allowed to arrive. Therefore, in a case of telephone answering whose emergency is particularly higher than that of external communication such as the Internet, it is impossible to apply switching execution by the above-described system without modification.

Accordingly, the related systems including the above-described examples take none of switching in linkage with an external communication device into consideration and fail to cope with problems occurring when accepting an external communication request such as a call or mail to a terminal function application not in operation.

Moreover, since the related systems are incapable of switching in linkage with a communication device, switching of execution environments is constantly required on a minute time basis, resulting in having extremely large power consumption.

Patent Literature 1: Japanese Patent Laying-Open No. 2005-348233.
Patent Literature 2: Japanese Patent Laying-Open No. 2003-229950.
Patent Literature 3: Japanese Translation of PCT International Application No. 2004-500666.
Patent Literature 4: Japanese Patent No. 2522162.

As described above, it is impossible for an information communication terminal capable of executing a plurality of terminal functions on one physical terminal to incorporate mounted terminal functions freely without limitation and to execute terminal function switching operation taking contents of external communication into consideration.

With the systems (architecture) shown in FIG. 59 and FIG. 60, in particular, it is impossible to prevent interference between terminal functions when developing a fault, which denotes that free combination of terminal functions is substantially impossible. In this term, availability of functions is limited.

Similarly, the above-described systems are capable of copying with a communication request from outside only by spontaneous switching by a terminal user, which denotes that instant reception of an important notification is substantially impossible. In this term, availability of communication is limited.

On the other hand, as ubiquitous society arrives, demanded are an information communication processing device, an information communication terminal and an information communication system enabling one information communication terminal to freely combine and switch terminal functions for each network such as a telephone network, the Internet and an in-house network according to a notification from the network or an external environment without owning a plurality of information communication terminals.

THE OBJECT OF THE INVENTION

An object of the present invention is to provide an information communication processing device and an information processing terminal in which one information communication device has a plurality of terminal functions to execute switching control of these terminal functions in linkage with contents of external communication and execute switching based on contents of external communication without any problem.

Another object of the present invention is to provide an information communication terminal, an information communication system, a function switching method and a function switching program which enable an information communication processing device to realize free posterior incorporation of terminal functions.

SUMMARY

According to an exemplary aspect of the invention, an information communication processing device including at least one information processing device having a plurality of function environments for executing an application, and a switching control unit for switching the function environment, wherein the switching control unit determines a function environment to be switched based on contents of communication with the outside of the information communication processing device, and sets context of the function environment to be switched at context of a function environment being executed to execute switching to the function environment to be switched.

The present invention enables an information communication processing device having a plurality of functions to execute a function without being affected by contents of external communication and switch a function environment according to the communication contents in linkage with the communication contents.

The reason is that a switching control unit for switching a function environment determines a function environment to be switched according to communication contents from outside the information communication processing device and after preserving and setting necessary context, switches a function environment.

BRIEF DESCRIPTION OF THE DRAWINGS

FIG. 20 is a diagram showing a structure of switching control data according to the first exemplary embodiment;

EXEMPLARY EMBODIMENT

Best mode for implementing the present invention will be described.

Figure 1:
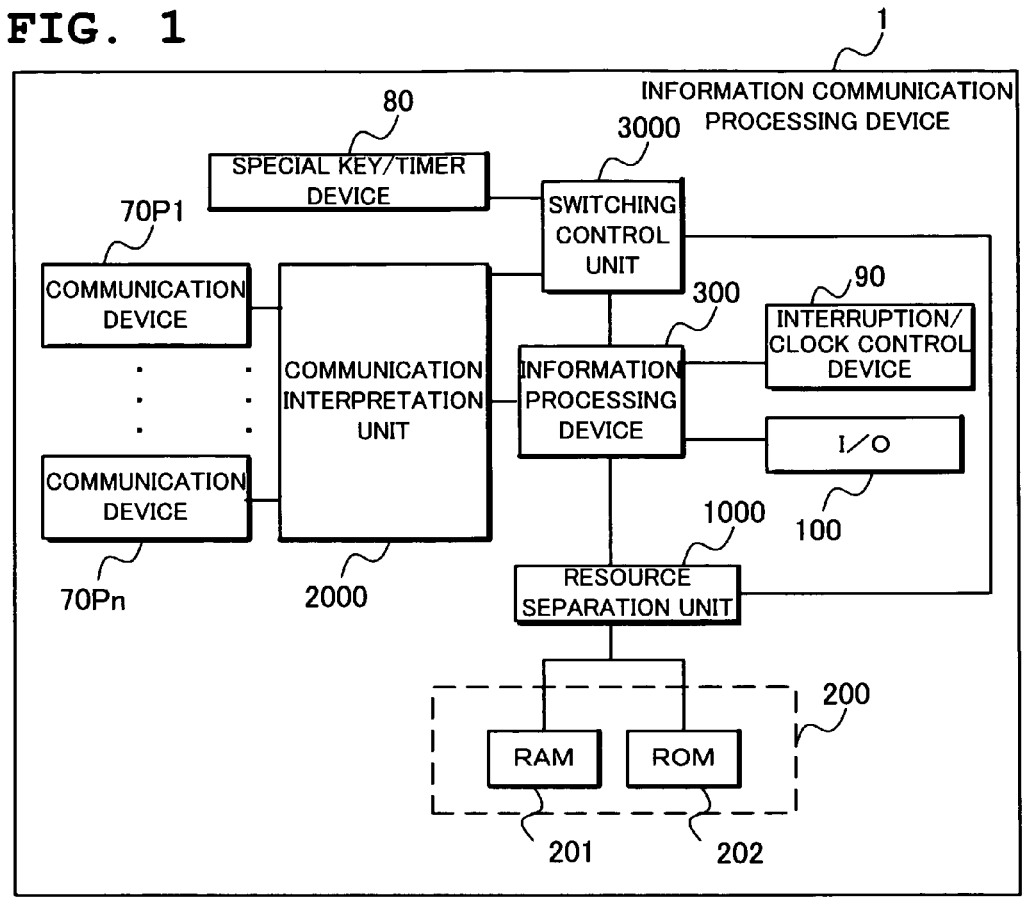
FIG. 1 is a diagram showing a structure of an information communication processing device according to a first exemplary embodiment of the present invention.

According to a preferred exemplary embodiment, with reference to FIG. 1, the present invention comprises as an information communication processing device, in addition to an information processing device 300, a communication device 70, a memory 200, an input/output device 100 and an interruption/clock control device 90, a resource separation unit 1000 for avoiding collision of memory resources shared by a terminal function (program) executable in the information communication processing device, a communication interpretation unit 2000 for recognizing an external communication request and a switching control unit 3000 for switching a terminal function according to a switching request.

Figure 36:
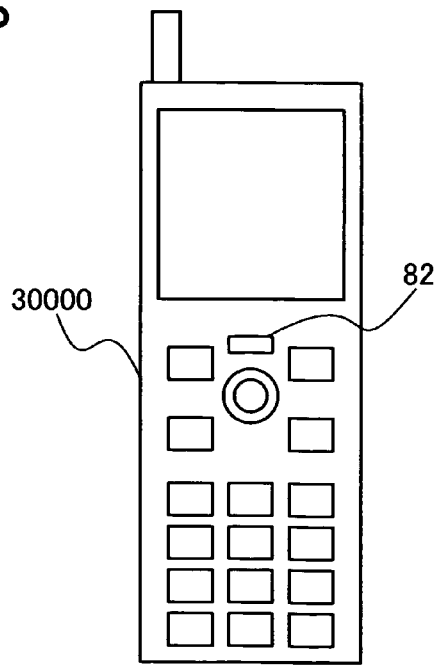
FIG. 36 is a diagram showing a structure of an information communication terminal according to a fifth exemplary embodiment of the present invention.

In addition, with reference to FIG. 36, provided as an information communication terminal in one exemplary embodiment of the present invention are a special key for spontaneous switching by a terminal user and the information communication processing device and as a result, a plurality of terminal functions can be freely combined and switched for execution afterwards according to a notification from various networks and external environments.

Figure 40:
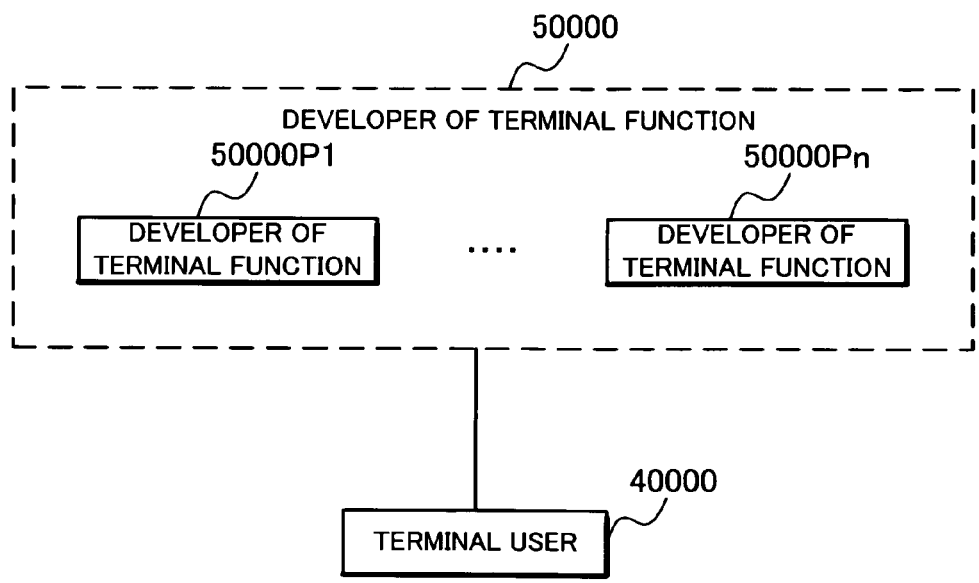
FIG. 40 is a diagram showing a structure of an information communication system according to a ninth exemplary embodiment of the present invention.

Furthermore, with reference to FIG. 40, provided as an information communication system in one exemplary embodiment of the present invention are a developer of a terminal function which provides a plurality of terminal functions and a terminal user who owns the information communication terminal. As a result, the terminal user is allowed to freely combine the plurality of terminal functions and switch the same for execution afterwards according to a notification from various networks and external environments.

The communication interpretation unit 2000 interprets a communication request from the group of communication devices and notifies the switching control unit 3000 of which communication request is made. Notified, for example, is such a request as call arrival from a communication device 70P1 or mail reception from a communication device 70P2. It is apparently possible to notify not only different communication requests but also communication requests of the same kind (receiving calls or received mails).

External communication here is assumed to include communication in general with other information communication processing device than the information communication processing device in question, an information communication terminal or the like, and include signal transmission/reception to/from a communication device or a communication terminal, incoming/outgoing telephone calls, the Internet and mail transmission/reception.

"Execution environment" denotes an application execution environment formed of OS and middle ware and "function environment" denotes an execution environment with an application included in the above-described execution environment. "Function" denotes a generic name of a function for a user which is obtained by execution of its function environment.

In the following, description will be made with respect to respective exemplary embodiments.

First Exemplary Embodiment

FIG. 1 is a diagram showing a structure of an information communication processing device according to a first exemplary embodiment of the present invention. With reference to FIG. 1, an information communication processing device 1 according to the present exemplary embodiment comprises the information processing device 300 operable under program-control, the interruption/clock control device 90 for executing interruption/clock control, the input/output device (I/O) 100, the resource separation unit 1000 for controlling the memory 200 such as an RAM 201 and an ROM 202, the communication interpretation unit 2000 for interpreting a communication request from the group of communication devices 70P1-70Pn which communicate with the outside, a dedicated special key/timer device 80, and the switching control unit 3000 for executing switching control of a terminal function (program) to be executed on the information communication processing device 1 in linkage with the resource separation unit 1000 and the communication interpretation unit 2000.

In the present exemplary embodiment, the information processing device 300, the interruption/clock control device 90, the input/output device 100, the memory 200 formed of the RAM 201 and the ROM 202, the group of communication devices 70P1-Pn and the special key/timer device 80 may have not only an individual package structure but also a circuit structure in an SoC (System-on-Chip), an SiP (System-in-Package) structure in another chip and a structure combining them.

In addition, the resource separation unit 1000, the communication interpretation unit 2000 and the switching control unit 3000 may be realized not only in a hardware structure but also in a software structure and as a program executed on the information processing device 300, or the like.

According to the present exemplary embodiment, a plurality of different terminal functions are executed on the same information processing device 300. Moreover, each terminal function uses in common the same interruption/clock control device 90 and input/output device 100. When meeting a cost condition, a plurality of information processing devices, interruption/clock control devices and input/output devices may be provided corresponding to the respective terminal functions as a matter of course.

According to the present exemplary embodiment, the memory 200 formed of the RAM 201 and the ROM 202 is shared by a plurality of terminal functions executed on the information processing device 300. Such problem as collision of physical addresses caused by this sharing is solved by the resource separation unit 1000. When meeting a cost condition, a multi-chip structure or a multi-bank structure according to the respective terminal functions may be adopted.

In the present exemplary embodiment, for simultaneously recognizing a plurality of external communication requests, the groups of communication devices 70P1-70Pn necessary for network connection are provided individually. Different communication devices may be provided corresponding to, for example, a communication standard such as GSM or PDC equivalent to the 2.5th generation, a communication standard such as W-CDMA or CDMA2000 equivalent to the third-generation or a communication standard such as a local-area wireless network (LAN) or UWB (Ultra Wide Band). Since there exists at present a chip having all the communication standards such as 802.11a/b/g, necessary communication device groups can be integrated as a matter of course. Alternatively, the communication device group can be replaced by the use of such a technique as software wireless. In any case, the communication device group can be realized in any form as long as it is a structure enabling simultaneous recognition of a plurality of external communication requests.

The communication interpretation unit 2000 interprets a communication request from the group of communication devices 70P1-70Pn to notify the switching control unit 3000 of what kind of communication request is made. The communication interpretation unit 2000 notifies the switching control unit 3000 of, for example, such a request as telephone call arrival from the communication device 70P1 or mail reception from the communication device 70P2. The communication interpretation unit 2000 can notify the switching control unit 3000 of not only different communication requests but also such a request as a communication request of the same kind (receiving telephone calls or received mails).

In the present exemplary embodiment, the special key/timer device 80 is used for instructing on such spontaneous switching by a terminal user as input by a special key such as a jog dial newly attached to the information communication terminal, or as a timer which starts a terminal function at a certain designated time. Based on an instruction in question input to the special key/timer device 80, a terminal function to be executed next by the switching control unit 3000 is determined. When no spontaneous switching instruction by a terminal user is required, it may be omitted.

According to the present exemplary embodiment, the switching control unit 3000 determines a terminal function to be executed next based on a notification from the special key/timer device 80 or the communication interpretation unit 2000 to switch the terminal function based on the determination. The switching control unit 3000 also changes setting to one appropriate for a terminal function to be newly executed in linkage with the resource separation unit 1000 and the communication interpretation unit 2000 on the way to switching.

Figure 2:
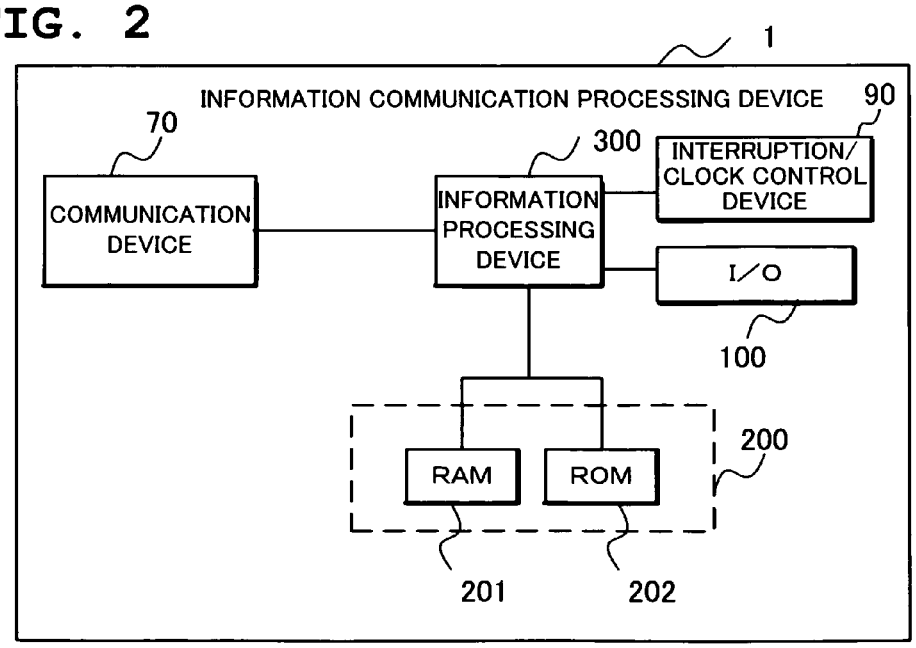
FIG. 2 is a diagram showing a structure seen from a terminal function executed in the first exemplary embodiment.

In other words, according to the present exemplary embodiment, since such units as the resource separation unit 1000, the communication interpretation unit 2000 and the switching control unit 3000 are provided independently of the information processing device 300, a terminal function environment is allowed to operate without taking its switching into consideration as shown in FIG. 2.

FIG. 2 is a diagram showing one example of a structure seen from a terminal function executed in the present exemplary embodiment shown in FIG. 1. With reference to FIG. 2, recognized by a terminal function to be executed are the information processing device 300, the interruption/clock control device 90, the input/output device 100, the memory 200 such as the RAM 201 and the ROM 202, and the communication device 70.

Among them, the RAM 201 and the ROM 202 represent not a total amount of memory that can be supplied but an amount of memory assigned to each terminal function. For example, even when the RAM 201 has 64 MB and the ROM 202 has 32 MB, the RAM 201 is recognized as having 16 MB and the ROM 202 as having 8 MB according to their assigned amounts. As the communication device 70, an optimum one communication device is selected from among the group of communication devices 70P1-70Pn in FIG. 1.

Figure 3:
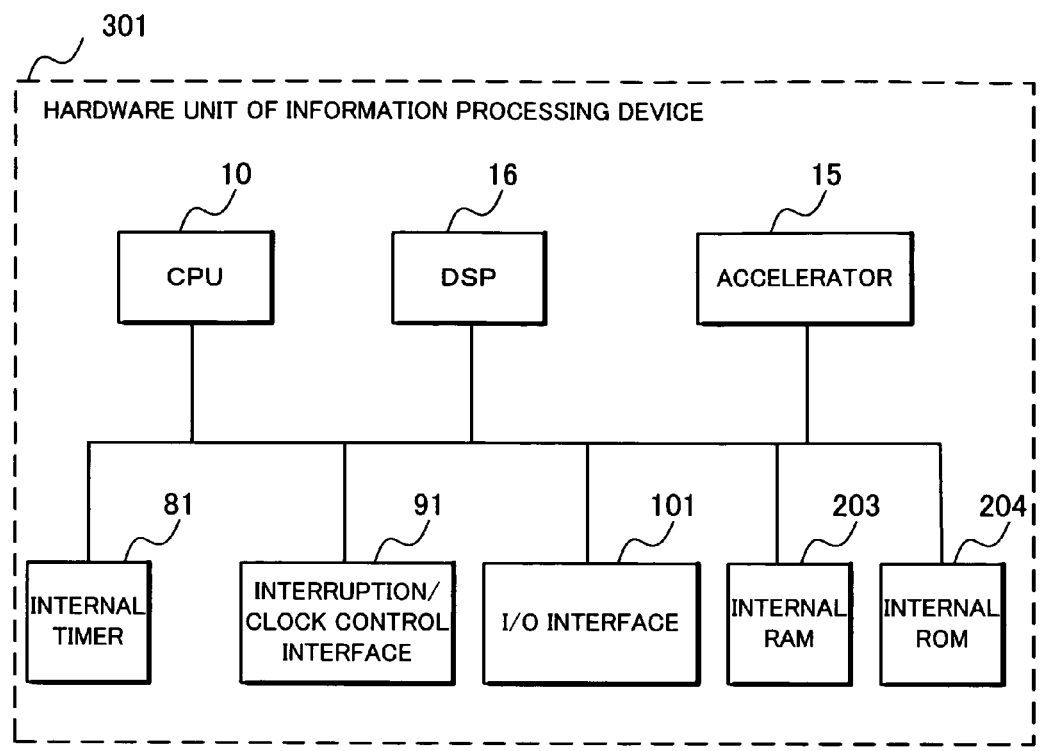
FIG. 3 is a diagram showing a structure of a hardware unit of an information processing device according to the first exemplary embodiment.

FIG. 3 is a diagram showing one example of a hardware structure of the information processing device 300 in the present exemplary embodiment. With reference to FIG. 3, a hardware unit 301 of the information processing device 300 comprises the CPU 10, an accelerator 15, a DSP (Digital Signal Processor) 16, an internal timer 81, an interruption/clock control interface 91, an input/output device interface 101, an internal RAM 203 and an internal ROM 204. The CPU 10, the accelerator 15 and the DSP 16 here may be provided in plural. In addition, components unnecessary for the hardware unit 301 to execute a portable terminal function may be omitted. In other words, FIG. 3 shows a structure of a hardware platform in the execution of a portable terminal function.

Figure 60:
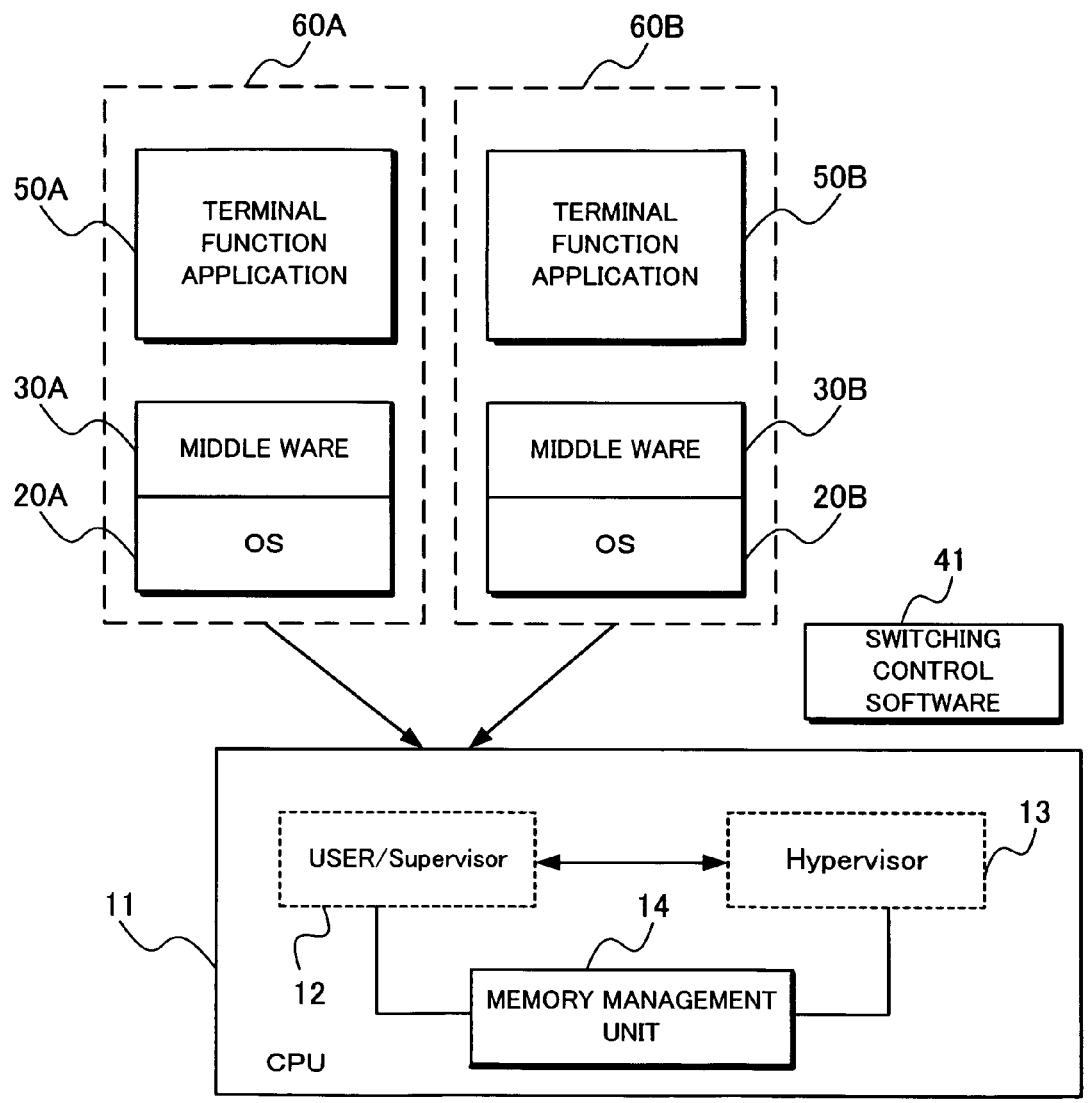
FIG. 60 is a diagram showing one example of a system structure according to related art.

According to the present exemplary embodiment, the CPU 10 may assume such a structure with a hypervisor mode as shown in FIG. 60. Alternatively, it may have a multiple architecture state which enables execution of a plurality of threads.

Figure 4:
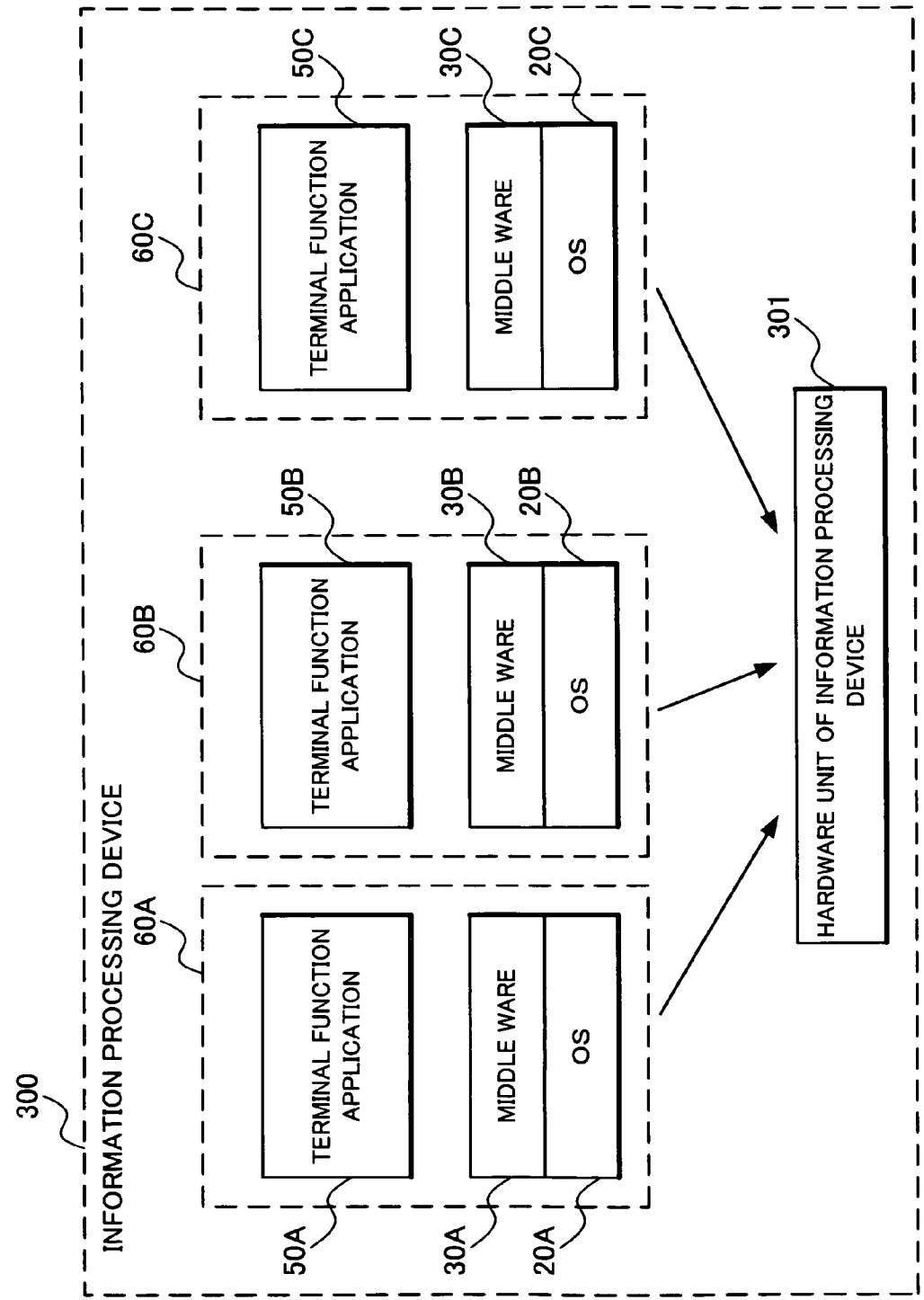
FIG. 4 is a diagram showing a structure of the information processing device according to the first exemplary embodiment.

FIG. 4 is a diagram showing one example of a structure of the information processing device 300 according to the present exemplary embodiment. With reference to FIG. 4, the information processing device 300 comprises the terminal function environment 60A formed of an OS (Operating System) 20A, a middle ware 30A and a terminal function application 50A, the terminal function environment 60B formed of an OS 20B, a middle ware 30B and a terminal function application 50B, and a terminal function environment 60C formed of an OS 20C, a middle ware 30C and a terminal function application 50C. The OS 20, the middle ware 30, the terminal function application 50 and the terminal function environment 60 here may be provided in plural.

According to the present embodiment, the plurality of terminal function environments 60 are each switched and executed on the information processing device 300. When the information communication processing device 1 comprises a plurality of information processing devices 300, the plurality of terminal function environments may be assigned to independent information processing devices, respectively, or switched for execution while sharing the information processing device.

In addition, according to the present exemplary embodiment, when the CPU 10 on the hardware unit 301 of the information processing device 300 in FIG. 3 has a hypervisor mode, an individual terminal function environment may be operated on each mode or a plurality of terminal function environments may be operated on a user supervisor mode by virtualization software on the hypervisor mode.

Figure 5:
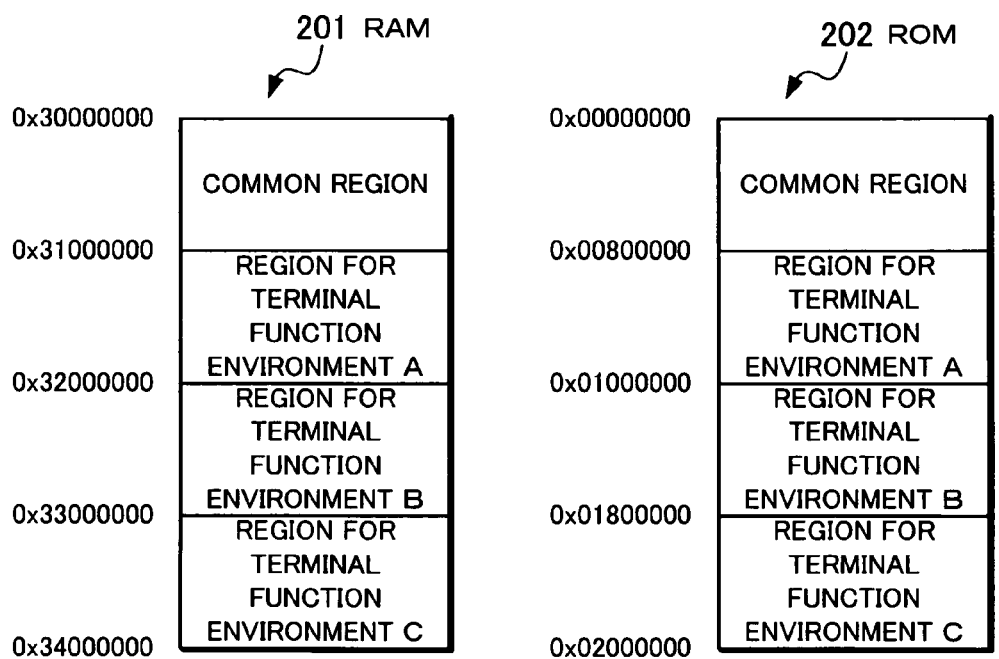
FIG. 5 is a diagram showing a structure of a memory according to the first exemplary embodiment.

FIG. 5 is a diagram showing one example of a structure of a memory in the present exemplary embodiment. With reference to FIG. 5, the RAM 201 is formed of 64 MB from a start address 0x30000000 to an end address 0x33FFFFFF and the ROM 202 is formed of 32 MB from a start address 0x00000000 to an end address 0x01FFFFFF. The RAM 202 and the ROM 202 each comprise a common region which can be used by the resource separation unit 1000, the communication interpretation unit 2000 and the switching control unit 3000 as required and three regions for a plurality of terminal function environments as a target of switching (a region for a terminal function environment A, a region for a terminal function environment B and a region for a terminal function environment C). Each region is assigned as RAM 16 MB and ROM 8 MB. An RAM region used by the terminal function environment B has 16 MB from 0x32000000 to 0x33FFFFFF and a ROM region has 8 MB from 0x01000000 to 0x01FFFFFF. It is apparent that a maximum amount of memory or a distribution address of the RAM 201 and the ROM 202, and a maximum amount of memory or a distribution address to be assigned to the common region and the regions for the terminal function environments can be arbitrarily determined.

Figure 6:
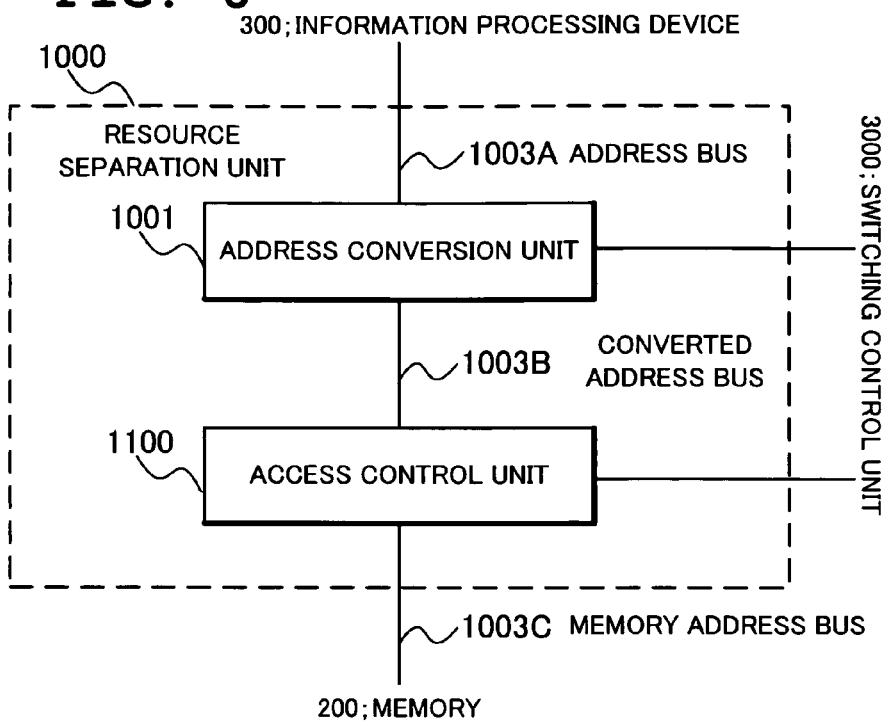
FIG. 6 is a diagram showing a structure of a resource separation unit according to the first exemplary embodiment.

FIG. 6 is a diagram showing one example of a structure of the resource separation unit in the present exemplary embodiment. The resource separation unit 1000 prevents different terminal functions from referring to the same region in the shared resources (e.g. memory) and prevents different terminal functions from referring to other regions from each other.

With reference to FIG. 6, the resource separation unit 1000 comprises an address conversion unit 1001 which connects to the information processing device 300 through an address bus 1003A and connects to an access control unit 1100 through a converted address bus 1003B, and the access control unit 1100 which connects to the address conversion unit 1001 through the converted address bus 1003B and connects to the memory 200 (including the RAM 201 and the ROM 202 in FIG. 1) through a memory address bus 1003C. The address conversion unit 1001 and the access control unit 1100 are also connected to the switching control unit 3000 to operate based on an instruction of the switching control unit 3000. In the following, the word "access" is assumed to denote "read from the memory 200" or "write to the memory 200". Also assume that to the memory address bus 1003C, a signal related to an ordinary access such as an access command or a kind of access is attached.

The address conversion unit 1001 converts an access address to the memory 200 which is received from the address bus 1003A into an access address to a region in the memory 200 assigned to a terminal function being currently executed. Then, the converted access address is output through the converted address bus 1003B. An address, for example, for accessing 0x00000000 in the ROM 202 output to the address bus 1003A during execution of the terminal function environment B is converted into an address of 0x01000000 in the ROM 202 according to such assignment as shown in FIG. 5. As a result, even when address spaces used by a plurality of terminal functions overlap with each other, collision in a real memory region can be avoided.

The access control unit 1100 determines whether an access address to the memory 200 being converted which is received from the converted address bus 1003B is accessible or not according to a terminal function environment being currently executed. If the determination result is non-allowance, access to the address is processed as an error. On the other hand, when the determination result is allowance, output the access address received from the converted address bus 1003B to the memory address bus 1003C without modification. With reference to FIG. 5, in a case, for example, where an address to the ROM 202 to which the terminal function environment B being currently executed accesses is converted into 0x01800000, the access control unit 1100 processes the access as an error because the address obtained after conversion is to a memory region assigned to the terminal function environment C. On the other hand, when the address to the memory region is 0x01000000, the access control unit 1100 outputs the access address as of after conversion to the memory 200 because the converted address is to a memory region assigned to the terminal function environment B. As a result, interference can be prevented to such a resource as the shared memory 200 among a plurality of terminal function environments.

Figure 7:
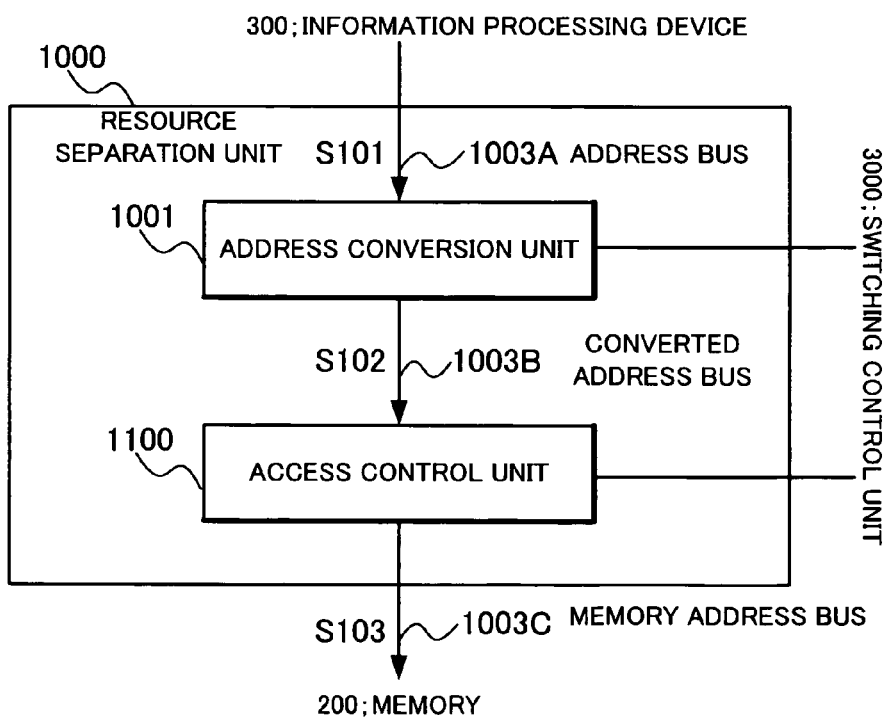
FIG. 7 is a diagram for use in explaining operation of the resource separation unit according to the first exemplary embodiment.

FIG. 7 is a diagram for use in explaining one example of operation of the resource separation unit 1000 shown in FIG. 6. In FIG. 7, a code formed of S and numerals beside an arrow represents a step number.

Step S101: First, the information processing device 300 outputs an address to the address bus 1003A for accessing the memory 200.

Step S102: When receiving the access address to the memory 200 from the address bus 1003A, the address conversion unit 1001 receives information about a terminal function environment being currently executed from the switching control unit 3000 to convert the access address according to the received information. Then, output the converted access address to the converted address bus 1003B.

Step S103: The access control unit 1100 determines whether the converted access address to the memory 200 which is received from the converted address bus 1003B is accessible or not according to the terminal function environment being currently executed which is received from the switching control unit 3000. If the determination result is non-allowance, execute error processing. On the other hand, when the determination result is allowance, output the converted access address to the memory address bus 1003C.

Figure 8:
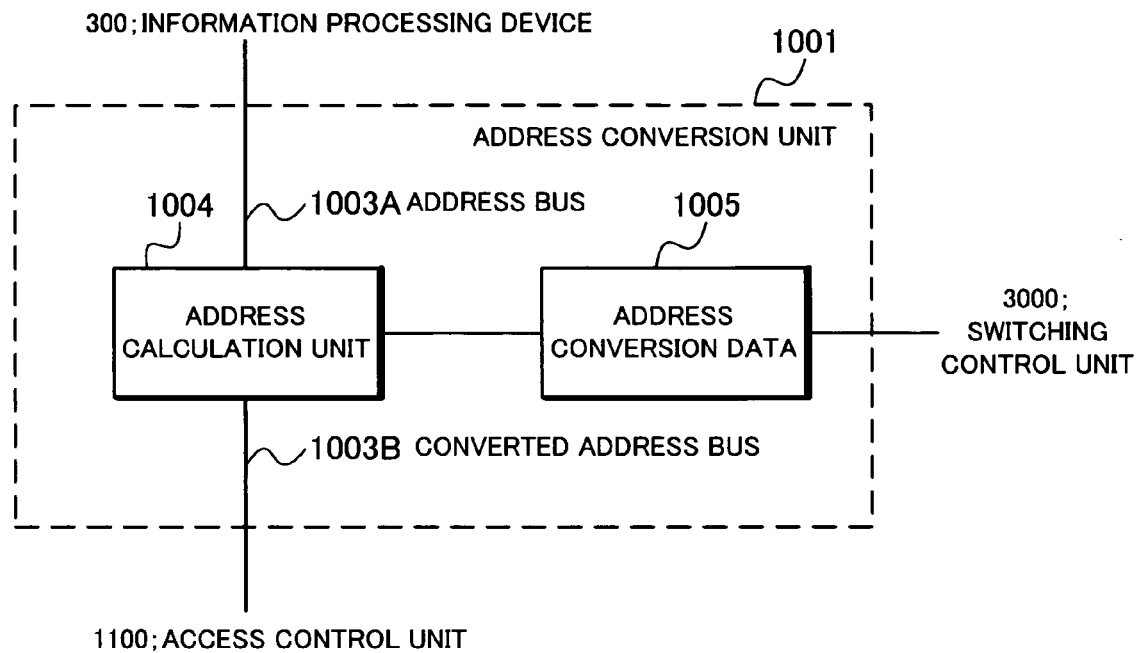
FIG. 8 is a diagram showing a structure of an address conversion unit according to the first exemplary embodiment.

FIG. 8 is a diagram showing one example of a structure of the address conversion unit according to the present exemplary embodiment. With reference to FIG. 8, the address conversion unit 1001 comprises an address calculation unit 1004 connected to the information processing device 300 through the address bus 1003A and to the access control unit 1100 through the converted address bus 1003B, and address conversion data 1005 connected to the address conversion unit 1001 and the switching control unit 3000.

The address calculation unit 1004 refers to the address conversion data 1005 to convert an access address received from the address bus 1003A.

In the present exemplary embodiment, as the address calculation unit 1004, not only a simple arithmetic circuit such as an adder but also such an address conversion device used in a common CPU as an MMU (Memory Management Unit) may be adopted.

The address conversion data 1005 assumes a data structure such as a simple offset value or a page table according to the structure of the address calculation unit 1004. Such data structure is updated by an instruction by the switching control unit 3000.

Figure 9:
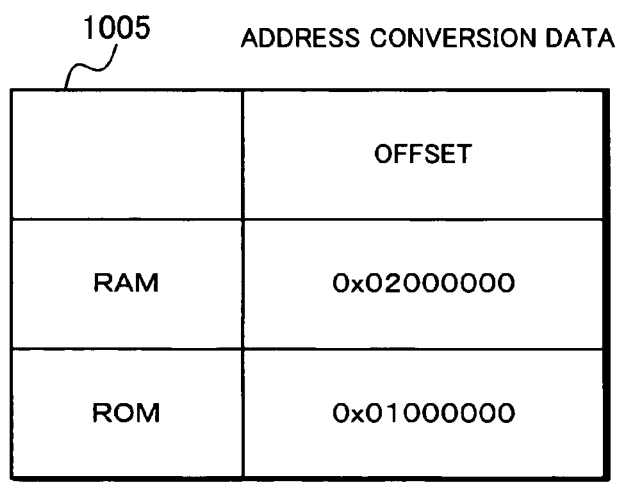
FIG. 9 is a diagram showing a structure of address conversion data according to the first exemplary embodiment.

FIG. 9 is a diagram showing one example of a structure of the address conversion data 1005 in the present exemplary embodiment. With reference to FIG. 9, the address conversion data 1005 shows data contents obtained in a case where with the address calculation unit 1004 as an adder, the information communication processing device 1 executes the terminal function environment B shown in FIG. 5. More specifically, represented is that such offset values are added as 0x02000000 to an access address to the RAM 201 and 0x01000000 to an access address to the ROM 202. Not only data related to a terminal function environment being currently executed but also data of a plurality of terminal function environments may be held and appropriately switched.

Figure 10:
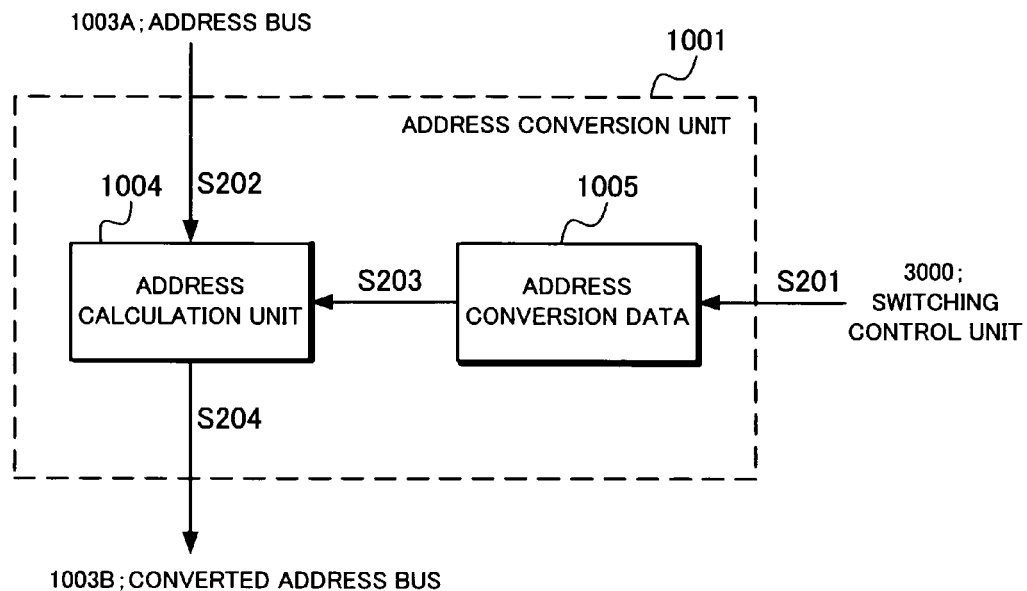
FIG. 10 is a diagram for use in explaining operation of the address conversion unit according to the first exemplary embodiment.

FIG. 10 is a diagram for use in explaining one example of operation of the address conversion unit 1001 shown in FIG. 8. In FIG. 10, a code formed of S and numerals beside an arrow denotes a step number.

Step S201: The address conversion data 1005 is updated by the switching control unit 3000 for a terminal function environment to be executed next.

Step S202: The address calculation unit 1004 obtains an access address from the address bus 1003A.

Step S203: The address calculation unit 1004 refers to the address conversion data 1005 to convert the access address into one for the terminal function environment in question.

Step S204: The address calculation unit 1004 outputs the converted access address to the converted address bus 1003B.

Figure 11:
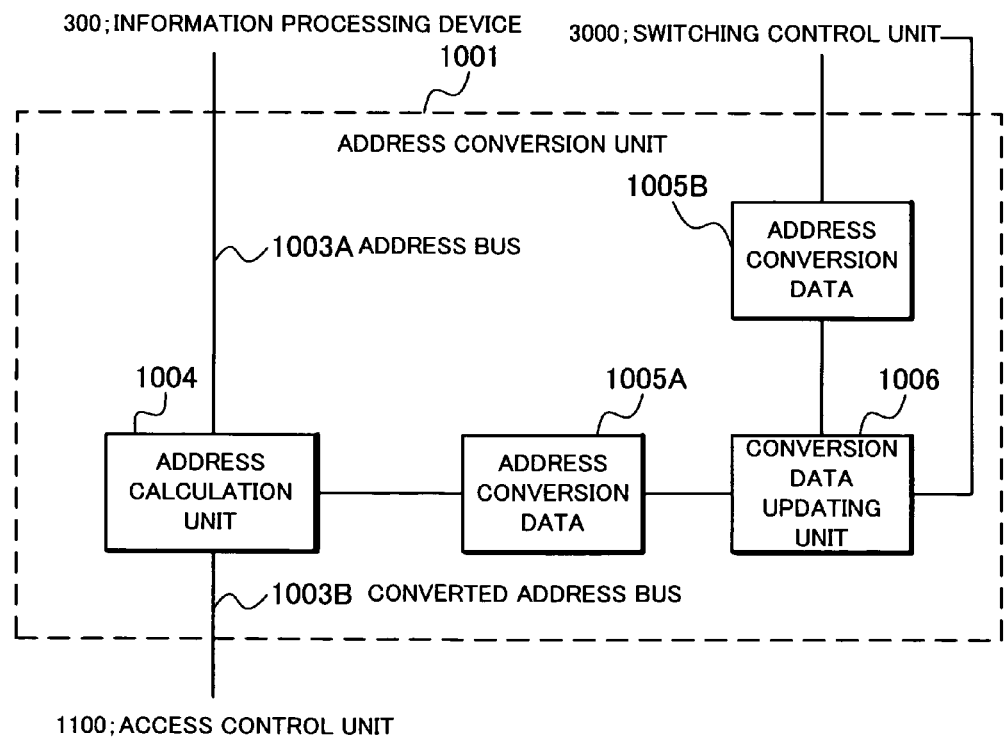
FIG. 11 is a diagram showing a modification example of a structure of the address conversion unit according to the first exemplary embodiment.

FIG. 11 is a diagram showing one example of a modification example of a structure of the address conversion unit in the present exemplary embodiment. With reference to FIG. 11, the address conversion unit 1001 comprises, in addition to the components shown in FIG. 8, a conversion data updating unit 1006, address conversion data 1005A in place of the address conversion data 1005 and additional address conversion data 1005B.

The conversion data updating unit 1006 atomically updates the address conversion data 1005B set in advance by the switching control unit 3000 to the address conversion data 1005A similarly according to an instruction from the switching control unit 3000. As a result, preparation of the address conversion data 1005B in advance by the switching control unit 3000 enables higher speed switching to be realized than that by the structure in FIG. 8.

Figures 12, 13:
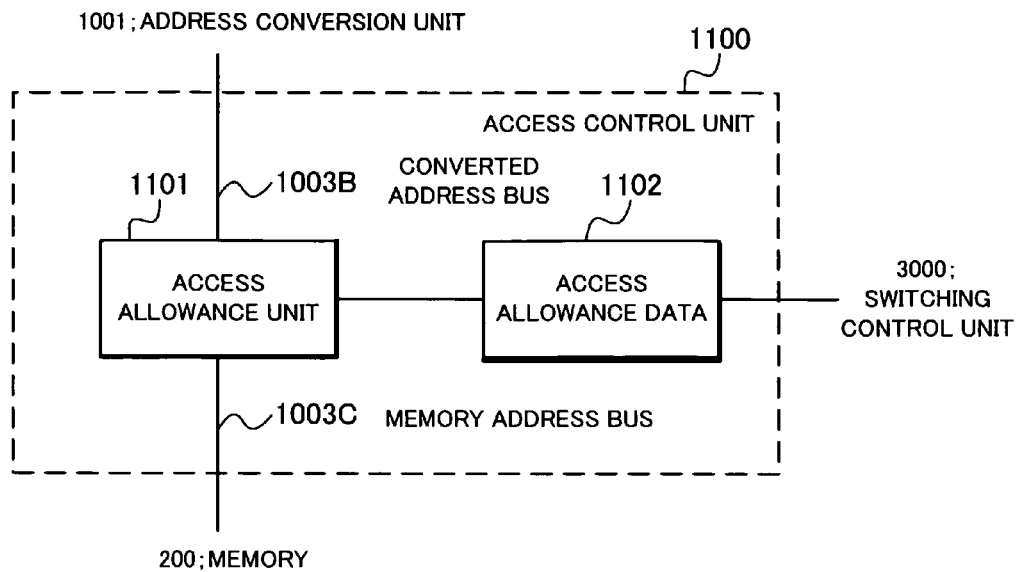
FIG. 12 is a diagram showing a structure of an access control unit according to the first exemplary embodiment.
FIG. 13 is a diagram showing a structure of access allowance data according to the first exemplary embodiment.

FIG. 12 is a diagram showing one example of a structure of the access control unit in the present exemplary embodiment. With reference to FIG. 12, the access control unit 1100 comprises an access allowance unit 1101 which connects to the address conversion unit 1001 through the converted address bus 1003B and to the memory 200 through the memory address bus 1003C, and access allowance data 1102 which connects to the access allowance unit 1101 and the switching control unit 3000. The access allowance data 1102 is updated by an instruction from the switching control unit 3000.

With respect to an address received from the converted address bus 1003B, the access allowance unit 1101 refers to information of the access allowance data 1102 based on a kind of access to determine whether the access is appropriate or not. When the determination results in finding the access not to be allowed, the access allowance unit 1101 executes error processing without outputting the access address to the memory address bus 1003C. On the other hand, when the determination results in finding the access to be allowed, the access allowance unit 1101 outputs the address received from the converted address bus 1003B to the memory address bus 1003C.

FIG. 13 is a diagram showing one example of a structure of access allowance data in the present exemplary embodiment. With reference to FIG. 13, with respect to the access allowance data 1102, a start address and an end address of a range in which access is allowed and a kind of access allowed (read only (R), write only (W) and read/write (R/W)) are stored in a table format for the RAM 201 and the ROM 202. Since the example shown in FIG. 13 assumes execution of the terminal function environment B in FIG. 5, write/read from 0x32000000 to 0x32FFFFFF is allowed for the RAM 201 and read from 0x01000000 to 0x017FFFFF is allowed for the ROM 202. The other accesses are not allowed.

According to the present exemplary embodiment, as to the access allowance data 1102, not holding data related to a terminal function environment being currently executed, only table data totaling a plurality of terminal function environments may be held or a plurality of pieces of table data of each terminal function environment may be held and switched.

Figure 14:
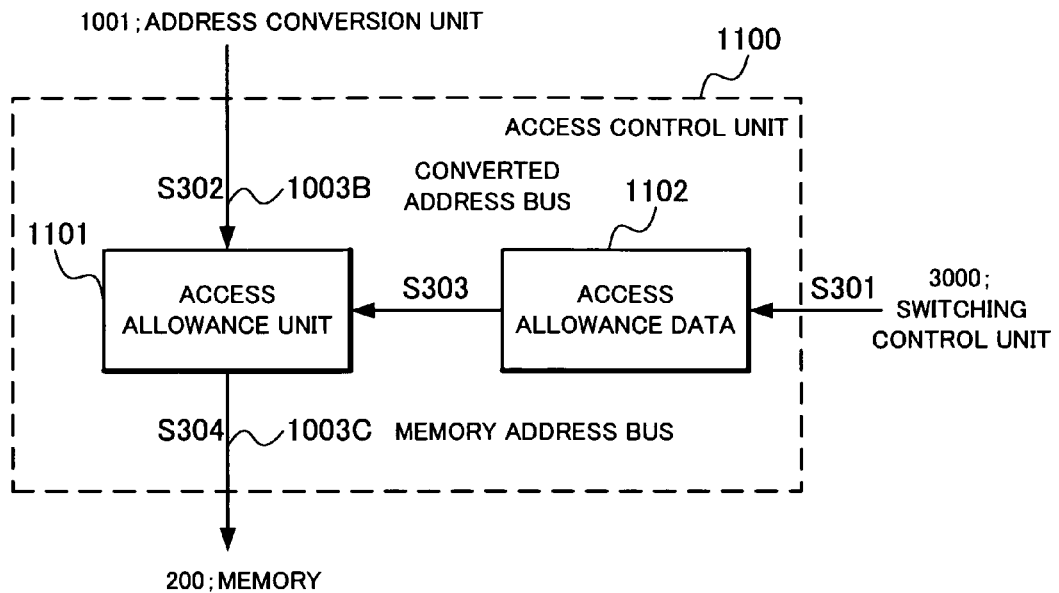
FIG. 14 is a diagram for use in explaining operation of the access control unit according to the first exemplary embodiment.

FIG. 14 is a diagram for use in explaining one example of operation of the access control unit 1100 in FIG. 12. In FIG. 14, a code formed of S and numerals beside an arrow represents a step number.

Step S301: The access allowance data 1102 is updated by the switching control unit 3000 for a terminal function environment to be executed next.

Step S302: The access allowance unit 1101 obtains an access address from the converted address bus 1003B.

Step S303: The access allowance unit 1101 refers to the access allowance data 1102 to determine whether the access address is accessible or not.

Step S304: The access allowance unit 1101 executes error processing when the determination result finds non-allowance. On the other hand, when the determination result finds allowance, output a converted access address to the memory address bus 1003C.

Figure 15:
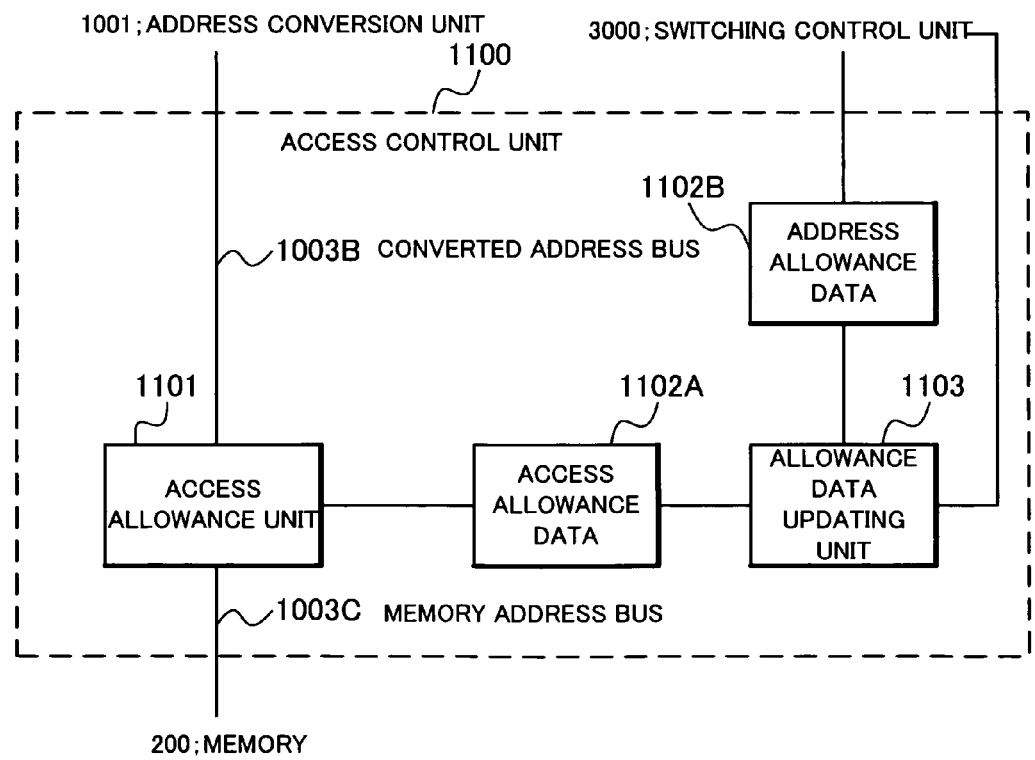
FIG. 15 is a diagram showing a modification example of a structure of the access control unit according to the first exemplary embodiment.

FIG. 15 is a diagram showing one example of a modification example of a structure of the access control unit according to the present exemplary embodiment. With reference to FIG. 15, the access control unit 1100 comprises, in addition to the components shown in FIG. 12, an allowance data updating unit 1103, access allowance data 1102A in place of the access allowance data 1102 and additional access allowance data 1102B.

The allowance data updating unit 1103 atomically updates the access allowance data 1102B set in advance by the switching control unit 3000 to the access allowance data 1102A similarly according to an instruction from the switching control unit 3000. As a result, preparation of the access allowance data 1102B in advance by the switching control unit 3000 enables higher speed switching to be realized than that by the structure shown in FIG. 12.

Although in the present exemplary embodiment, the description has been made of the example where as a structure of the access control unit 1100, the access allowance unit 1101 and the access allowance data 1102 are provided to execute access control based on access allowance information, the present invention is not limited to such a structure and in place of access allowance data, an access refusal unit and access refusal data whose logic is inverted may be provided. In this case, the access refusal unit controls to refuse an access when an access address output from the address conversion unit 1001 meets an address range of access refusal data in which access refusal is defined.

Figure 16:
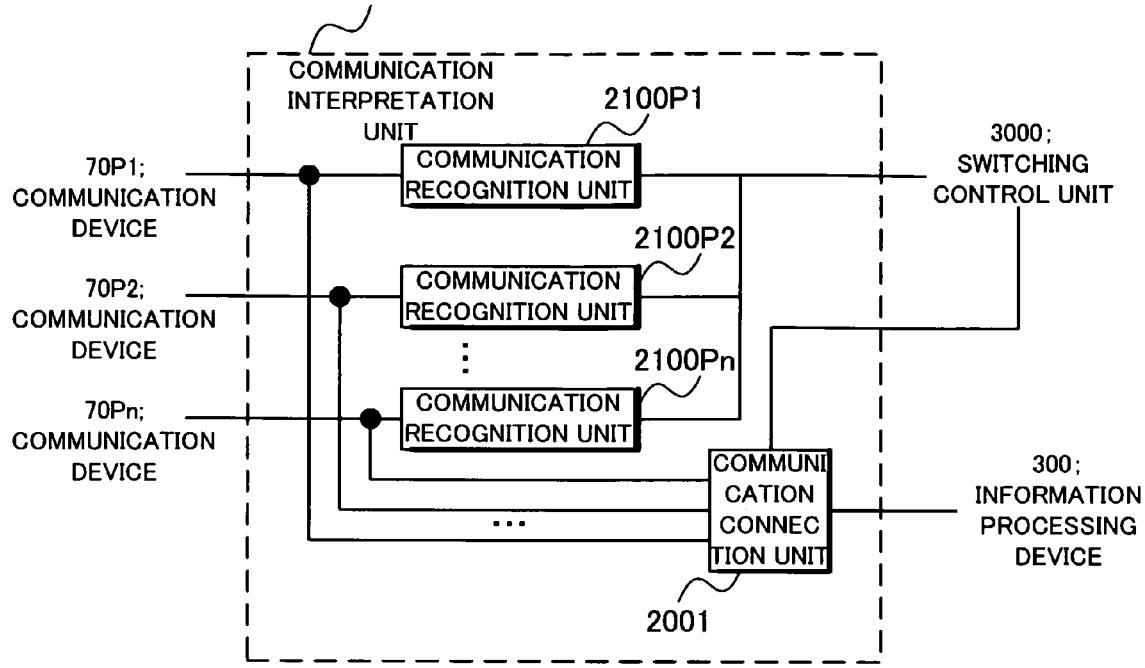
FIG. 16 is a diagram showing a structure of a communication interpretation unit according to the first exemplary embodiment.

FIG. 16 is a diagram showing one example of a structure of the communication interpretation unit according to the present exemplary embodiment. With reference to FIG. 16, the communication interpretation unit 2000 comprises communication recognition units 2100P1-Pn which connect to the communication devices 70P1 through 70Pn, respectively, and to the switching control unit 3000, and a communication connection unit 2001 which connects to the communication devices 70P1-Pn, the switching control unit 3000 and the information processing device 300.

The communication recognition unit 2100Pk ($i \leq k \leq n$) monitors a communication request from its corresponding communication device 70Pk all the time. While the communication recognition unit 2100Pk processes a simple communication request by itself, when receiving a communication request which cannot be processed by itself, e.g. when receiving an incoming telephone call or mail, the unit notifies the switching control unit 3000 of control information such as a request content and a requesting source communication device number (70Pk). This arrangement enables the information communication processing device 1 to constantly cope with an external communication request.

The communication connection unit 2001 receives a communication device number (70Pk) corresponding to a terminal function environment to be executed next at the information processing device 300 from the switching control unit 3000 and accordingly connects the information processing device 300 and the communication device 70 corresponding to the communication device number. As a result, a communication device formed of a plurality of communication devices in practice seems to be one communication device from the information processing device 300. As a communication device, even for a device whose communication standard is unified or a programmable device such as software wireless, it is easy to have a structure of a communication connection unit adapted to the same.

Figure 17:
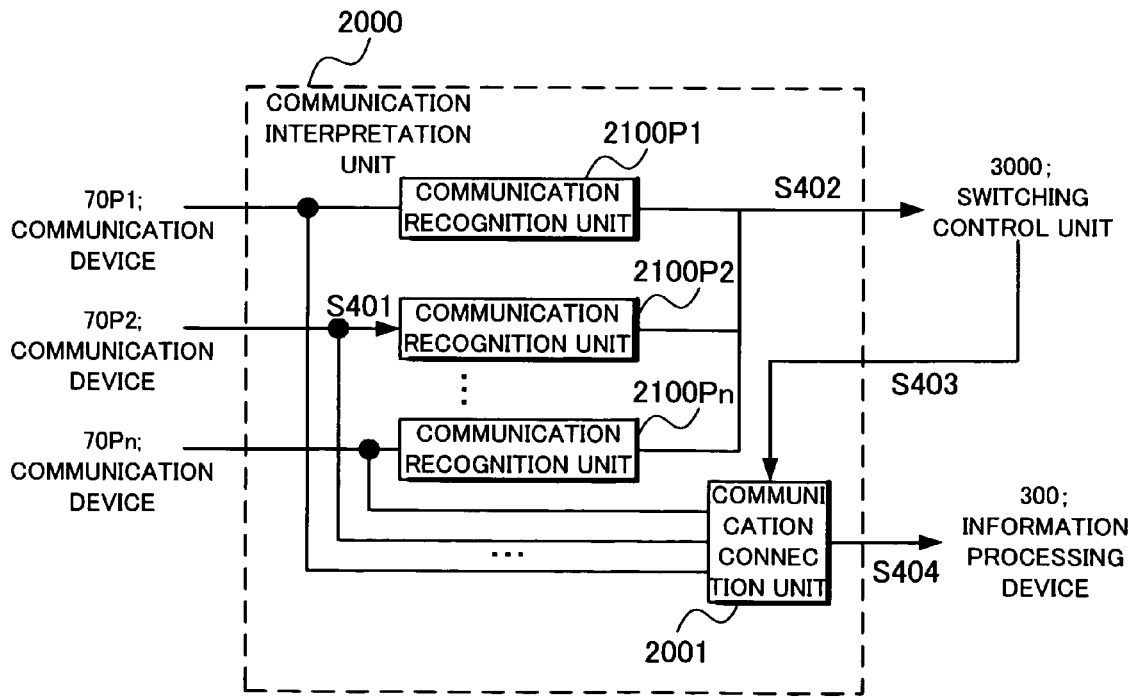
FIG. 17 is a diagram for use in explaining operation of the communication interpretation unit according to the first exemplary embodiment.

FIG. 17 is a diagram for use in explaining one example of operation of the communication interpretation unit 2000 shown in FIG. 16. In FIG. 17, a code formed of S and numerals beside an arrow represents a step number.

Step S401: The communication recognition unit 2100Pk corresponding to the communication device 70Pk having received an external communication request is notified of the external communication request by the communication device 70Pk.

Step S402: When the communication request has the contents to be processed by the information processing device 300, the communication recognition unit 2100Pk notifies the switching control unit 3000 of information that a requesting source device is the communication device 70Pk and of the communication contents (telephone call, mail or the like). When the communication request fails to have the contents to be processed by the information processing device 300, the communication recognition unit 2100Pk processes the communication request from the communication device 70Pk according to predetermined protocol.

Step S403: The communication connection unit 2001 is notified, by the switching control unit 3000, of a communication device number corresponding to a terminal function environment to be executed next. Assume here that the communication connection unit 2001 is notified of the communication device 70Pk.

Step S404: The communication connection unit 2001 connects the communication processing device 300 and the communication device 70Pk according to the communication device number.

According to the present exemplary embodiment, when protocol processing of the communication device and the information processing device 300 are extremely complicated, the communication connection unit 2001 may be internally provided with some buffers to hold a communication request until switching processing is completed.

Figure 18:
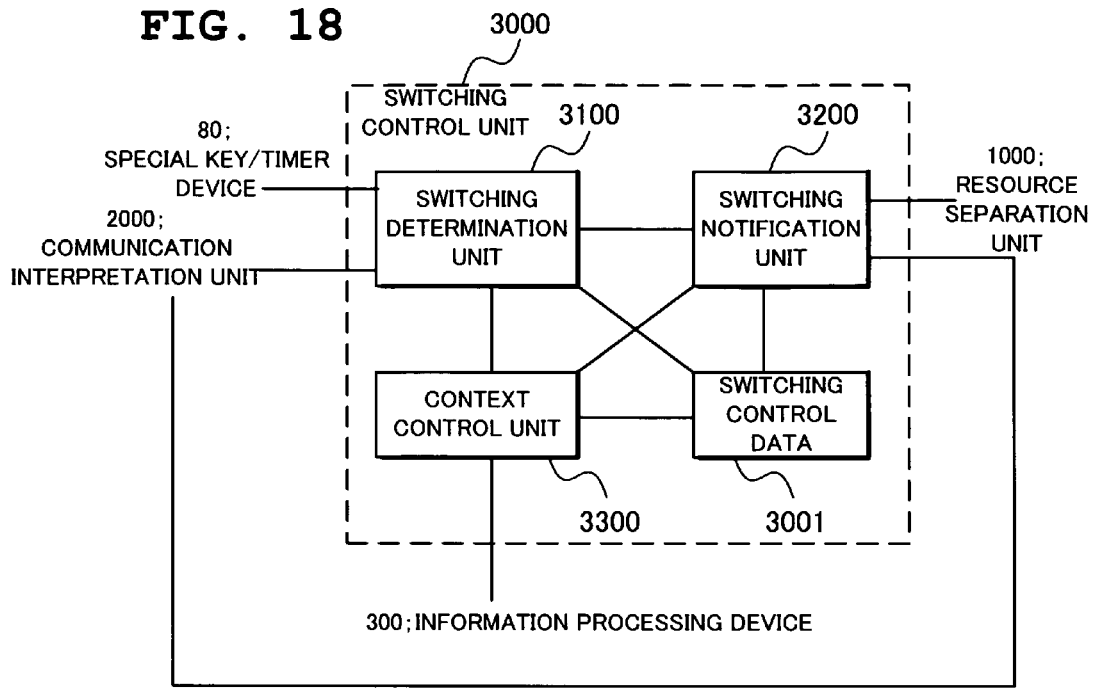
FIG. 18 is a diagram showing a structure of a switching control unit according to the first exemplary embodiment.

FIG. 18 is a diagram showing one example of a structure of the switching control unit according to the present exemplary embodiment. With reference to FIG. 18, the switching control unit 3000 comprises switching control data 3001, a switching determination unit 3100 for receiving a request from the special key/timer device 80 and the communication interpretation unit 2000, a switching notification unit 3200 for notifying the resource separation unit 1000 and the communication interpretation unit 2000 of switching, and a context control unit 3300 for preserving/re-setting context of the information processing device 300.

Context of the information processing device 300 here represents state data being currently used by the information processing device 300 for operation such as all the register values or a control register value of the CPU 10, the DSP 16 and the accelerator 15 shown in FIG. 3, or a value of an internal memory, or set values of various kinds of interfaces. On the other hand, context of a terminal function environment represents data used by the terminal function environment among contexts of the information processing device 300. It is apparent that both contexts may be the same depending on a structure of the information processing device 300.

The switching control data 3001 is a data class necessary for switching control which is used by the switching determination unit 3100, the switching notification unit 3200 and the context control unit 3300. It is formed of such data as a number of a terminal function environment being currently executed, a switchable terminal function environment, a connection relationship between a terminal function environment and the communication device 70Pk, address conversion data and access allowance data for each terminal function environment and context of each terminal function environment. For coping with sudden power cut-off, relevant data may be stored in a non-volatile memory. Alternatively, data may be stored in an externally attached non-volatile memory.

The switching determination unit 3100 determines a terminal function environment to be executed next based on a switching request from the special key/timer device 80 and the communication interpretation unit 2000 according to attendant information held in the switching control data 3001 such as information about a terminal function environment being currently executed and a list of switchable terminal function environments. Then, notify the switching notification unit 3200 and the context control unit 3300 of the number of the terminal function environment to be executed next. Determination algorithm here may be any algorithm that aims at selecting a terminal function environment to be switched next most for a terminal user who uses the information communication processing device 1.

The switching notification unit 3200 notifies the resource separation unit 1000 and the communication interpretation unit 2000 of control data for a terminal function environment to be executed next (e.g. address conversion data or access allowance data) which is according to a number of a terminal function environment to be executed next determined by the switching determination unit 3100 and which is held in the switching control data 3001 and sets the data. As a result, the information communication processing device 1 is allowed to have such resources as the memory 200 or the communication device 70Pk for use in the currently executed terminal function environment and the terminal function environment to be executed next shared time-divisionally and independently of each other.

The context control unit 3300 extracts context of a terminal function environment being currently executed and then re-sets context of a terminal function environment to be executed next which is determined by the switching determination unit 3100 in linkage with the switching notification unit 3200. As a result, different terminal function environments can be operated time-divisionally on the same information processing device 300.

More specifically, in the present exemplary embodiment, with the switching determination unit 3100 for determining switching processing which satisfies terminal user's need as a front end, the switching notification unit 3200 and the context control unit 3300 as back ends cooperate with each other including the resource separation unit 1000 and the communication interpretation unit 2000, which is the characteristic of the present invention.

Figure 19:
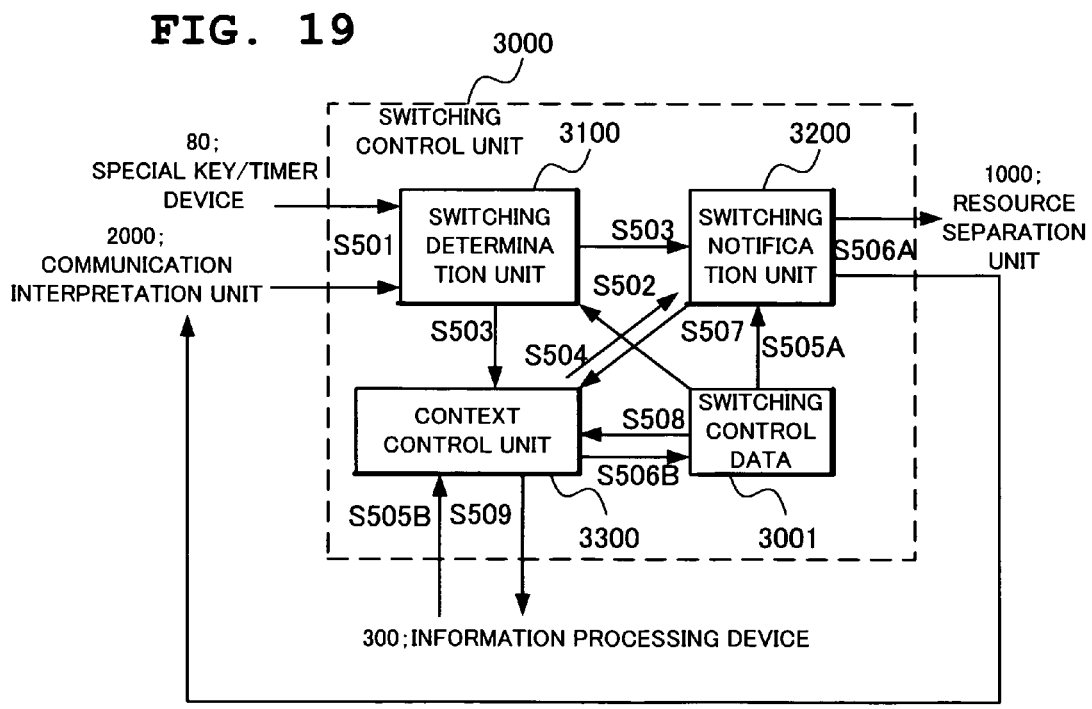
FIG. 19 is a diagram for use in explaining operation of the switching control unit according to the first exemplary embodiment.

FIG. 19 is a diagram for use in explaining one example of operation of the switching control unit 3000 shown in FIG. 18. In FIG. 19, a code formed of S and numerals beside an arrow represents a step number. The final letter A or B of the code represents that simultaneous parallel processing is possible at the step number.

Step S501: The switching determination unit 3100 of the switching control unit 3000 is notified of a switching request by the special key/timer device 80 or the communication interpretation unit 2000.

Step S502: The switching determination unit 3100 reads data necessary for selecting a terminal function environment to be executed next from the switching control data 3001.

Step S503: The switching determination unit 3100 notifies the switching notification unit 3200 and the context control unit 3300 of a terminal function environment to be executed next.

Step S504: The context control unit 3300 causes the information processing device 300 to stop operation and then after confirming the stop, notifies the switching notification unit 3200 of completion of the stop.

Step S505A: The switching notification unit 3200 reads data of the resource separation unit 1000 and the communication interpretation unit 2000 for the terminal function environment to be executed next from the switching control data 3001.

Step S505B: The context control unit 3300 reads from the information processing device 300 its operating context.

Step S506A: The switching notification unit 3200 notifies the resource separation unit 1000 and the communication interpretation unit 2000 of the read data and sets the data.

Step S506B: The context control unit 3300 stores the read context being operated in the switching control data 3001.

Step S507: The switching notification unit 3200 notifies the context control unit 3300 of completion of setting.

Step S508: The context control unit 3300 reads context in operation of the terminal function environment to be executed next from the switching control data 3001.

Step S509: The context control unit 3300 sets the read context at the information processing device 300 to resume the information processing device 300.

According to the present exemplary embodiment, when the CPU 10 of the information processing device 300 has a hypervisor mode, the switching control unit 3000 can be realized as software thereon. In addition, for enabling switching at an arbitrary time point, various manners for obtaining a normal state may be executed before switching such as restoring a state to a normal waiting state by causing a power key event to be generated for a terminal function environment being currently executed or using suspending processing for power saving control.

FIG. 20 is a diagram showing one example of a structure of the switching control data 3001 in the present exemplary embodiment. With reference to FIG. 20, the switching control data 3001 stores a number of a terminal function environment being currently executed, a switchable terminal function environment, a connection relationship between a terminal function environment and the communication device 70Pk, the address conversion data 1005 for each terminal function environment, the access allowance data 1102 and context of each terminal function environment. The switching control data 3001 shown in FIG. 20, for example, has a number of a currently executed terminal function environment as A (switching control data 3001a) and switchable terminal function environments limited to A and B (switching control data 3001b). Also shown is a connection relationship existing between the terminal function environment A and the communication device 70P2 and between the terminal function environment B and the communication device 70P1 (the switching control data 3001c). Furthermore, the terminal function environments A and B preserve such information as the address conversion data 1005 for each terminal function environment, the access allowance data 1102 and context (the switching control data 3001d,e).

Figure 21:
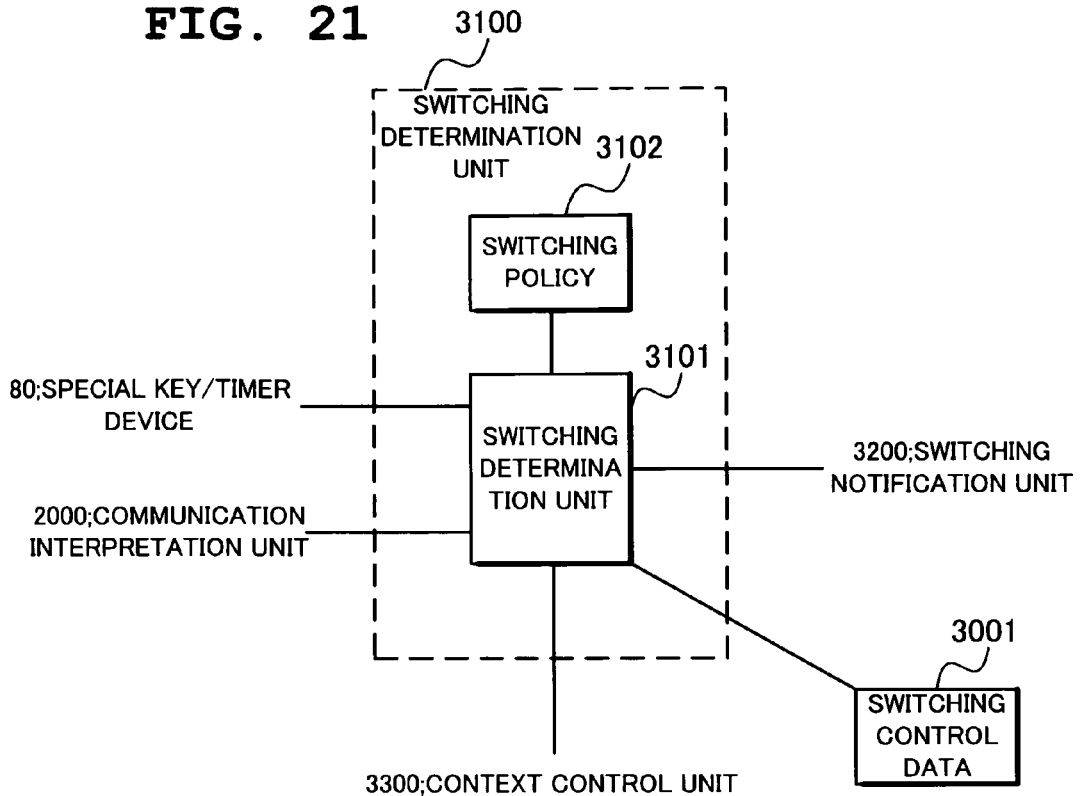
FIG. 21 is a diagram showing a structure of a switching determination unit according to the first exemplary embodiment.

FIG. 21 is a diagram showing one example of a structure of the switching determination unit 3100 according to the present exemplary embodiment. With reference to FIG. 21, the switching determination unit 3100 comprises a switching determination unit 3101 connected to the special key/timer device 80, the communication interpretation unit 2000, the switching notification unit 3200 and the switching control data 3001, and a switching policy 3102.

The switching policy 3102 is used for selecting a terminal function environment to be executed next which is determined by the switching determination unit 3101. Possible as the switching policy 3102 are, for example, key event priority by a terminal user, use time priority, designated communication path priority, fair use priority, priority of a communication request such as a telephone call or mail and priority of remaining buttery power. The switching policy 3102 can be arranged in the switching control data 3001.

The switching determination unit 3101 is started based on a notification from the special key/timer device 80 or the communication interpretation unit 2000. Then, the switching determination unit 3101 notifies the switching notification unit 3200 and the context control unit 3300 of a number of a terminal function environment to be executed next according to a number of a terminal function environment being currently executed and switchable terminal function environment information, a connection relationship between a terminal function environment and the communication device 70Pk in the switching control data 3001, and the switching policy 3102. Although a number of a terminal function environment to be executed next can be the same as the number of a terminal function environment being currently executed, it is at least selected from among switchable terminal function environments.

With reference to FIG. 20, when a telephone request is made by the communication device 70P1, for example, determination is made from the connection relationship between a terminal function environment and the communication device 70Pk that it is switching to the terminal function environment B. If the switching policy 3102 is priority of telephone, because the number of the terminal function environment being currently executed is A, the number of a terminal function environment to be executed next is determined to be B.

According to the present exemplary embodiment, even when a plurality of different kinds of communication requests or a plurality of the same kind of communication requests arrive, the switching determination unit 3101 is allowed to select the best terminal function environment to be executed next among them.

Figure 22:
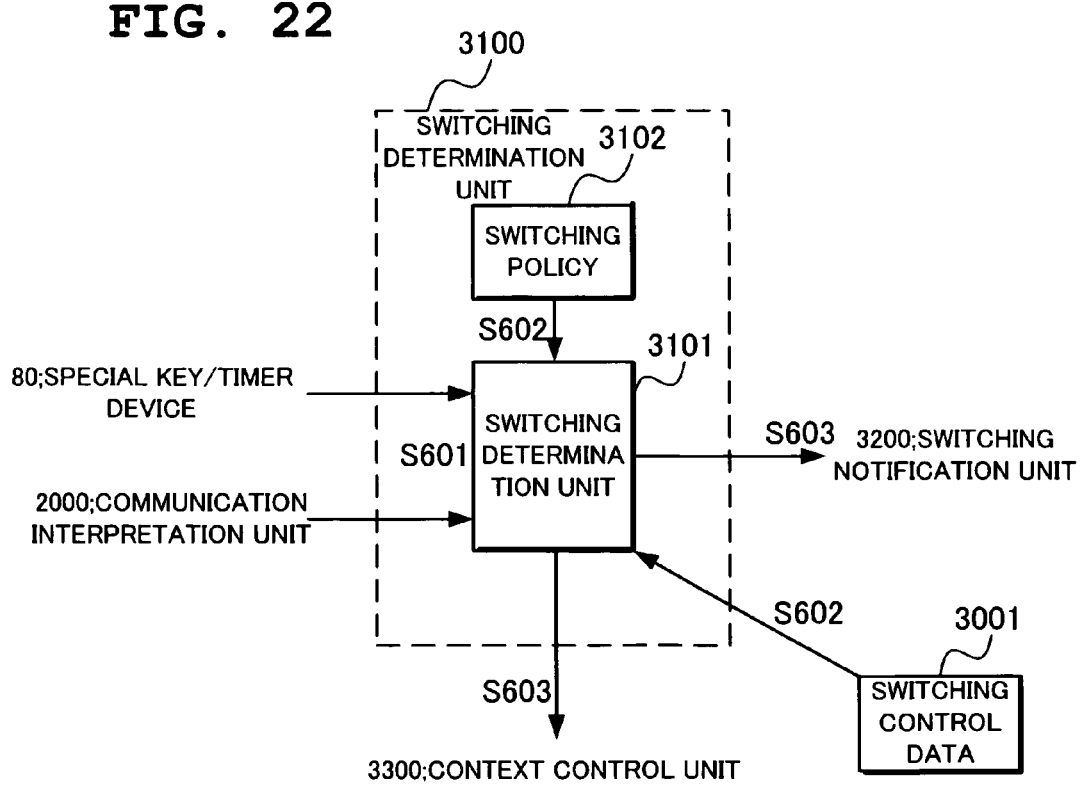
FIG. 22 is a diagram for use in explaining operation of the switching determination unit according to the first exemplary embodiment.

FIG. 22 is a diagram for use in explaining one example of operation of the switching determination unit 31 shown in FIG. 21. In FIG. 22, a code formed of S and numerals beside an arrow represents a step number.

Step S601: The switching determination unit 3101 is notified of a switching request by the special key/timer 80 or the communication interpretation unit 2000.

Step S602: The switching determination unit 3101 refers to data necessary for selecting a terminal function environment to be executed next from the switching control data 3001 and the switching policy 3002 to determine a number of a terminal function environment to be executed next in response to the switching request.

Step S603: The switching determination unit 3101 notifies the switching notification unit 3200 and the context control unit 3300 of the number of the terminal function environment to be executed next.

Figure 23:
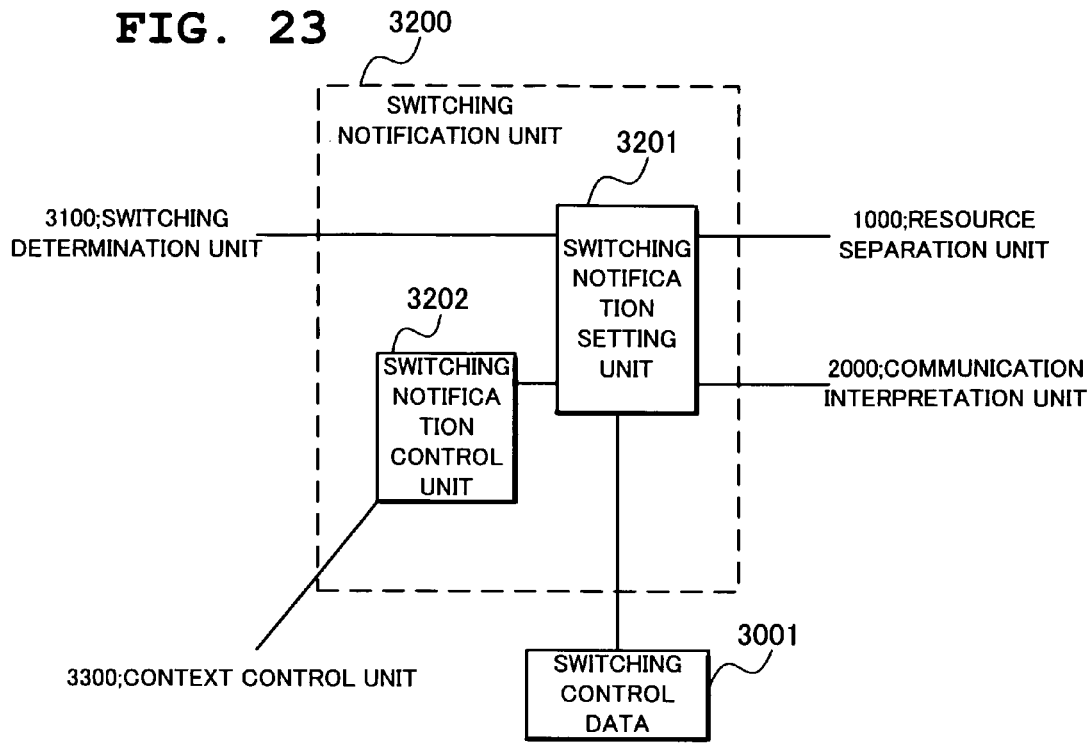
FIG. 23 is a diagram showing a structure of a switching notification unit according to the first exemplary embodiment.

FIG. 23 is a diagram showing one example of a structure of the switching notification unit 3200 according to the present exemplary embodiment. With reference to FIG. 23, the switching notification unit 3200 comprises a switching notification setting unit 3201 connected to the switching determination unit 3100, the switching control data 3001, the resource separation unit 1000 and the communication interpretation unit 2000, and a switching notification control unit 3202 connected to the context control unit 3300.

The switching notification setting unit 3201 receives a notification of a number of a terminal function environment to be executed next from the switching determination unit 3100, reads set data of the resource separation unit 1000 and the communication interpretation unit 2000 for the terminal function environment from the switching control data 3001 and then notifies the resource separation unit 1000 and the communication interpretation unit 2000 of the data to set the data. The switching notification setting unit 3201 notifies the resource separation unit 1000 of, for example, address conversion data and access allowance data equivalent to a terminal function environment to be switched next which are read from the switching control data 3001 to set the data and notifies the communication interpretation unit 2000 of a communication device number to be used based on information about a connection relationship between a terminal function environment and a communication device to set the number. Operation of the switching notification setting unit 3201 is started according to an instruction from the switching notification control unit 3202 and completion of the operation is then notified to the switching notification control unit 3202.

The switching notification control unit 3202 has a function of notifying the switching notification setting unit 3201 of a notification from the context control unit 3300 and a function of notifying the context control unit 3300 of completion of the operation of the switching notification setting unit 3201. This enables operation closely linked with the context control unit 3300 to be realized.

Figure 24:
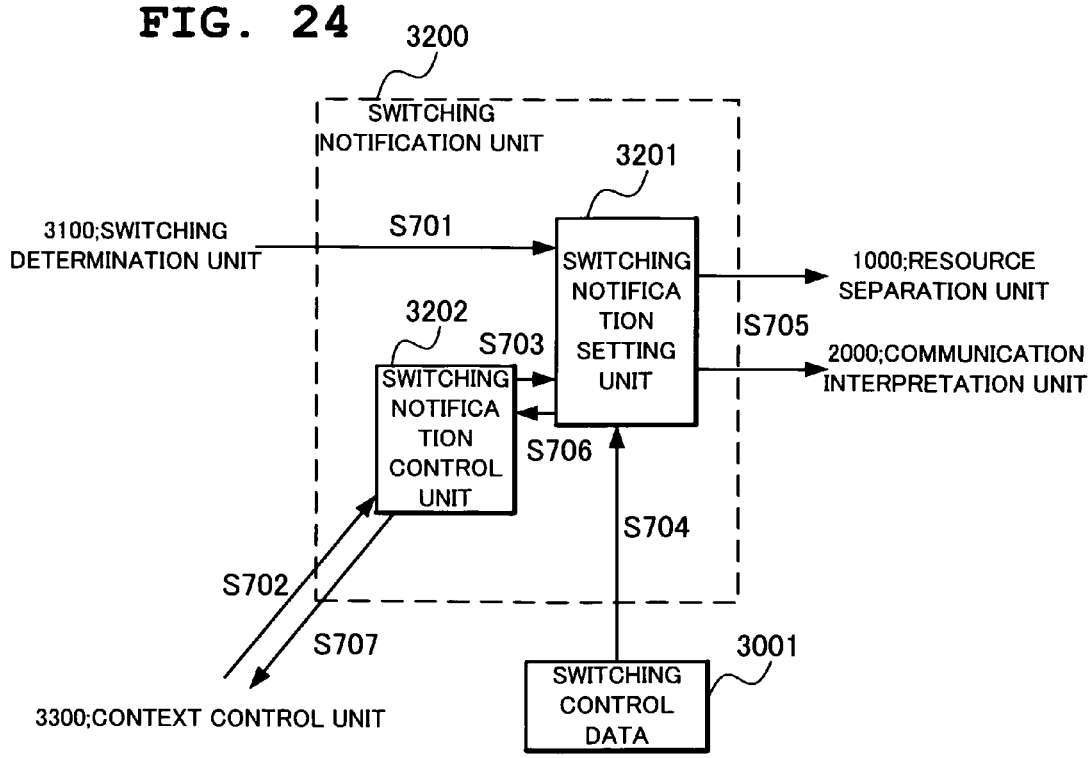
FIG. 24 is a diagram for use in explaining operation of the switching notification unit according to the first exemplary embodiment.

FIG. 24 is a diagram for use in explaining one example of operation of the switching notification unit 3200 shown in FIG. 23. In FIG. 24, a code formed of S and numerals beside an arrow represents a step number.

Step S701: The switching notification setting unit 3201 is notified of a number of a terminal function environment to be executed next from the switching determination unit 3100.

Step S702: The switching notification control unit 3202 receives a notification from the context control unit 3300.

Step S703: The switching notification control unit 3202 instructs the switching notification setting unit 3201 to start operation.

Step S704: The switching notification setting unit 3201 reads necessary data to be set for a terminal function environment to be executed next from the switching control data 3001.

Step S705: The switching notification setting unit 3201 notifies the resource separation unit 1000 and the communication interpretation unit 2000 of the read necessary data and sets the data.

Step S706: The switching notification setting unit 3201 notifies the switching notification control unit 3202 of operation completion.

Step S707: The switching notification control unit 3202 notifies the context control unit 3300 of operation completion.

Figure 25:
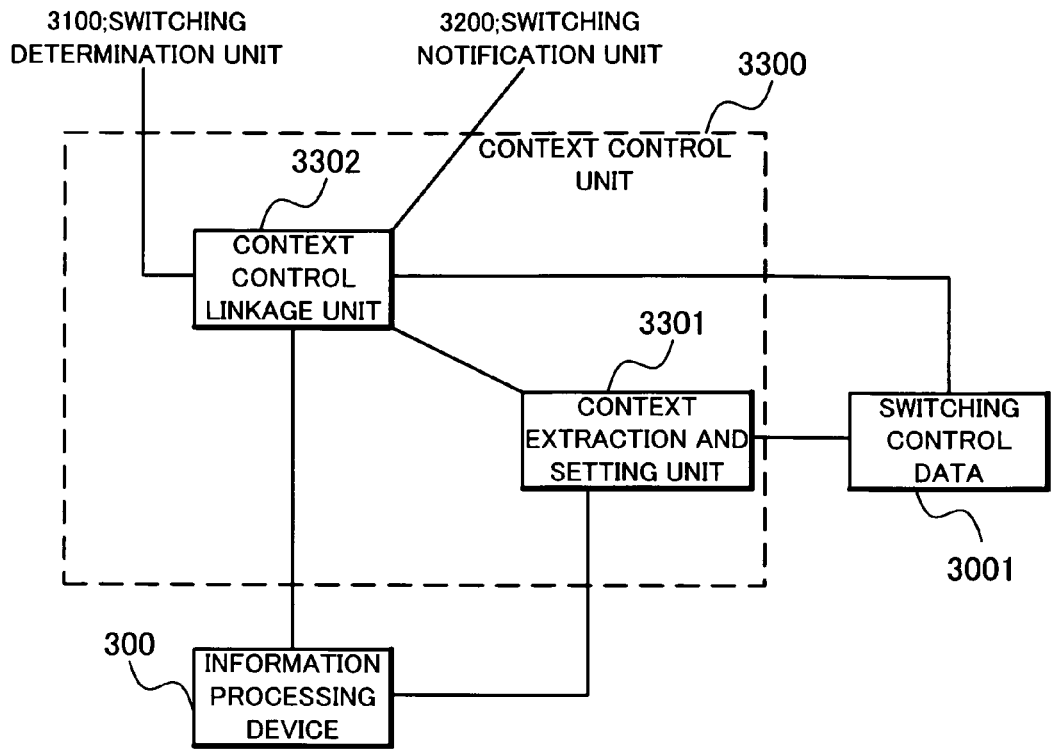
FIG. 25 is a diagram showing a structure of a context control unit according to the first exemplary embodiment.

FIG. 25 is a diagram showing one example of a structure of the context control unit 3300 according to the present exemplary embodiment. With reference to FIG. 25, the context control unit 3300 comprises a context extraction and setting unit 3301 connected to the information processing device 300 and the switching control data 3001, and a context control linkage unit 3302 connected to the switching determination unit 3100, the switching control data 3001, the switching notification unit 3200 and the information processing device 300.

The context extraction and setting unit 3301, based on a number of a terminal function environment to be executed next and a context setting instruction from the context control linkage unit 3302, reads context of the relevant terminal function environment from the switching control data 3001 and sets the read context at the information processing device 300. Alternatively, the context extraction and setting unit 3301 extracts context from the information processing device 300 based on a number of a terminal function environment being currently executed and a context extraction instruction from the context control linkage unit 3302 and preserves the extracted context into a region of the relevant terminal function environment of the switching control data 3001. Operation of the context extraction and setting unit 3301 is started according to an instruction from the context control linkage unit 3302 and its operation completion is then notified to the context control linkage unit 3302.

The context control linkage unit 3302 receives a number of a terminal function environment to be executed next from the switching determination unit 3100 and the context control linkage unit 3302 obtains a terminal function environment number being currently executed from the switching control data 3001. Furthermore, the context control linkage unit 3302 has a function of notifying the switching notification unit 3200 of the stop of the information processing device 300 to wait for a response from the switching notification unit 3200. Then, the context control linkage unit 3302 instructs the context extraction and setting unit 3301 on the terminal function environment number being currently executed and extraction of context and instructs the context extraction and setting unit 3301 on the number of the terminal function environment to be executed next and context setting. This enables the context control linkage unit 3302 to realize operation closely linked with the switching notification unit 3200, as well as making it easier to guarantee an order relationship in linkage with the context extraction and setting unit 3301.

According to the present exemplary embodiment, when a single information processing device 300 is provided, such methods can be prepared for extracting and setting context as a method using scan chain, simple software processing, a method using JTAG (Joint European Test Action Group) and a method using software operable on a hypervisor mode. In other words, any manner can be adopted that enables extraction and setting of context of the information processing device 300.

Figure 26:
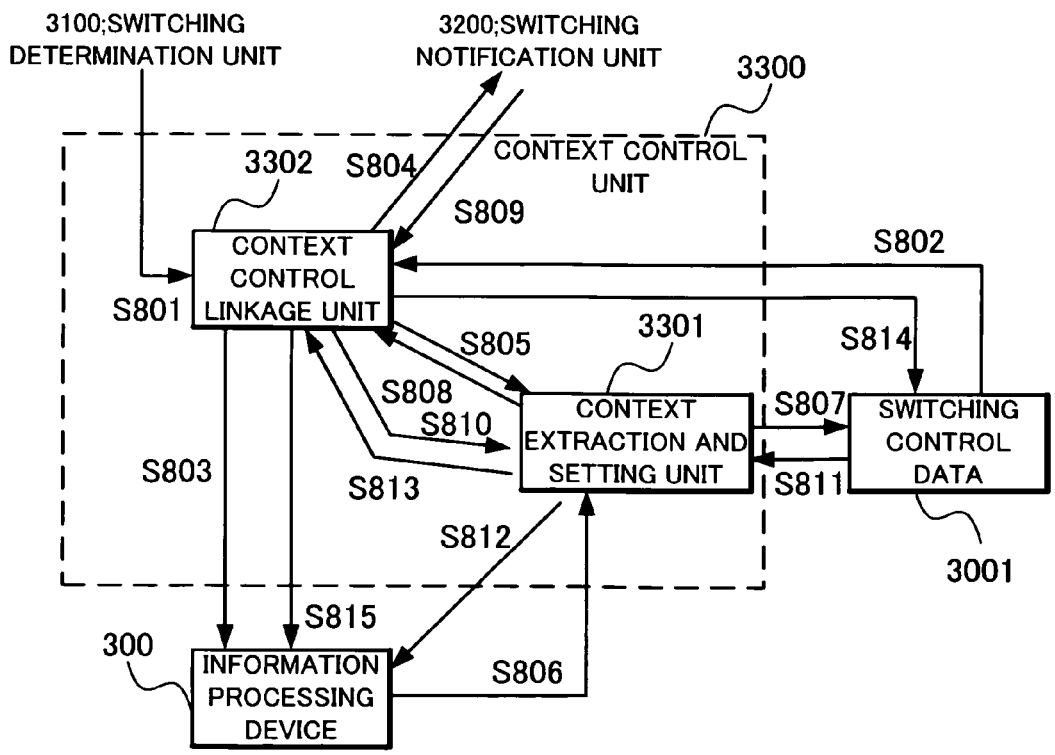
FIG. 26 is a diagram for use in explaining operation of the context control unit according to the first exemplary embodiment.

FIG. 26 is a diagram for use in explaining one example of operation of the context control unit 3300 shown in FIG. 25. In FIG. 26, a code formed of S and numerals beside an arrow represents a step number.

Step S801: The context control linkage unit 3302 is notified of a number of a terminal function environment to be executed next by the switching determination unit 3100.

Step S802: The context control linkage unit 3302 reads a number of a terminal function environment being currently executed from the switching control data 3001.

Step S803: The context control linkage unit 3302 stops the information processing device 300 based on an issuance of a clock stop or software interruption instruction, key event, interruption or the like.

Step S804: The context control linkage unit 3302 notifies the switching notification unit 3200 of switching start.

Step S805: The context control linkage unit 3302 notifies the context extraction and setting unit 3301 of the number of the terminal function environment being currently executed to instruct on extraction of context.

Step S806: The context extraction and setting unit 3301 extracts context from the information processing device 300.

Step S807: The context extraction and setting unit 3301 preserves the context into a region of the switching control data 3001 corresponding to the number of the currently executed terminal function environment which is transferred from the context control linkage unit 3302.

Step S808: The context extraction and setting unit 3301 notifies the context control linkage unit 3302 of the completion of context extraction.

Step S809: The context control linkage unit 3302 queues both an extraction completion notification from the context extraction and setting unit 3301 and a switching completion notification from the switching notification unit 3200.

Step S810: After completion of the queuing, the context control linkage unit 3302 notifies the context extraction and setting unit 3301 of the number of the terminal function environment to be executed next to instruct on context setting.

Step S811: The context extraction and setting unit 3301 reads the context of the relevant terminal function environment in a region of the switching control data 3001 corresponding to the number of the terminal function environment to be executed next which is transferred from the context control linkage unit 3302.

Step S812: The context extraction and setting unit 3301 sets the context of the terminal function environment to be executed next which is read from the switching control data 3001 at the information processing device 300.

Step S813: The context extraction and setting unit 3301 notifies the context control linkage unit 3302 of the end of context setting.

Step S814: The context control linkage unit 3302 updates the number of the terminal function environment to be executed next to the number of the terminal function environment being currently executed in the switching control data 3001.

Step S815: The context control linkage unit 3302 resumes the information processing device 300 based on an issuance of a clock resumption or software resumption instruction, key event, interruption or the like.

Figure 27:
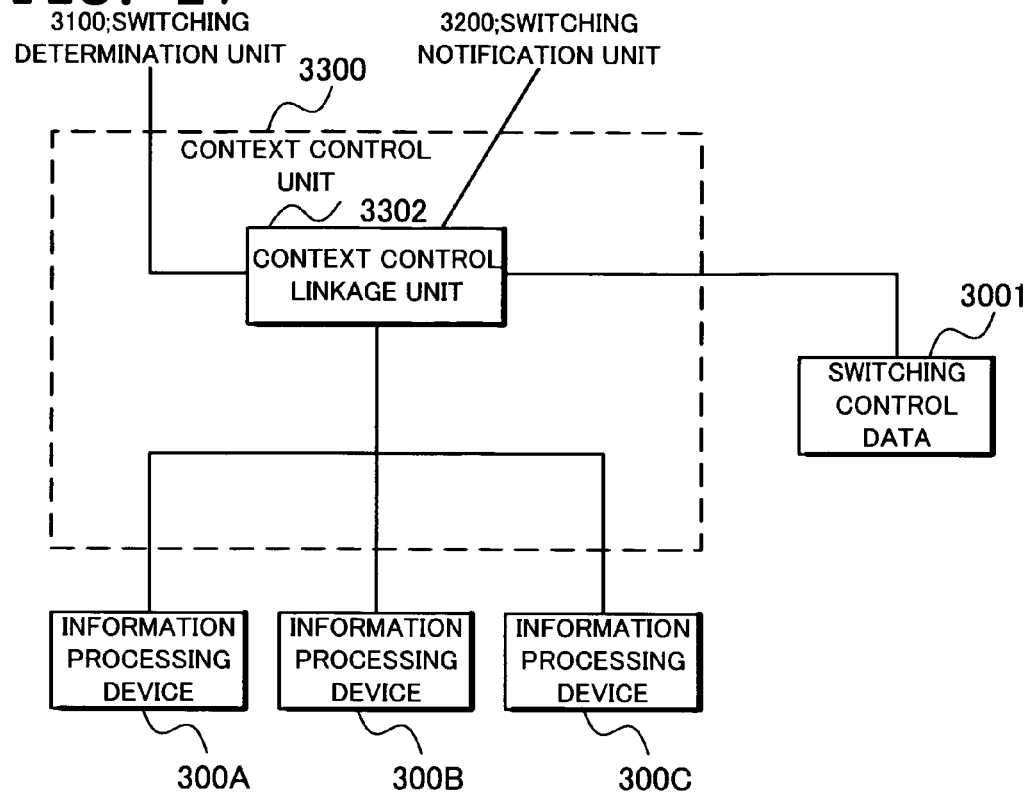
FIG. 27 is a diagram showing a modification example of a structure of the context control unit according to the first exemplary embodiment.

FIG. 27 is a diagram showing one example of a modification example of a structure of the context control unit 3300 in the present exemplary embodiment. With reference to FIG. 27, the context control unit 3300 comprises the context control linkage unit 3302 connected to the switching determination unit 3100, the switching control data 3001, the switching notification unit 3200 and a plurality of information processing devices 300A, 300B and 300C and fails to comprise the context extraction and setting unit 3301 shown in FIG. 25.

According to the present exemplary embodiment, when a plurality of information processing devices 300 are provided, they can be considered as independent resources for the terminal function environments such as the information processing device 300A for the terminal function environment A and the information processing device 300B for the terminal function environment B.

While the context control linkage unit 3302 in FIG. 27 has the same function as that of the context control linkage unit 3302 shown in FIG. 25, the function is replaced by simple stop and resumption of the information processing devices 300A, 300B and 300C without making a request for context extraction and setting. This enables the context control linkage unit 3302 in FIG. 27 to save such comparatively time-consuming processing as context extraction or setting, thereby speeding up the system.

Figure 28:
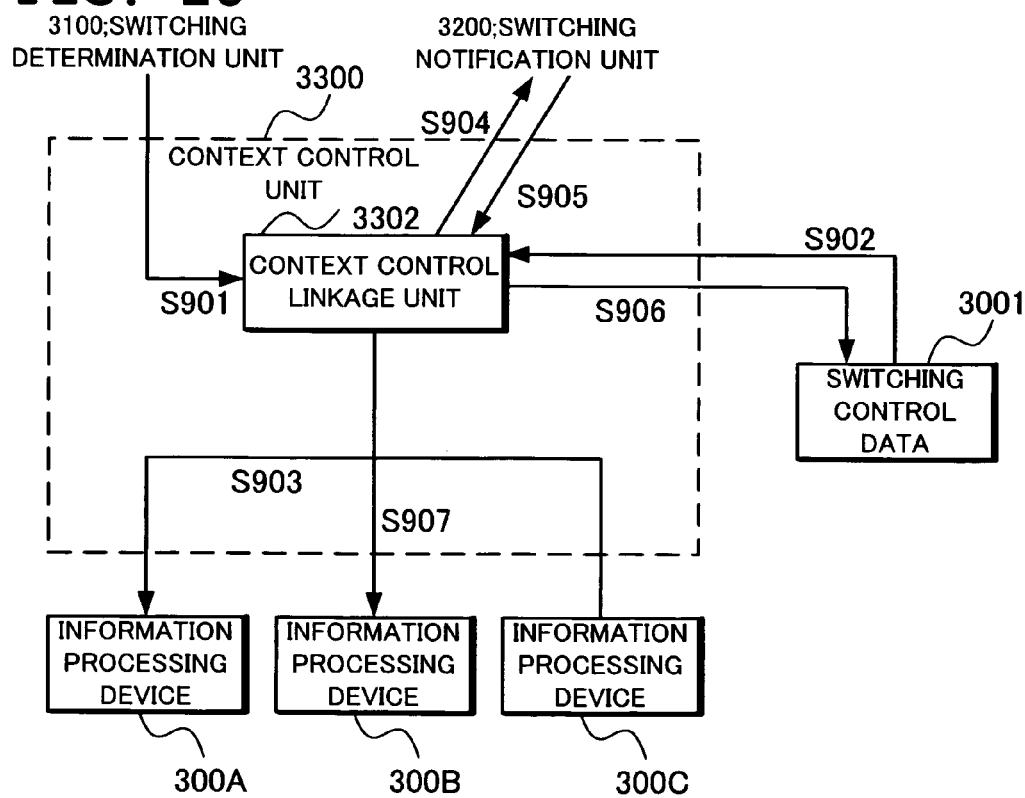
FIG. 28 is a diagram for use in explaining a modification example of operation of the context control unit according to the first exemplary embodiment.

FIG. 28 is a diagram for use in explaining one example of operation of the context control unit 3300 shown in FIG. 27. In FIG. 28, a code formed of S and numerals beside an arrow represents a step number.

Step S901: The context control linkage unit 3302 is notified of a number of a terminal function environment to be executed next from the switching determination unit 3100.

Step S902: The context control linkage unit 3302 reads a number of a terminal function environment being currently executed from the switching control data 3001.

Step S903: The context control linkage unit 3302 stops the information processing device 300 relevant to the terminal function environment being currently executed based on an issuance of a clock stop or software interruption instruction, key event, interruption or the like.

Step S904: The context control linkage unit 3302 notifies the switching notification unit 3200 of switching start.

Step S905: The context control linkage unit 3302 queues both the switching completion notifications from the switching notification unit 3200.

Step S906: The context control linkage unit 3302 updates a number of a terminal function environment to be executed next to the number of the terminal function environment being currently executed of the switching control data 3001.

Step S907: The context control linkage unit 3302 resumes the information processing device 300 relevant to the terminal function environment to be executed next based on an issuance of a clock resumption or software resumption instruction, key event, interruption or the like.

Figure 29:
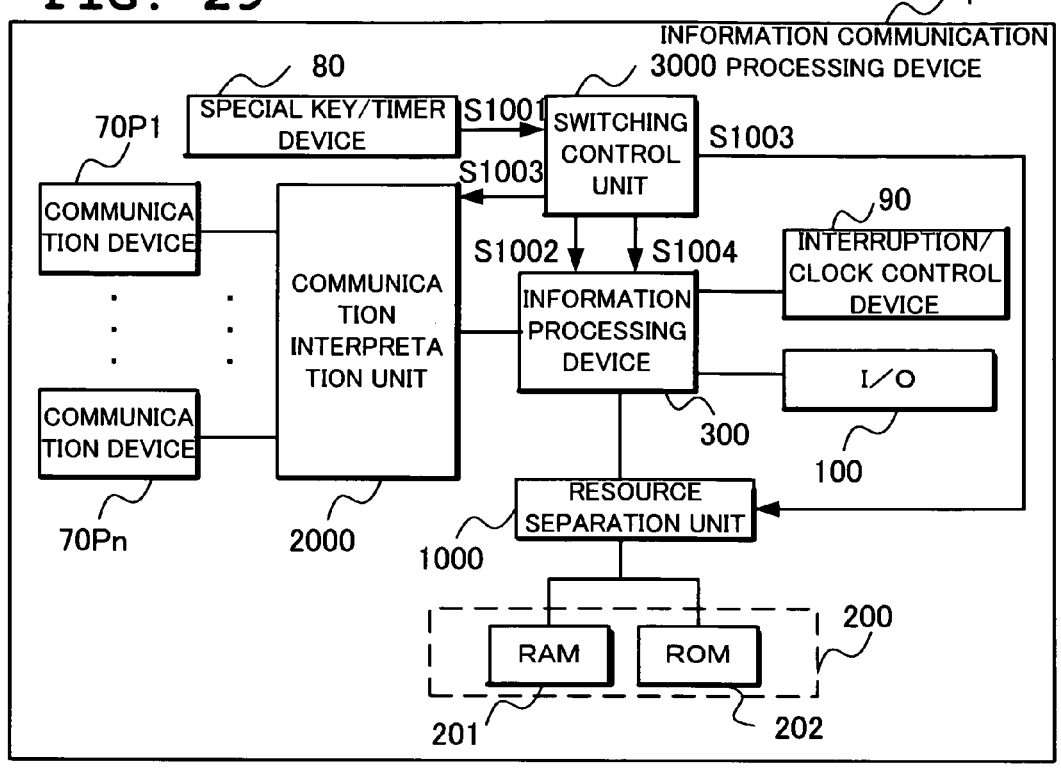
FIG. 29 is a diagram for use in explaining operation of the information communication processing device according to the first exemplary embodiment.

FIG. 29 is a diagram for use in explaining one example of operation of the information communication processing device 1 according to the present exemplary embodiment shown in FIG. 1 and a diagram showing operation executed in spontaneous switching of a terminal function by a terminal user. In FIG. 29, a code formed of S and numerals beside an arrow represents a step number.

Step S1001: The switching control unit 3000 receives an instruction on switching to another terminal function from a terminal user through the special key/timer device 80.

Step S1002: The switching control unit 3000 determines a number of a terminal function to be executed next based on a terminal user's instruction and then preserves context of a terminal function being currently executed which is in operation in the information processing device 300.

Step S1003: The switching control unit 3000 notifies the resource separation unit 1000 and the communication interpretation unit 2000 of set data for the terminal function environment to be executed next to switch a peripheral environment.

Step S1004: The switching control unit 3000 sets context of the terminal function environment to be executed next at the information processing device 300 after waiting for completion of the switching to the peripheral environment.

Figure 30:
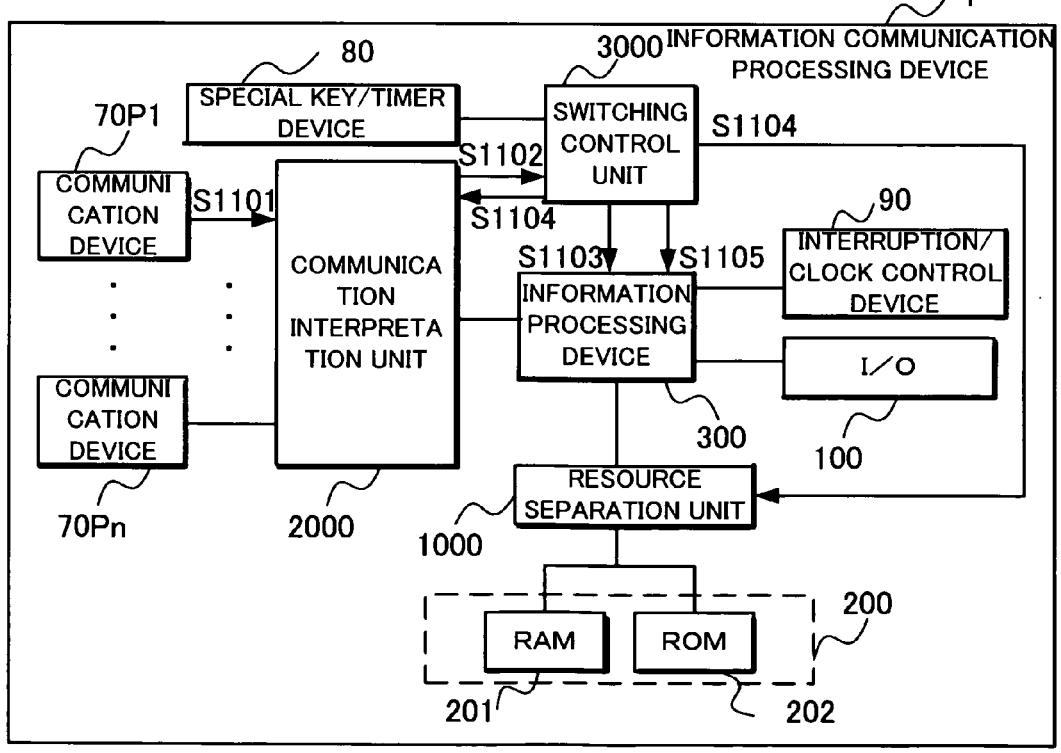
FIG. 30 is a diagram for use in explaining operation of the information communication processing device according to the first exemplary embodiment.

FIG. 30 is a diagram for use in explaining one example of operation of the information communication processing device 1 according to the present exemplary embodiment shown in FIG. 1 and a diagram showing operation executed when in switching a terminal function by a communication request from the communication device 70Pk. In FIG. 30, a code formed of S and numerals beside an arrow represents a step number.

Step S1101: The communication interpretation unit 2000 receives a communication request such as a telephone call or mail from the communication device 70Pk.

Step S1102: The communication interpretation unit 2000 notifies the switching control unit 3000 of details of the communication request.

Step S1103: The switching control unit 3000 determines a number of a terminal function to be executed next based on its own selection criterion and then preserves context of a terminal function being currently executed which is in operation in the information processing device 300.

Step S1104: The switching control unit 3000 notifies the resource separation unit 1000 and the communication interpretation unit 2000 of set data for the terminal function environment to be executed next to switch a peripheral environment.

Step S1105: The switching control unit 3000 sets context of the terminal function environment to be executed next at the information processing device 300 after waiting for completion of the switching to the peripheral environment.

Figure 31:
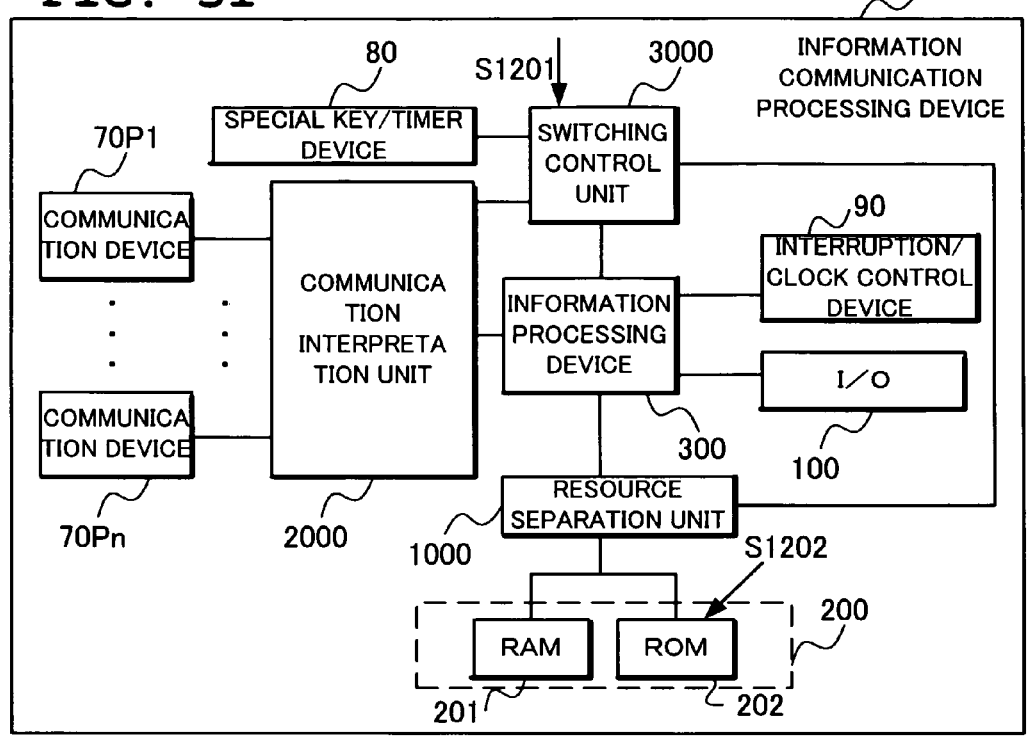
FIG. 31 is a diagram for use in explaining a modification example of operation of the information communication processing device according to the first exemplary embodiment.

FIG. 31 is a diagram for use in explaining a modification example of operation of the information communication processing device shown in FIG. 1 and a diagram showing operation executed when in installing a terminal function environment in the present exemplary embodiment. In FIG. 31, a code formed of S and numerals beside an arrow represents a step number.

Step S1201: The information communication processing device 1 notifies the switching control unit 3000 of installation by using an interface provided for external connection. The switching control unit 3000 updates or installs the switching control data 3001 for a new terminal function environment into a currently free region.

Step S1202: The information communication processing device 1 installs a program of the new terminal function environment into the currently free ROM 202 region by using the interface provided for external connection.

In thus described structure, among the switching control data 3001 in FIG. 20, preserved in a free region of a switchable terminal function environment is context of a reset state of the information processing device 300 with (1) the number of the terminal function environment to be installed as set data to the communication interpretation unit 2000, (2) a table of correspondence with the communication device 70Pk to be used as set data to the resource separation unit 1000 and (3) the address conversion data 1005 and the access allowance data 1102 to the RAM 201 and the ROM 202 regions required by the new terminal function environment as context of the terminal function environment.

According to the present exemplary embodiment, an interface provided for external connection is not limited to wired connection such as an ordinary serial interface or parallel interface but may be wireless connection over a network. Alternatively, it may be any of the input/output devices 100.

According to the present exemplary embodiment, installation of a program into the ROM 202 may be executed by the switching control unit 3000 or may be realized by writing by controlling the information processing device 300 through the switching control unit 3000 or by direct writing through such a path as an external connection interface or the input/output device 100.

Furthermore, according to the present exemplary embodiment, when the RAM 201 region and the ROM 202 region are not managed by a fixed partition for a terminal function environment switchably operable, the RAM 201 and ROM 202 regions of a currently installed terminal function environment may be shifted to increase a free region for installation. It is apparent that setting of the switching control data 3001 related to the shifted region needs to be updated. In other words, conventional techniques related to so-called program installation can be used.

Figure 32:
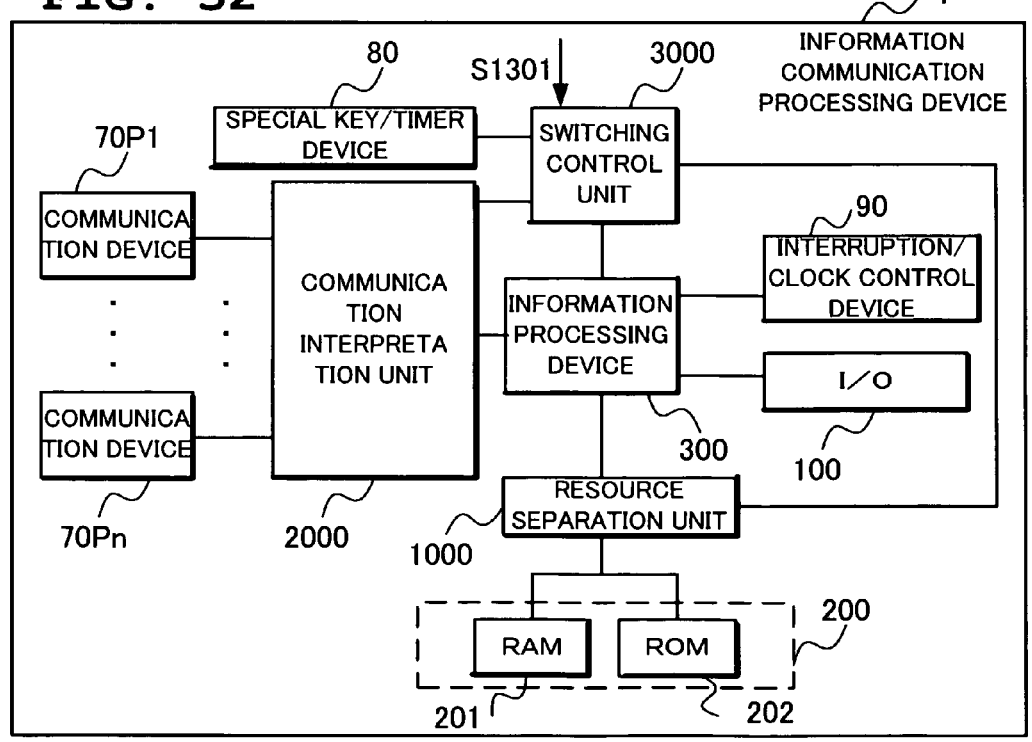
FIG. 32 is a diagram for use in explaining a modification example of operation of the information communication processing device according to the first exemplary embodiment.

FIG. 32 is a diagram for use in explaining a modification example of operation of the information communication processing device shown in FIG. 1 and a diagram showing operation executed when in uninstalling a terminal function environment in the present exemplary embodiment. In FIG. 32, a code formed of S and numerals beside an arrow represents a step number.

Step S1301: The information communication processing device 1 notifies the switching control unit 3000 of installation by using an interface provided for external connection. The switching control unit 3000 deletes the switching control data 3001 of a terminal function environment to be uninstalled.

In thus described structure, among the switching control data 3001 shown in FIG. 20, the number of the terminal function environment to be uninstalled is deleted from the switchable terminal function environment information. It is apparent that in response to a demand for security or the like, the program on the ROM 202 may be deleted or other switching control data 3001 may be restored to an initial state.

In addition, according to the present exemplary embodiment, an interface provided for external connection is not limited to wired connection such as an ordinary serial interface or parallel interface but may be wireless connection over a network. Alternatively, it may be any of the input/output devices 100.

Figure 37:
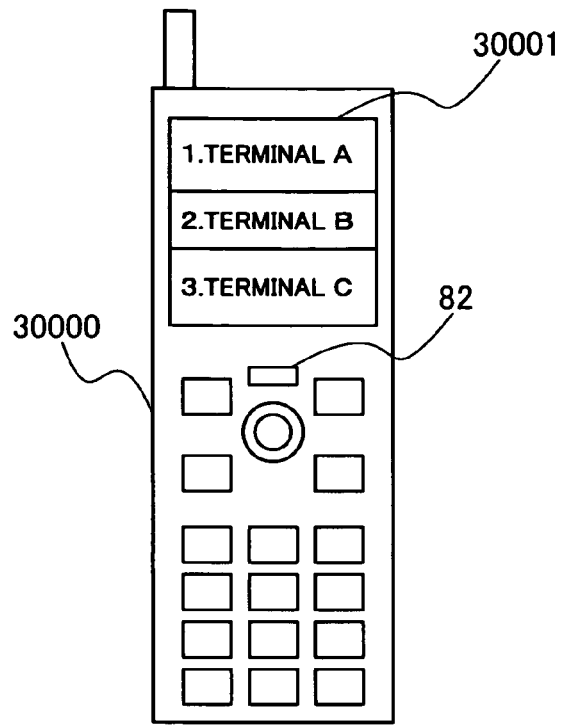
FIG. 37 is a diagram showing a structure of an information communication terminal according to a sixth exemplary embodiment of the present invention.

Furthermore, according to the present exemplary embodiment, installation/uninstallation operation may be started based on a notification from the interface for external connection or started by using such a user interface as shown in FIG. 36 or FIG. 37 which will be described later.

Since the present exemplary embodiment enables interference between terminal functions to be prevented, terminal user's favorite terminal functions including a closed terminal function can be installed (incorporated) or uninstalled afterwards.

Also according to the present exemplary embodiment, it is possible to install not only the whole terminal function but also only a basic part of a terminal function and then additionally download another part of the terminal function afterwards which is additionally required later.

Effects of the First Exemplary Embodiment

The present invention allows an information communication terminal having a plurality of terminal functions to execute a terminal function without being affected by external communication contents, thereby enabling switching of a terminal function environment according to the communication contents in linkage with the communication contents.

Possible switching control is, for example, while continuously executing the terminal function A when receiving mail to the terminal function B during the execution of the terminal function A, switching to the terminal function C from the terminal function A to respond when a telephone call arrives for the terminal function C.

Thus, since use of the information processing device according to the present invention enables switching for each terminal function environment, incorporation/deletion can be executed at will for each terminal function environment.

The reason is that the switching control unit for switching a terminal function environment determines a terminal function environment to be switched according to communication contents from outside the information processing device and then executes switching after preserving and setting necessary context.

Second Exemplary Embodiment

Figure 33:
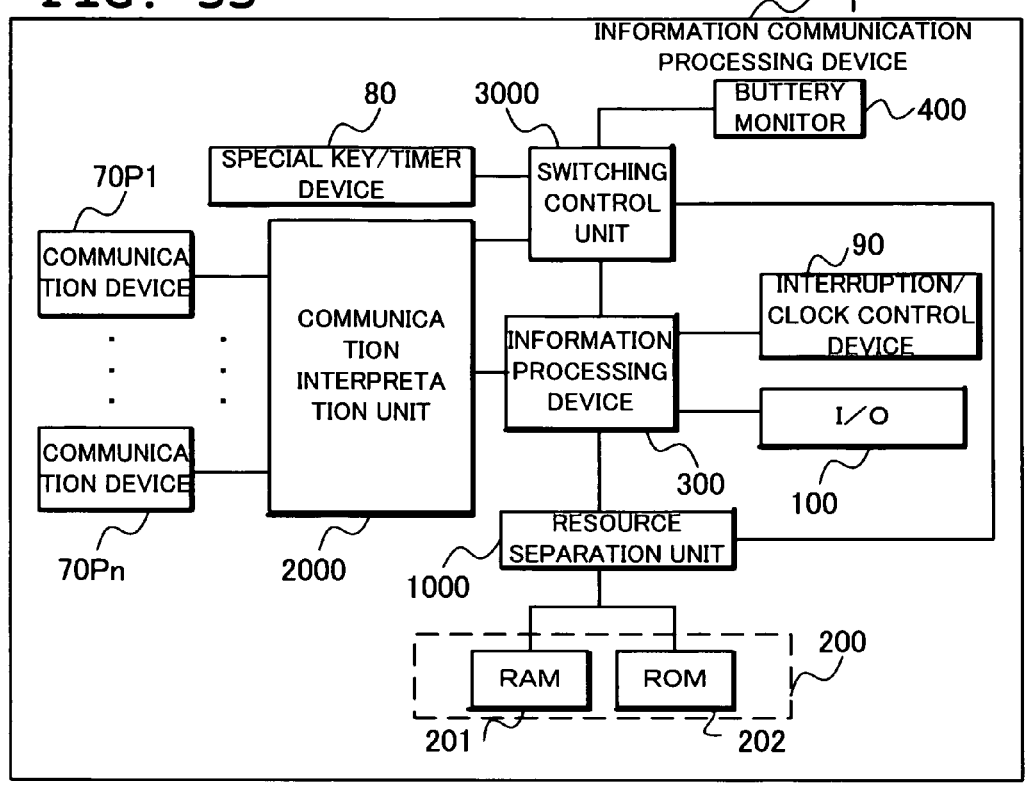
FIG. 33 is a diagram showing a structure of an information communication processing device according to a second exemplary embodiment of the present invention.

FIG. 33 is a diagram showing a structure of an information communication processing device according to a second exemplary embodiment of the present invention. With reference to FIG. 33, the present exemplary embodiment has a buttery monitor 400 in addition to the components shown in FIG. 1.

The buttery monitor 400 provides the switching control unit 300 with remaining buttery capacity information indicative of a remaining buttery capacity. When the buttery capacity is left very small, this enables the switching control unit 3000 to switch a terminal function to one terminal function requiring less power consumption and fix the same, thereby ensuring communication functions for emergency such as police and ambulance.

Third Exemplary Embodiment

Figure 34:
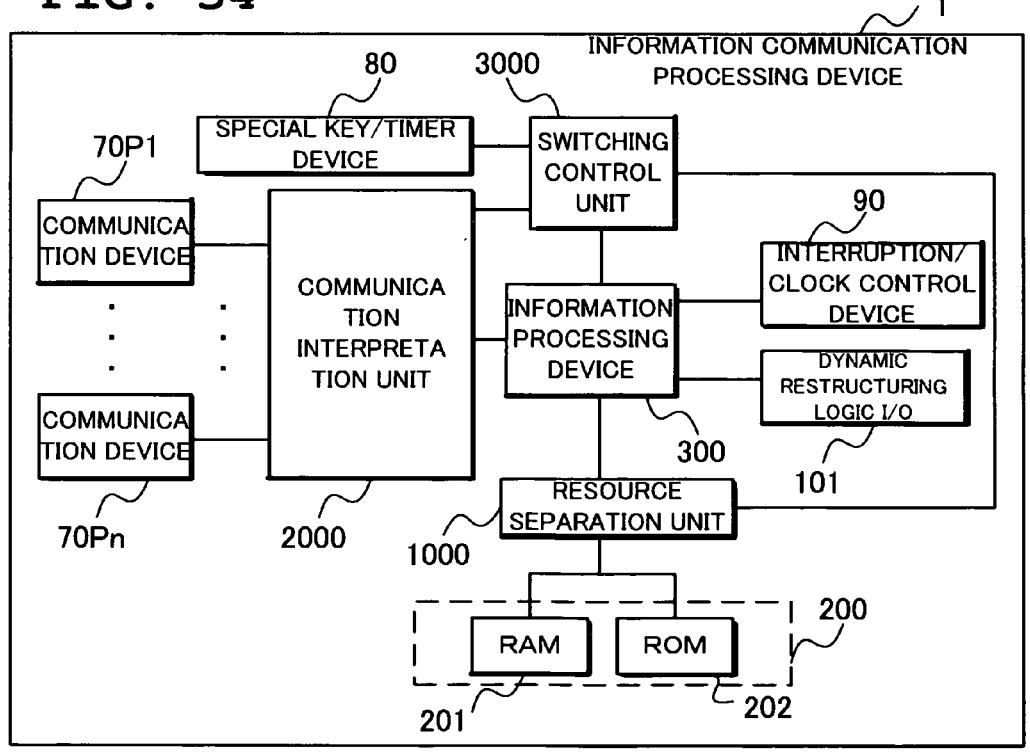
FIG. 34 is a diagram showing a structure of an information communication processing device according to a third exemplary embodiment of the present invention.

FIG. 34 is a diagram showing a structure of an information communication processing device according to a third exemplary embodiment of the present invention. With reference to FIG. 34, the present exemplary embodiment comprises a dynamic restructuring logic input/output device 101 in place of the input/output device 100 among the components shown in FIG. 1.

The dynamic restructuring logic input/output device 101 is allowed to absorb an input/output device (e.g. digital TV communication system, camera function, etc.) varying with each terminal function environment caused by a difference in nation, region and terminal specification by dynamically restructuring a hardware circuit. This enables the information communication processing device 1 according to the present exemplary embodiment to execute not only a terminal function environment dependent on the input/output device 100 but also various terminal function environments by restructuring the input/output device 100 in the structure shown in FIG. 1.

Fourth Exemplary Embodiment

Figure 35:
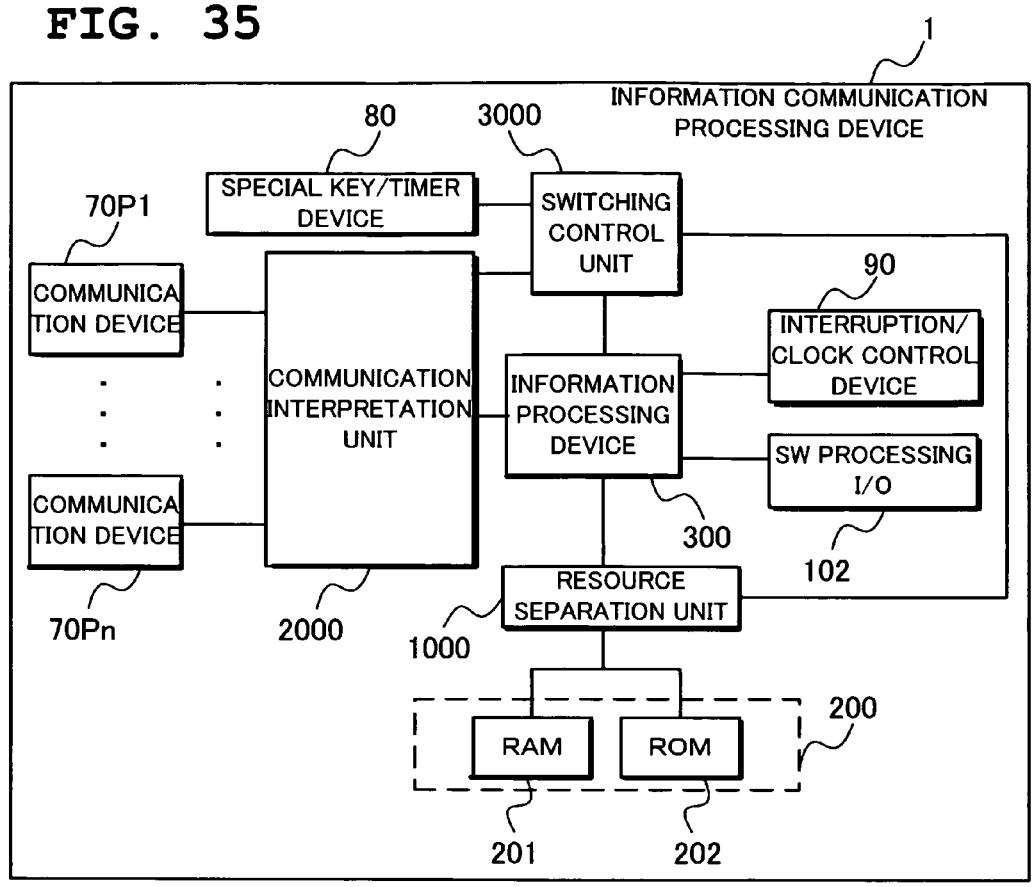
FIG. 35 is a diagram showing a structure of an information communication processing device according to a fourth exemplary embodiment of the present invention.

FIG. 35 is a diagram showing a structure of an information communication processing device according to a fourth exemplary embodiment of the present invention. With reference to FIG. 35, the present exemplary embodiment comprises a software processing input/output device 102 in place of the input/output device 100 among the components shown in FIG. 1.

The software processing input/output device 102 is allowed to absorb an input/output device varying with each terminal function environment caused by a difference in nation, region and terminal specification as described above by software processing. This enables the information communication processing device 1 according to the present exemplary embodiment to execute not only a terminal function environment dependent on the input/output device 100 but also various terminal function environments by restructuring the input/output device 100 in the structure shown in FIG. 1.

In the present exemplary embodiment, the software processing input/output device 102 can be absorbed in advance at a device driver level of the OS 20 executed by the information processing device 300. Alternatively, an input/output device having a common interface may be provided for software emulation (e.g. having all as a USB (Universal Serial Bus) interface, a function thereon is processed by software).

Fifth Exemplary Embodiment

FIG. 36 is a diagram for use in explaining one example of a structure of an information communication terminal according to a fifth exemplary embodiment of the present invention. With reference to FIG. 36, an information communication terminal 30000 of the present exemplary embodiment internally has the structure of the information communication processing device 1 shown in FIG. 1 and comprises a special key 82 such as a jog dial.

The special key 82 has a function of allowing a terminal user to select a number of a terminal function environment to be executed next by using rotation and then determine the same by pressing the key. This enables the terminal user to realize selection of a terminal function that he/she wants to use at present.

According to the present exemplary embodiment, the special key 82 can assume any structure that enables a terminal user to select and determine a terminal function.

Sixth Exemplary Embodiment

FIG. 37 is a diagram for use in explaining one example of a structure of an information communication terminal according to a sixth exemplary embodiment of the present invention. With reference to FIG. 37, the information communication terminal 30000 of the present exemplary embodiment, similarly to FIG. 36, internally has the structure of the information communication processing device 1 shown in FIG. 1 and comprises the special key 82 such as a jog dial and an image display device 30001.

When the special key 82 is pressed, a selection screen is exhibited on the image display device 30001 by the switching control unit 3000. Rotation and pressing of a key that a common information communication terminal has or a special key such as a jog dial enables a terminal user to select and determine a number of a terminal function environment to be executed next. This allows the terminal user to select a terminal function that he/she wants to use at present. Display on the image display device 30001 may be realized not by the switching control unit 3000 but by the information processing device 300.

According to the present exemplary embodiment, the special key 82 can assume any structure that enables software to be started which allows a terminal user to select or determine a terminal function.

Seventh Exemplary Embodiment

Figure 38:
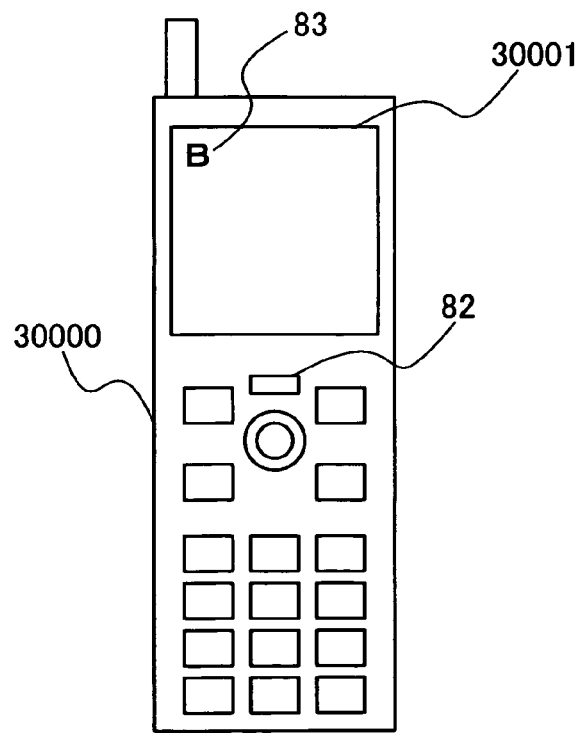
FIG. 38 is a diagram showing a structure of an information communication terminal according to a seventh exemplary embodiment of the present invention.

FIG. 38 is a diagram for use in explaining one example of a structure of an information communication terminal according to a seventh exemplary embodiment of the present invention. With reference to FIG. 38, the information communication terminal 30000 of the present exemplary embodiment internally has the structure of the information communication processing device 1 shown in FIG. 1 and comprises the special key 82 such as a jog dial, the image display device 30001 and a block mark 83 for displaying on the image display device 30001 that switching itself is inhibited.

The special key 82 has a function of allowing a terminal user to spontaneously refuse switching to other terminal functions than a terminal function being currently executed by the use of long-pressing. The terminal user is also allowed to release switching refusal by another long-pressing after once losing a touch to the key. This enables the terminal user to fix and use a terminal function that he/she wants to use.

The block mark 83 is displayed on the image display device 30001 by the switching control unit 3000 for displaying whether switching is currently refused or not. Display on the image display device 30001 may be executed not by the switching control unit 3000 but by the information processing device 300.

According to the present exemplary embodiment, the special key 82 may have any structure that enables a terminal user to select or determine a terminal function. In addition, the block mark 83 may have any design that enables a terminal user to recognize.

Eighth Exemplary Embodiment

Figure 39:
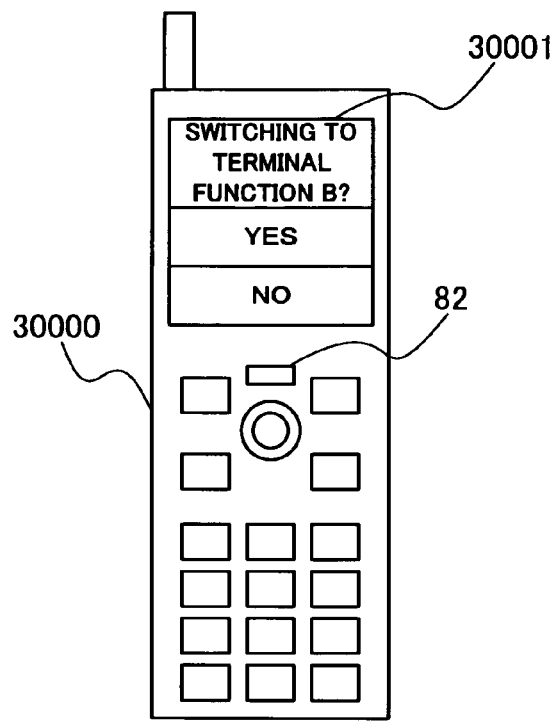
FIG. 39 is a diagram showing a structure of an information communication terminal according to an eighth exemplary embodiment of the present invention.

FIG. 39 is a diagram for use in explaining one example of a modification of a structure of an information communication terminal according to an eighth exemplary embodiment of the present invention. With reference to FIG. 39, the information communication terminal 30000 of the present exemplary embodiment internally has the structure of the information communication processing device 1 shown in FIG. 1 and comprises the special key 82 such as a jog dial and the image display device 30001 similarly to FIG. 37.

The special key 82 has a function of designating in response to an external communication request, when a terminal function environment to be executed next differs from a currently executed terminal function environment, whether to switch the environment on a selection screen output on the image display device 30001 by the switching control unit 3000. Selection and determination whether to switch or not is made by rotation and pressing of the special key 82 such as a jog dial, for example. This enables a terminal user to fix and use a currently used terminal function.

According to the present exemplary embodiment, the special key 82 has any structure that enables a terminal user to select and determine a terminal function.

Furthermore, according to the present embodiment, as the information communication terminal 30000, an equivalency to a conventional information communication terminal can be used by using a conventional key in place of the special key 82. Alternatively, it is possible to omit the special key 82 itself when no spontaneous switching by a terminal user is adopted.

Ninth Exemplary Embodiment

FIG. 40 is a diagram showing one example of a structure of an information communication system according to a ninth exemplary embodiment of the present invention. With reference to FIG. 40, the present exemplary embodiment comprises a terminal user 40000 and a plurality of terminal function developers 50000.

The terminal user 40000 of the present exemplary embodiment owns such information communication terminal 30000 as shown in FIG. 36 which internally has the information communication processing device 1 whose structure is shown in FIG. 1 as an example. Since the information communication terminal 30000 recited in the present exemplary embodiment which internally has the information communication processing device 1 allows free incorporation of terminal functions to be mounted without limitation as described above, even after the terminal function developer 50000 provides the information communication terminal 30000, every kind of terminal function can be incorporated according to taste of the terminal user 40000 who owns the information communication terminal 30000. It is apparent that a terminal function that the terminal user 40000 incorporates is limited by none of a kind of terminal function to be selected, a kind of provider of a terminal function, and the like "Incorporation afterwards" here in the present specification denotes that after at least one terminal function is mounted on the information communication processing device 1, such change is made as addition of other terminal function or deletion of a terminal function.

This enables the terminal user 40000 to switch and execute terminal functions that the user wants to use in combination among the terminal functions provided by the plurality of terminal function developers 50000. It is apparent that the terminal user 40000 may be in plural or single, or a plurality of groups or a single group, or a plurality of corporations or a single corporation.

The terminal function developer 50000 develops such a terminal function for the information communication processing device 1 as shown in FIG. 1 and then provides the terminal user 40000 with the terminal function. The developer 50000Pk as one of the terminal function developers, for example, may be a communication service provider or a non-communication service provider such as a conventional developer manufacturer of information communication terminals or a common terminal function developer. In addition, the developer 50000Pk as one of the terminal function developers may provide a plurality of terminal functions.

In thus described structure, the terminal function developer 50000 may bind the information communication terminal 30000 and the terminal function in advance and provide the terminal user 40000 with the obtained terminal.

Furthermore, in thus described structure, the terminal function developer 50000 may be a single (single corporation) developer only, or a plurality of (or single) communication providers whose voice networks or the like are different, or a plurality of (or single) communication service providers whose voice networks or the like are the same, or a plurality of terminal function developers may be one group.

In addition, since the present exemplary embodiment enables addition of a terminal function environment itself, the terminal function developer 50000 requires none of development man-hours for the information communication terminal 30000, implantation man-hours for a terminal function environment and interference verification man-hours after implantation. Furthermore, since the information communication terminal 30000 physically occupied by another terminal function developer 50000 is released, the terminal function developer 50000 is allowed to provide, according to its own terminal function environment, the terminal user 40000 with a new terminal function that a terminal function provided by other terminal function developer 50000 fails to have.

Moreover, since the present exemplary embodiment enables interference between terminal functions to be prevented, terminal functions that the terminal user 40000 likes including closed terminal functions can be freely combined afterwards.

Figure 41:
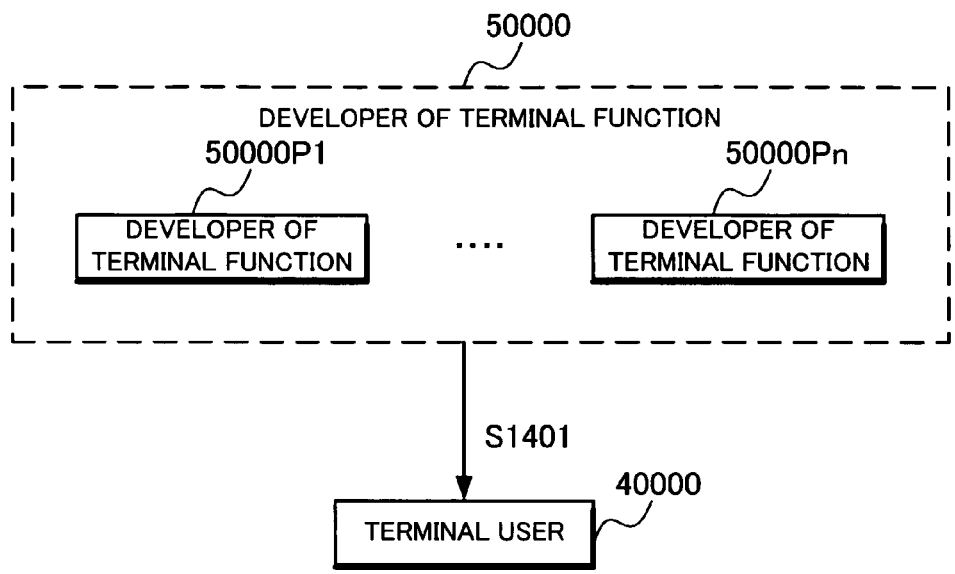
FIG. 41 is a diagram for use in explaining operation of the information communication system according to the ninth exemplary embodiment.

FIG. 41 is a diagram for use in explaining one example of operation of the information communication system according to the present exemplary embodiment shown in FIG. 40. In FIG. 41, a code formed of S and numerals beside an arrow represents a step number.

Step S1401: The information communication terminal 30000 owned by the terminal user 40000 having received supply of a terminal function from the terminal function developer 50000 has its internal terminal function freely combined with the supplied terminal function to switch and execute the terminal function.

Tenth Exemplary Embodiment

Figure 42:
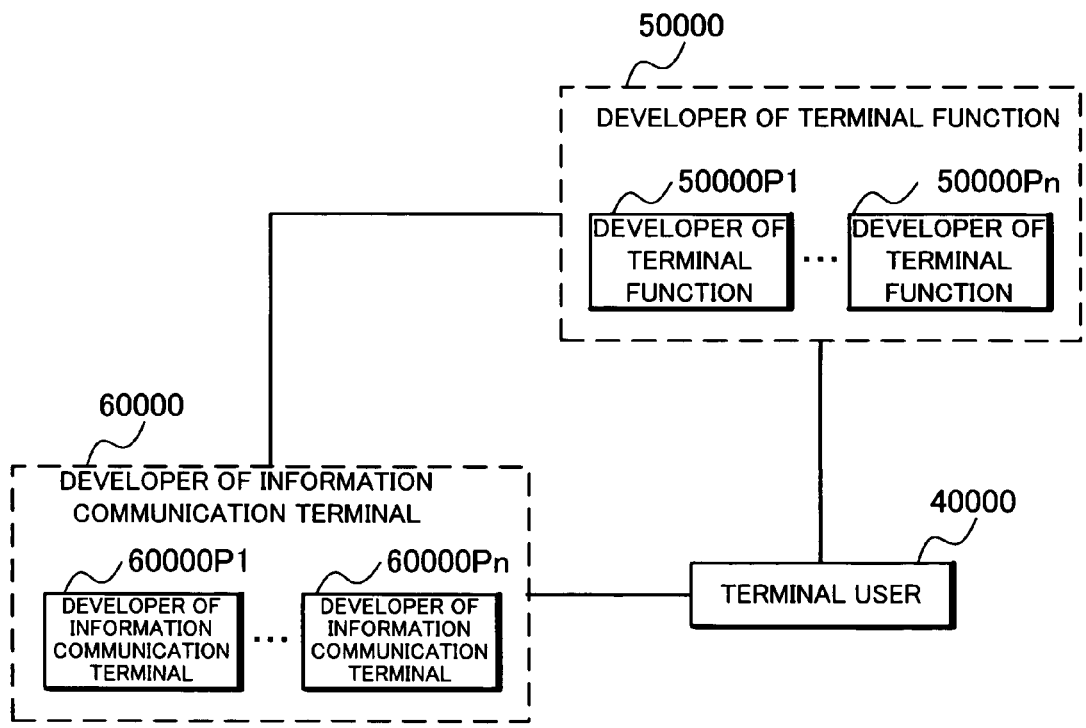
FIG. 42 is a diagram showing a structure of an information communication system according to a tenth exemplary embodiment of the present invention.

FIG. 42 is a diagram showing one example of a structure of an information communication system according to a tenth exemplary embodiment of the present invention. With reference to FIG. 42, the present exemplary embodiment comprises, in addition to the components of the information communication system shown in FIG. 40, a plurality of developers 60000 (developers 60000 P1~Pn) of the information communication terminal 30000.

The plurality of developers 60000 of the information communication terminal 30000 develop such information communication terminal 30000 as shown in FIG. 36 which internally has such information communication processing device 1 as shown in FIG. 1 and then provide the terminal user 40000 with the information communication terminal 30000. The developer 60000 Pk as one of the developers 60000 of the information communication terminal 30000, for example, may be a communication service provider or a non-communication service provider such as a conventional developer manufacturer of information communication terminals or a common information communication terminal developer.

In thus described structure, the developer 60000Pk as one of the developers 60000 of the information communication terminal 30000 may bind a terminal function provided by the terminal function developer 50000 with the information communication terminal 30000 in advance and provide the terminal user 40000 with the obtained terminal.

Furthermore, since the present exemplary embodiment enables new addition of a terminal function to the information communication terminal 30000 afterwards, the developer 60000 of the information communication terminal 30000 needs no development of a terminal function, so that dedication to the development of the information communication terminal 30000 having various colors and designs enables its development costs to be reduced.

Since the present exemplary embodiment enables a terminal function to be freely added afterwards, the terminal user 40000 is allowed to use an information communication terminal 30000 having his/her favorite color or design without depending on the information communication terminal 30000 having a specific color or design by purchasing the information communication terminal 30000 with the present invention incorporated in advance and incorporating a terminal function environment that the terminal user 40000 likes.

Figure 43:
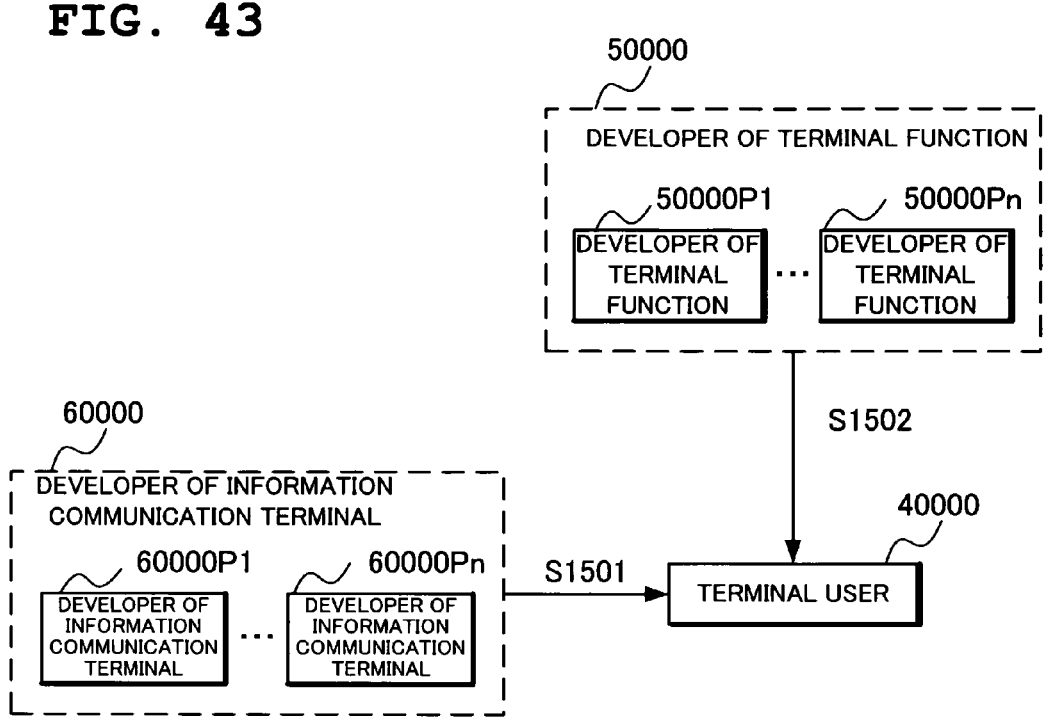
FIG. 43 is a diagram for use in explaining operation of the information communication system according to the tenth exemplary embodiment.

FIG. 43 is a diagram for use in explaining one example of operation of an information communication system according to the present exemplary embodiment shown in FIG. 42. In FIG. 43, a code formed of S and numerals beside an arrow represents a step number.

Step S1501: The developer 60000 of the information communication terminal 30000 provides the terminal user 40000 with the information communication terminal 30000.

Step S1502: The terminal user 40000, with the information communication terminal 30000 that the terminal user 40000 having received supply of a terminal function from the terminal function developer 50000 owns freely combined with the internal terminal function after receiving supply of the terminal function, switches and executes the terminal function.

Figure 44:
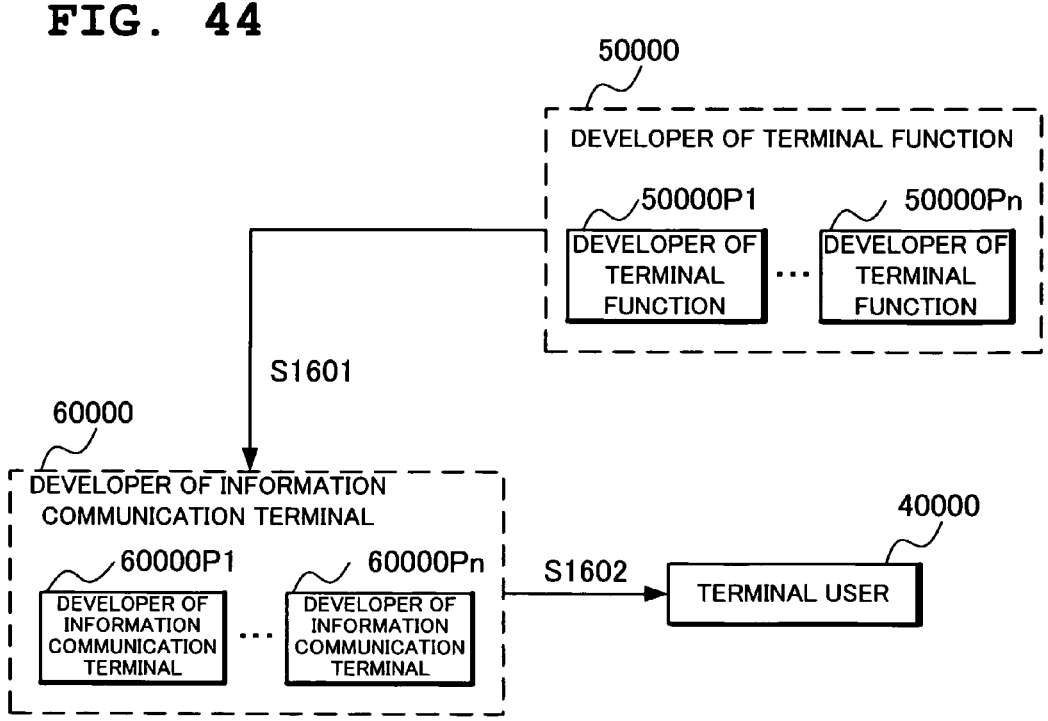
FIG. 44 is a diagram for use in explaining a modification example of operation of the information communication system according to the tenth exemplary embodiment.

FIG. 44 is a diagram for use in explaining one example of a modification of operation of the information communication system according to the present exemplary embodiment shown in FIG. 42. In FIG. 44, a code formed of S and numerals beside an arrow represents a step number.

Step S1601: The developer 60000 of the information communication terminal 30000 receives supply of a terminal function from the developer 50000 of the terminal functions.

Step S1602: The developer 60000 of the information communication terminal 30000 provides the terminal user 40000 with the information communication terminal 30000 having the terminal functions freely combined.

Figure 45:
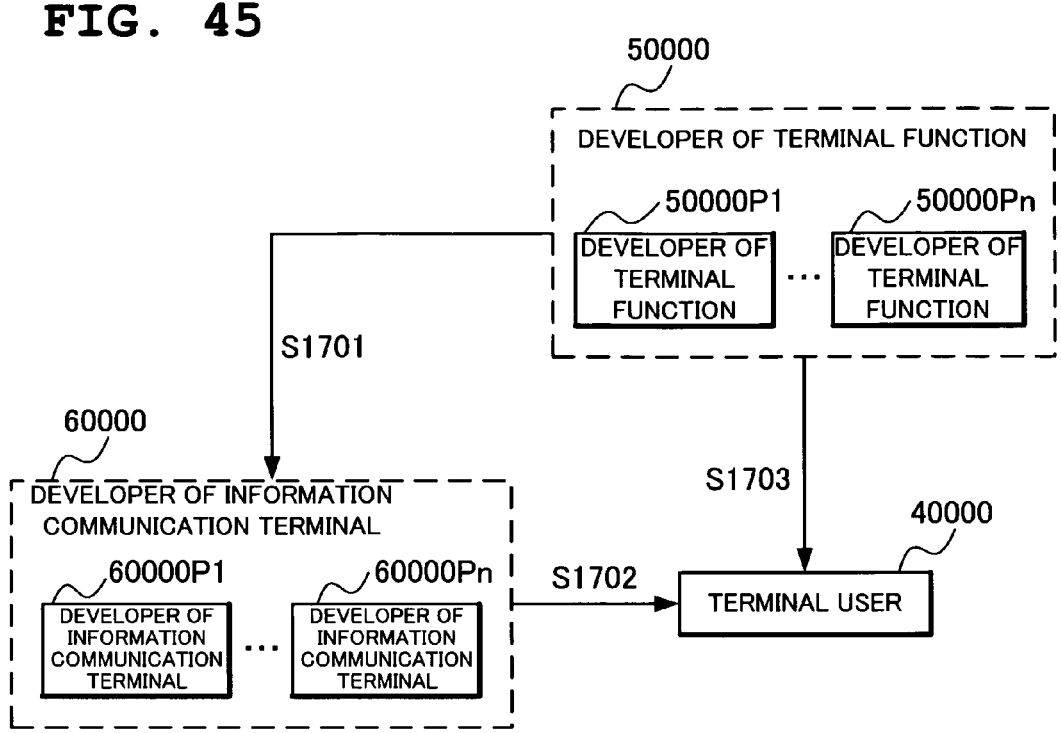
FIG. 45 is a diagram for use in explaining a modification example of operation of the information communication system according to the tenth exemplary embodiment.

FIG. 45 is a diagram for use in explaining one example of a modification of operation of the information communication system according to the present exemplary embodiment shown in FIG. 42. In FIG. 45, a code formed of S and numerals beside an arrow represents a step number.

Step S1701: The developer 60000 of the information communication terminal 30000 receives supply of a terminal function from the developer 50000 of the terminal functions.

Step S1702: The developer 60000 of the information communication terminal 30000 provides the terminal user 40000 with the information communication terminal 30000 having the terminal functions freely combined.

Step S1703: The information communication terminal 30000 that the terminal user 40000 having received further supply of a terminal function from the terminal function developer 50000 owns has its internal terminal function combined freely with the terminal function supplied to switch and execute the terminal function.

Eleventh Exemplary Embodiment

Figure 46:
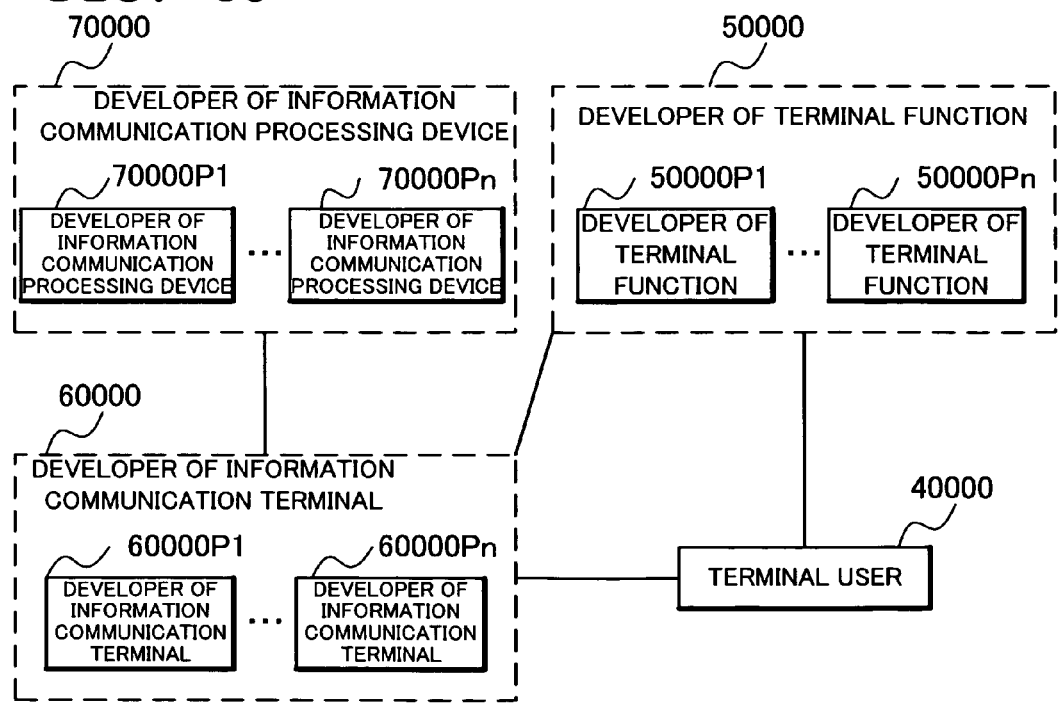
FIG. 46 is a diagram showing a structure of an information communication system according to an eleventh exemplary embodiment of the present invention.

FIG. 46 is a diagram showing one example of a structure of an information communication system according to an eleventh exemplary embodiment of the present invention. With reference to FIG. 46, the present exemplary embodiment comprises, in addition to the components of the information communication system shown in FIG. 42, a plurality of developers 70000 (developers 70000P1~Pn) of the information communication processing device 1.

The plurality of developers 70000 of the information communication processing device 1 develop such information communication processing device 1 as shown in FIG. 1 and then provide the developer 60000 of the information communication terminal 30000 with the information communication processing device 1. The developer 70000 Pk as one of the developers of the information communication processing device 1, for example, may be a communication service provider or a non-communication service provider such as a conventional developer manufacturer of information communication terminals or a common information communication processing device developer.

Since the present exemplary embodiment allows various combinations of terminal functions, the developer 70000 of the information communication processing device 1 enables its development costs to be reduced by dedicating to the development limited to some extent of the information communication processing device 1.

Figure 47:
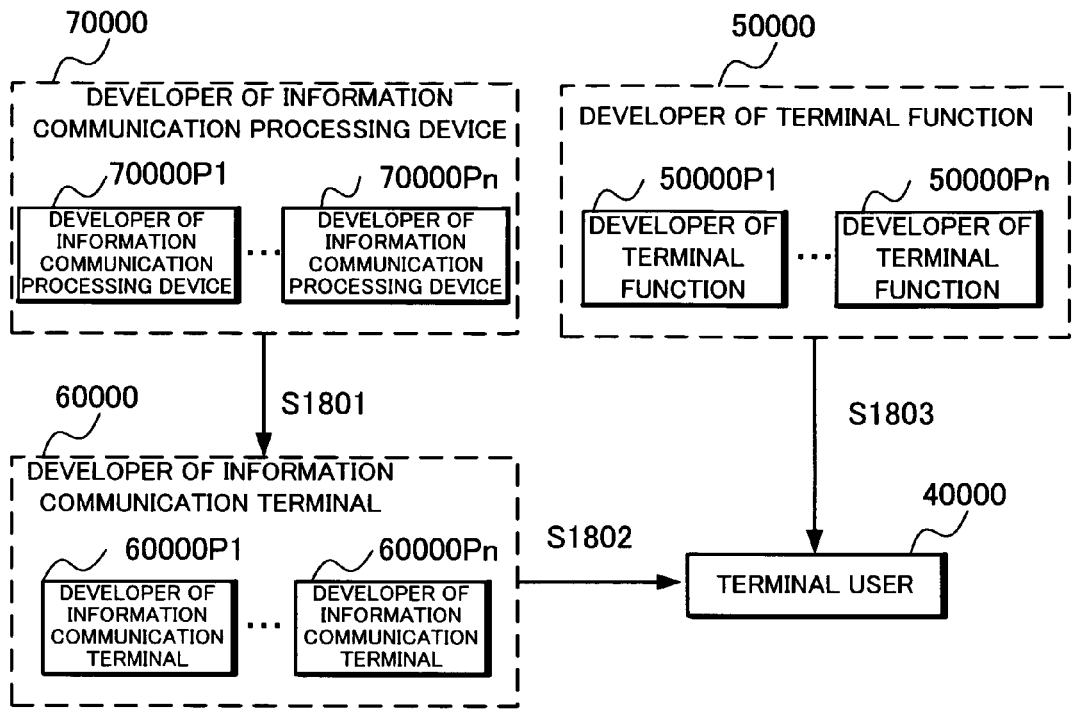
FIG. 47 is a diagram for use in explaining operation of the information communication system according to the eleventh exemplary embodiment.

FIG. 47 is a diagram for use in explaining one example of operation of the information communication system according to the present exemplary embodiment shown in FIG. 46. In FIG. 47, a code formed of S and numerals beside an arrow represents a step number.

Step S1801: The developer 70000 of the information communication processing device 1 provides the developer 60000 of the information communication terminal 30000 with the information communication processing device 1.

Step S1802: The developer 60000 of the information communication terminal provides the terminal user 40000 with the information communication terminal 30000.

Step S1803: The terminal user 40000 receives supply of a terminal function from the terminal function developer 50000 and freely combines it with the information communication terminal 30000 owned by the terminal user 40000 afterwards to switch and execute the function.

Figure 48:
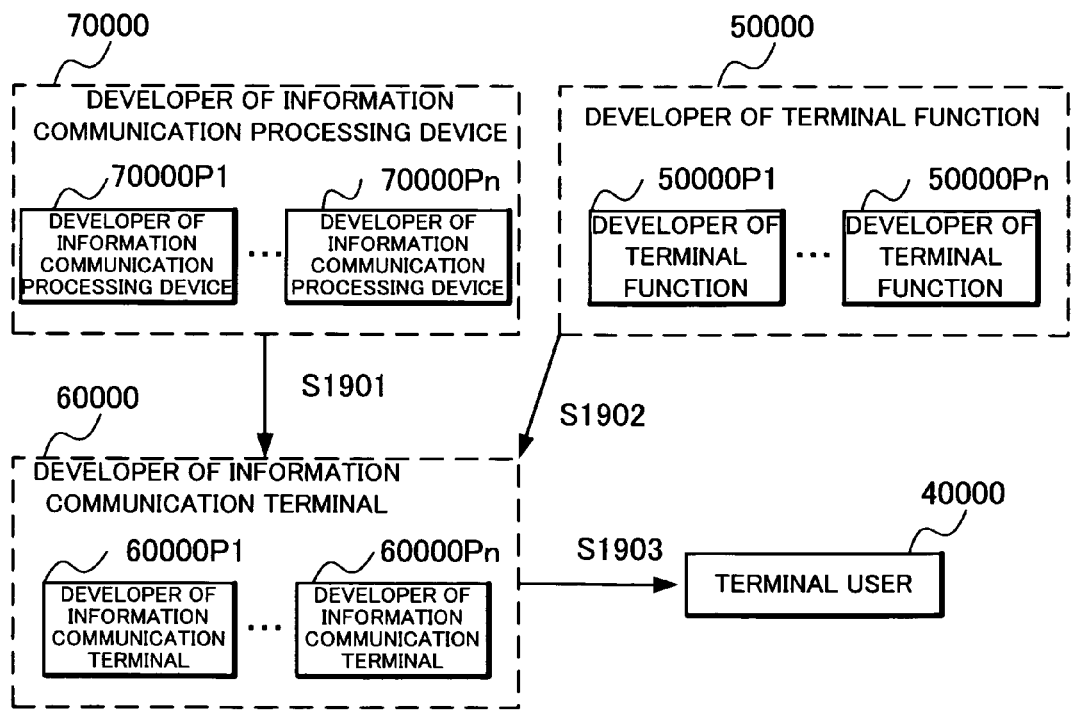
FIG. 48 is a diagram for use in explaining a modification example of operation of the information communication system according to the eleventh exemplary embodiment.

FIG. 48 is a diagram for use in explaining one example of a modification of operation of the information communication system according to the present exemplary embodiment shown in FIG. 46. In FIG. 48, a code formed of S and numerals beside an arrow represents a step number.

Step S1901: The developer 70000 of the information communication processing device 1 provides the developer 60000 of the information communication terminal 30000 with the information communication processing device 1.

Step S1902: The developer 60000 of the information communication terminal 30000 receives supply of terminal functions from the developer 50000 of the terminal function.

Step S1903: The developer 60000 of the information communication terminal 30000 freely combines the terminal functions to provide the terminal user 40000 with the obtained information communication terminal 30000.

Figure 49:
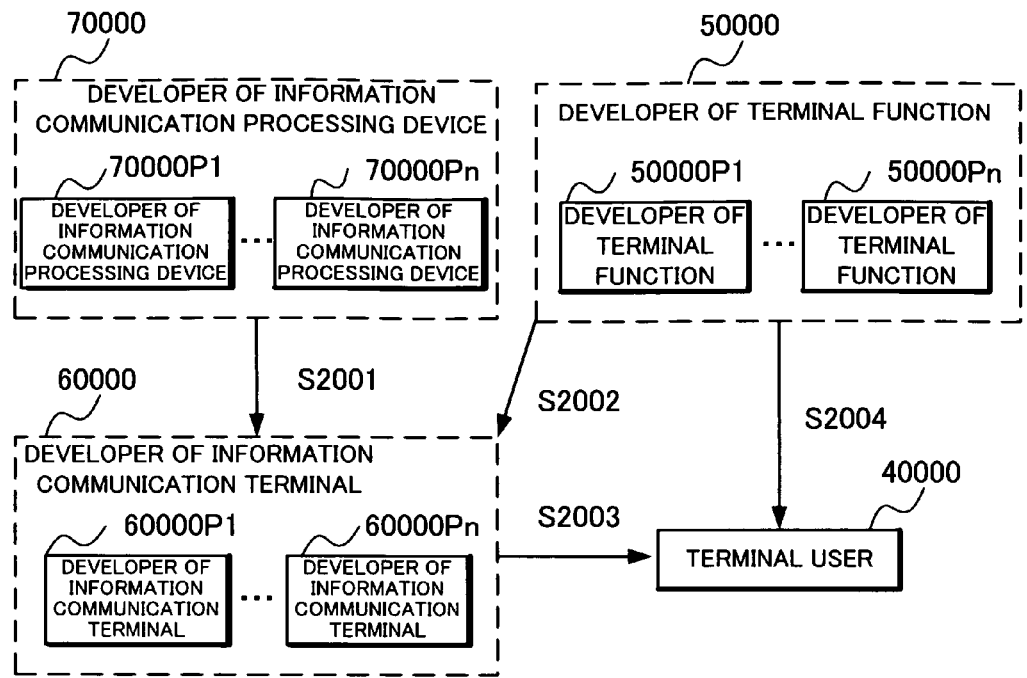
FIG. 49 is a diagram for use in explaining a modification example of operation of the information communication system according to the eleventh exemplary embodiment.

FIG. 49 is a diagram for use in explaining one example of a modification of operation of the information communication system according to the present exemplary embodiment shown in FIG. 46. In FIG. 49, a code formed of S and numerals beside an arrow represents a step number.

Step S2001: The developer 70000 of the information communication processing device 1 provides the developer 60000 of the information communication terminal 30000 with the information communication processing device 1.

Step S2002: The developer 60000 of the information communication terminal 30000 receives supply of terminal functions from the developer 50000 of the terminal functions.

Step S2003: The developer 60000 of the information communication terminal 30000 freely combines the terminal functions to provide the terminal user 40000 with the obtained information communication terminal 30000.

Step S2004: The terminal user 40000 receives further supply of the terminal functions from the terminal function developer 50000 and then freely combines them with the information communication terminal 30000 owned by the terminal user 40000 afterwards to switch and execute the functions.

Twelfth Exemplary Embodiment

Figure 50:
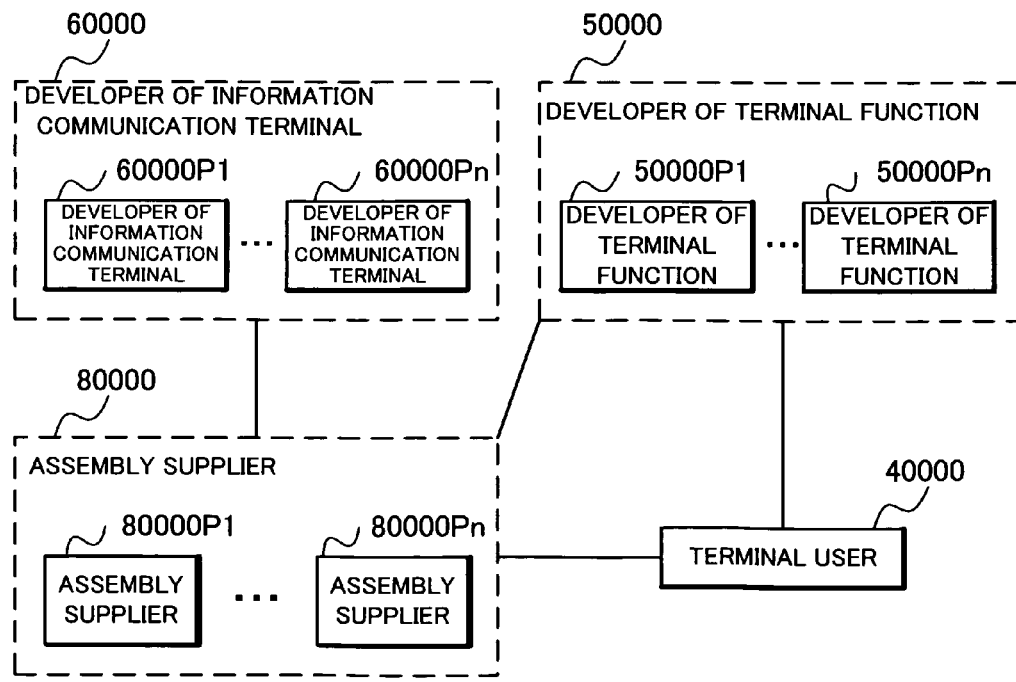
FIG. 50 is a diagram showing a structure of an information communication system according to a twelfth exemplary embodiment of the present invention.

FIG. 50 is a diagram showing one example of a structure of an information communication system according to a twelfth exemplary embodiment of the present invention. With reference to FIG. 50, the present exemplary embodiment comprises, in addition to the components shown in FIG. 42, a plurality of assembly suppliers 80000 (80000P1~Pn).

The plurality of assembly suppliers 80000 receive supply of such information communication terminal 30000 as shown in FIG. 36 which internally has such information communication processing device 1 as shown in FIG. 1 from the developer 60000 of the information communication terminal 30000 and supply of terminal functions from the terminal function developer 50000 and then provide the terminal user 40000 with the information communication terminal 30000 combining them. 80000 Pk as one of the assembly suppliers, for example, may be a communication service provider or a non-communication service provider such as a conventional developer manufacturer of information communication terminals or a common information communication terminal developer.

Further according to the present exemplary embodiment, since linkage of the above-described three components enables free combination of various kinds of terminal functions, by executing terminal function combining processing in place of the developer 50000 of the information communication terminal 30000 or the terminal user 40000, the assembly supplier 80000 which combines the information communication terminal 30000 and the terminal functions is allowed to propose reduction in loads on the combining processing.

Figure 51:
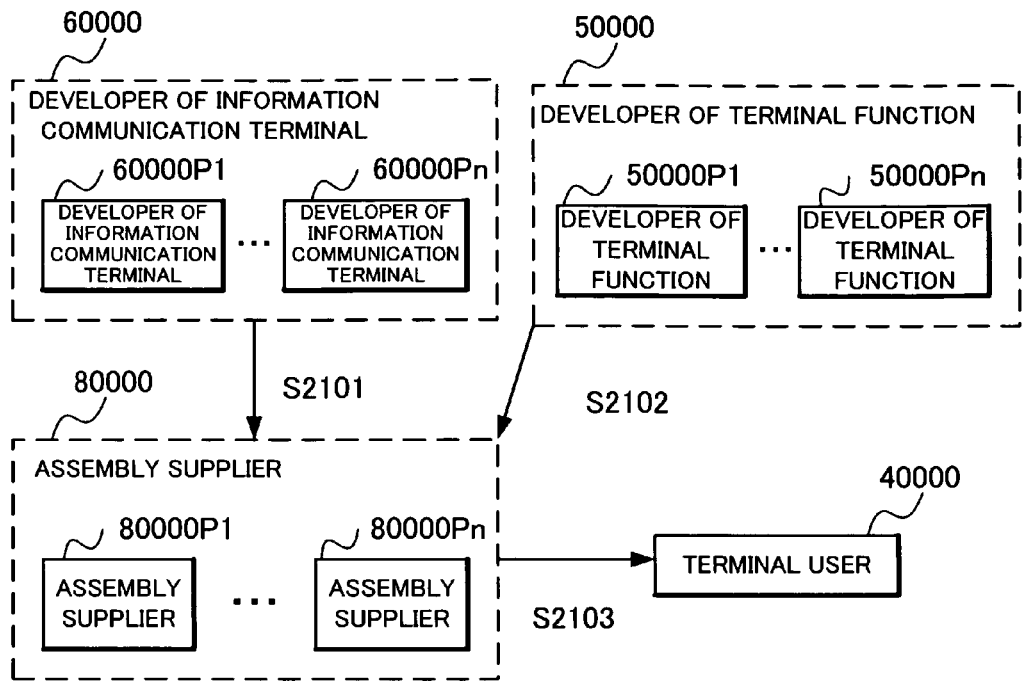
FIG. 51 is a diagram for use in explaining operation of the information communication system according to the twelfth exemplary embodiment.

FIG. 51 is a diagram for use in explaining one example of operation of the information communication system according to the present exemplary embodiment shown in FIG. 50. In FIG. 51, a code formed of S and numerals beside an arrow represents a step number.

Step S2101: The developer 60000 of the information communication terminal 30000 provides the assembly supplier 80000 with the information communication terminal 30000.

Step S2102: The assembly supplier 80000 receives supply of terminal functions from the terminal function developer 50000.

Step S2103: The assembly supplier 80000 freely combines the terminal functions to provide the terminal user 40000 with the obtained information communication terminal 30000.

Figure 52:
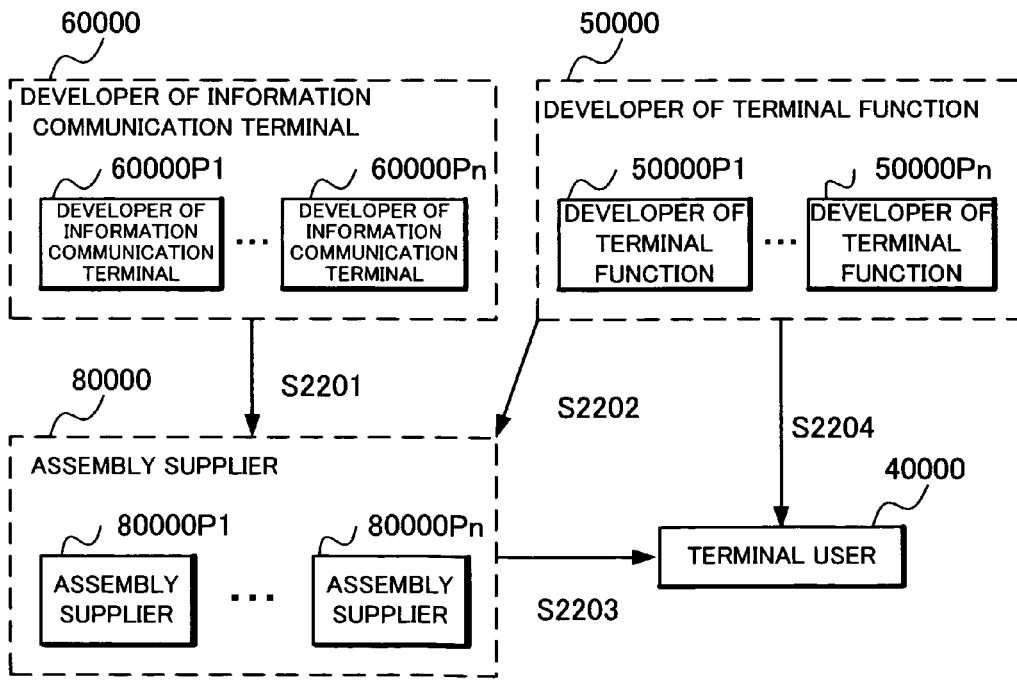
FIG. 52 is a diagram for use in explaining a modification example of operation of the information communication system according to the twelfth exemplary embodiment.

FIG. 52 is a diagram for use in explaining one example of a modification of operation of the information communication system according to the present exemplary embodiment shown in FIG. 50. In FIG. 52, a code formed of S and numerals beside an arrow represents a step number.

Step S2101: The developer 60000 of the information communication terminal provides the assembly supplier 80000 with the information communication terminal 30000.

Step S2102: The assembly supplier 80000 receives supply of terminal functions from the developer 50000 of the terminal functions.

Step S2103: The assembly supplier 80000 freely combines the terminal functions to provide the terminal user 40000 with the obtained information communication terminal 30000.

Step S2104: The terminal user 40000 receives further supply of the terminal functions from the terminal function developer 50000 and then freely combines them with the information communication terminal 30000 owned by the terminal user 40000 afterwards to switch and execute the functions.

Thirteenth Exemplary Embodiment

Figure 53:
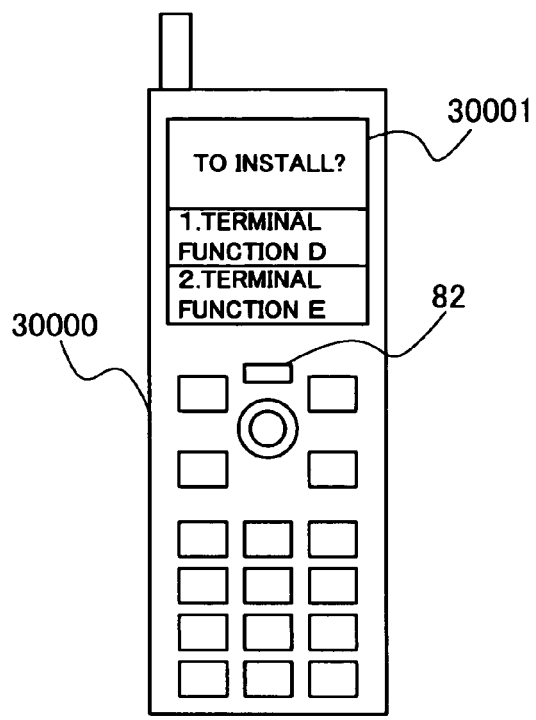
FIG. 53 is a diagram showing arrangement of selection of terminal functions by a user in an information communication system according to a thirteenth exemplary embodiment of the present invention.

FIG. 53 is a diagrams showing one example of an arrangement for terminal function selection by a user in an information communication system according to a thirteenth exemplary embodiment of the present invention. With reference to FIG. 53, the present exemplary embodiment internally has the structure of the information communication processing device 1 shown in FIG. 1 and comprises the information communication terminal 30000 having the special key 82 such as a jog dial.

When the special key 82 is pressed, a selection screen is output on the image display device 30001 by the switching control unit 3000. Rotation and pressing of a key that a common information communication terminal has or a special key such as a jog dial allows the terminal user 40000 to select and determine terminal functions to be combined. This enables the terminal user 40000 to realize selection of terminal functions that the user wants to combine. Display on the image display device 30001 may be executed not by the switching control unit 3000 but by the information processing device 300.

According to the present exemplary embodiment, the special key 82 may have any structure that allows software to be started which enables the terminal user 40000 to select and determine a terminal function.

In thus described structure, the terminal function may be downloaded from a communication path such as a network or a recording medium such as a media card.

Fourteenth Exemplary Embodiment

Figure 54:
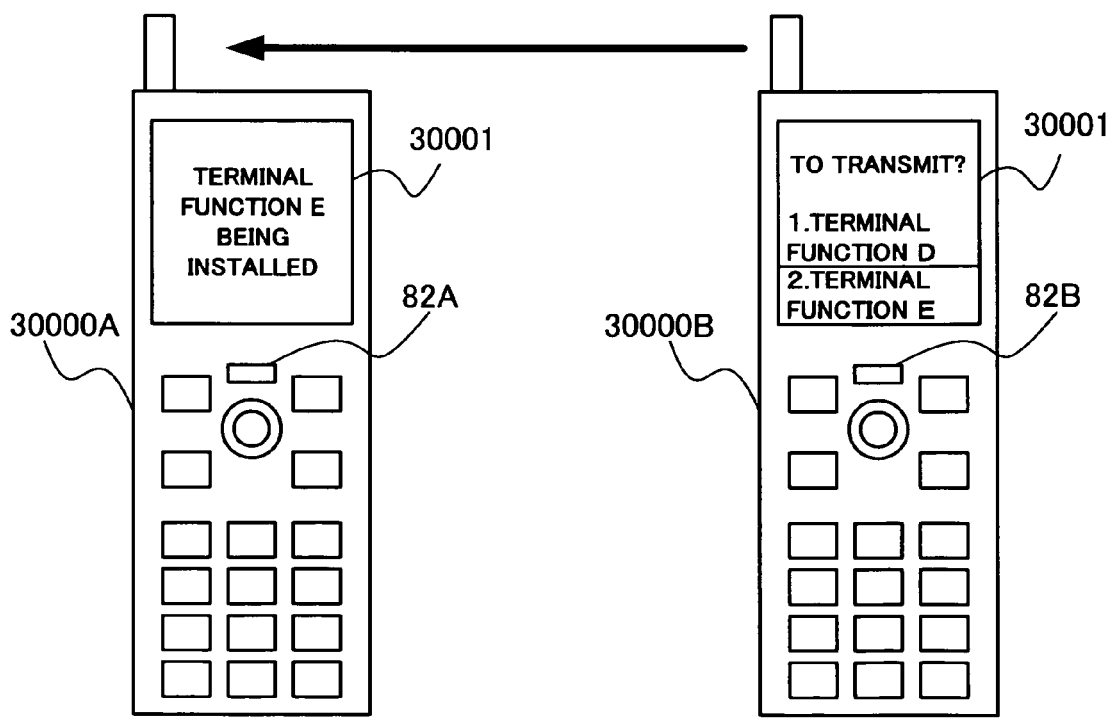
FIG. 54 is a diagram showing arrangement of selection of terminal functions by a user in an information communication system according to a fourteenth exemplary embodiment of the present invention.

FIG. 54 is a diagram showing one example of an arrangement for terminal function selection by a user in an information communication system according to a fourteenth exemplary embodiment of the present invention. With reference to FIG. 54, the present exemplary embodiment comprises an information communication terminal 30000A which internally has the structure of the information communication processing device 1 shown in FIG. 1 and has a special key 82A such as a jog dial, and an information communication terminal 30000B which internally has the structure of the information communication processing device 1 shown in FIG. 1 and has a special key 82B such as a jog dial.

When the special key 82A is pressed, a selection screen is output on the image display device 30001 by the switching control unit 3000. Rotation and pressing of a key that a common information communication terminal has or a special key such as a jog dial enables the terminal user 40000 of the information communication terminal 30000A to receive terminal functions to be combined with the information communication terminal 30000A.

When the special key 82B is pressed, a selection screen is output on the image display device by the switching control unit 3000. Rotation and pressing of a key that a common information communication terminal has or a special key such as a jog dial allows the terminal user 40000 of the information communication terminal 30000B to select and determine a terminal function to be transmitted to the information communication terminal 30000A among the terminal functions owned by the information communication terminal 30000B.

This enables the terminal user 40000 of the information communication terminal 30000A to freely combine terminal functions that the information communication terminal 30000B owns.

In thus described structure, display on the image display device 30001 may be executed not by the switching control unit 3000 but by the information processing device 300.

According to the present exemplary embodiment, the special key 82 may have any structure that allows software to be started which enables a terminal user to select and determine a terminal function.

In thus described structure, communication between the information communication terminals 30000A and 30000B may be realized through a communication path such as a wireless or cable network or a recording medium such as a media card.

Fifteenth Exemplary Embodiment

Figure 55:
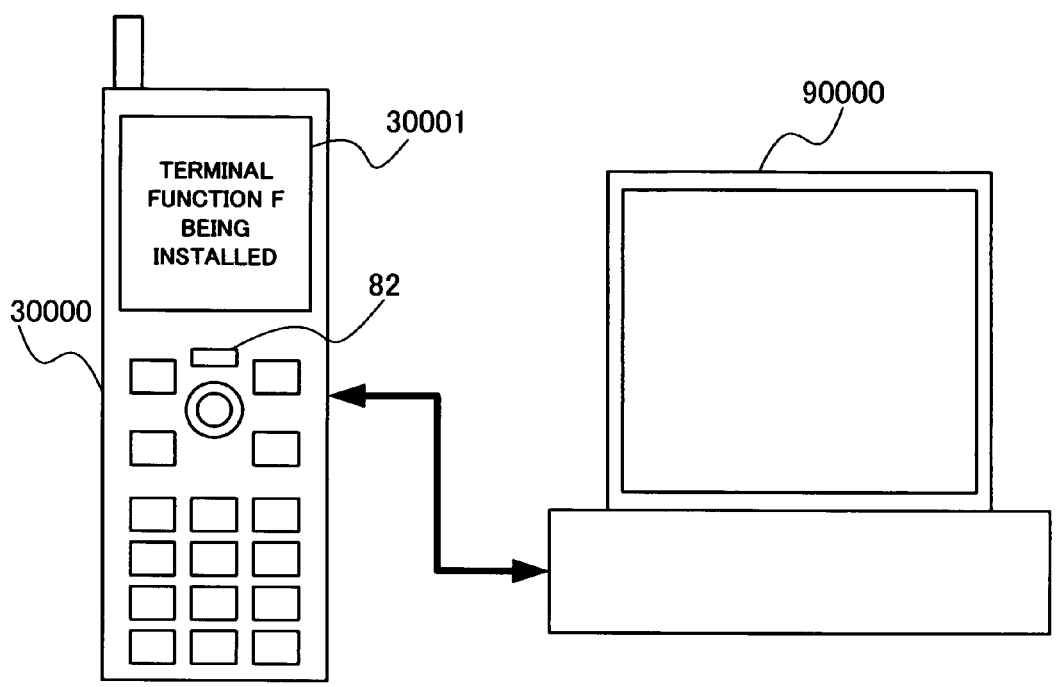
FIG. 55 is a diagram showing arrangement of selection of terminal functions by a user in an information communication system according to a fifteenth exemplary embodiment of the present invention.

FIG. 55 is a diagram showing one example of an arrangement for terminal function selection by a user in an information communication system according to a fifteenth exemplary embodiment of the present invention. With reference to FIG. 55, the present exemplary embodiment comprises the information communication terminal 30000 which internally has the structure of the information communication processing device 1 shown in FIG. 1 and has the special key 82 such as a jog dial, and an information apparatus 90000.

The information apparatus 90000 has a function of transmitting a terminal function to the information communication terminal 30000. It may be an apparatus related to information processing such as PC (Personal Computer) or a PDA (Personal Digital Assistants) or a dedicated apparatus. The information apparatus 90000 also may be a server internally holding a plurality of terminal functions or be downloaded from an external unit such as a server through a communication device such as a network.

When the special key 82 is pressed, a selection screen is output on the image display device 30001 by the switching control unit 3000. Rotation and pressing of a key that a common information communication terminal has or a special key such as a jog dial allows the terminal user 40000 of the information communication terminal 30000 to receive terminal functions to be combined with the information communication terminal 30000 from the information apparatus 90000.

This enables the terminal user 40000 of the information communication terminal 30000 to freely combine terminal functions through the information apparatus 90000.

In thus described structure, display on the image display device 30001 may be executed not by the switching control unit 3000 but by the information processing device 300.

According to the present exemplary embodiment, the special key 82 may have any structure that allows software to be started which enables the terminal user 40000 to select and determine a terminal function.

Also in thus described structure, communication between the information communication terminal 30000 and the information apparatus 90000 may be realized through a communication path such as a wireless or cable network or a recording medium such as a media card.

Sixteenth Exemplary Embodiment

Figure 56:
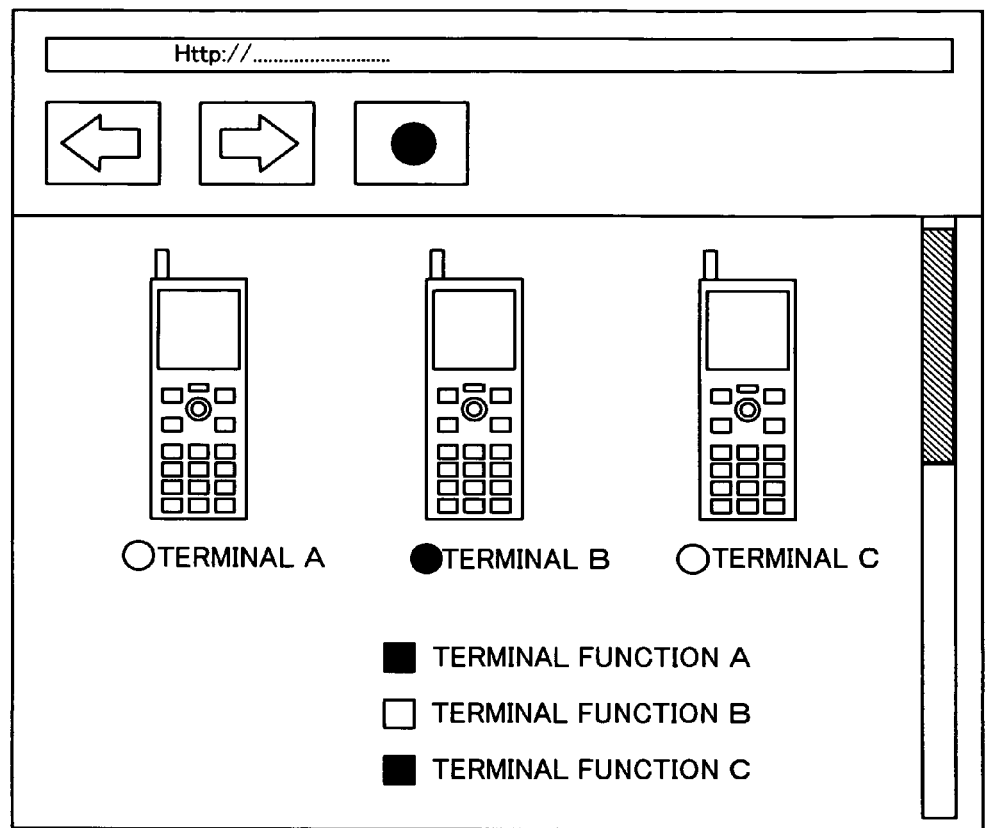
FIG. 56 is a diagram showing arrangement of selection of terminal functions by a user in an information communication system according to a sixteenth exemplary embodiment of the present invention.
Figure 57:
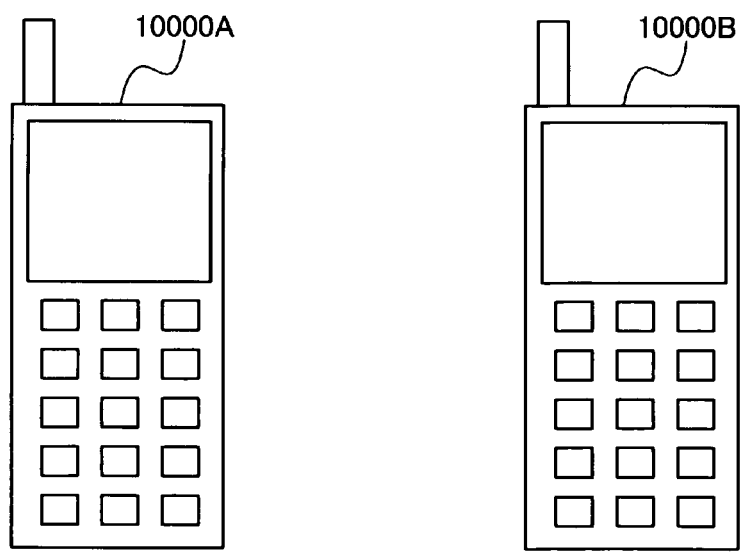
FIG. 57 is a diagram showing one example of a system structure according to related art.
Figure 58:
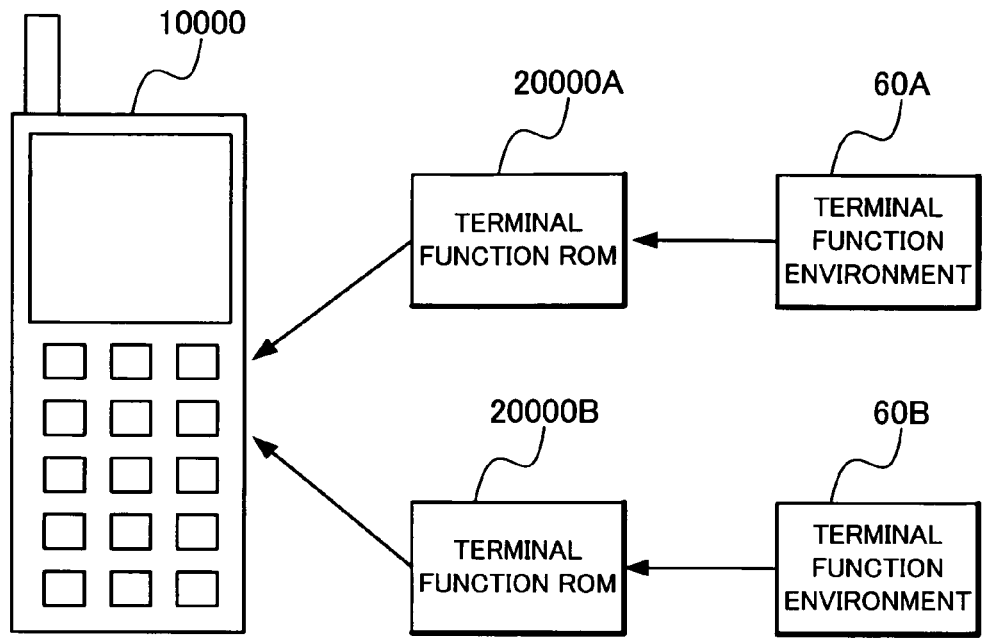
FIG. 58 is a diagram showing one example of a system structure according to related art.
Figure 59:
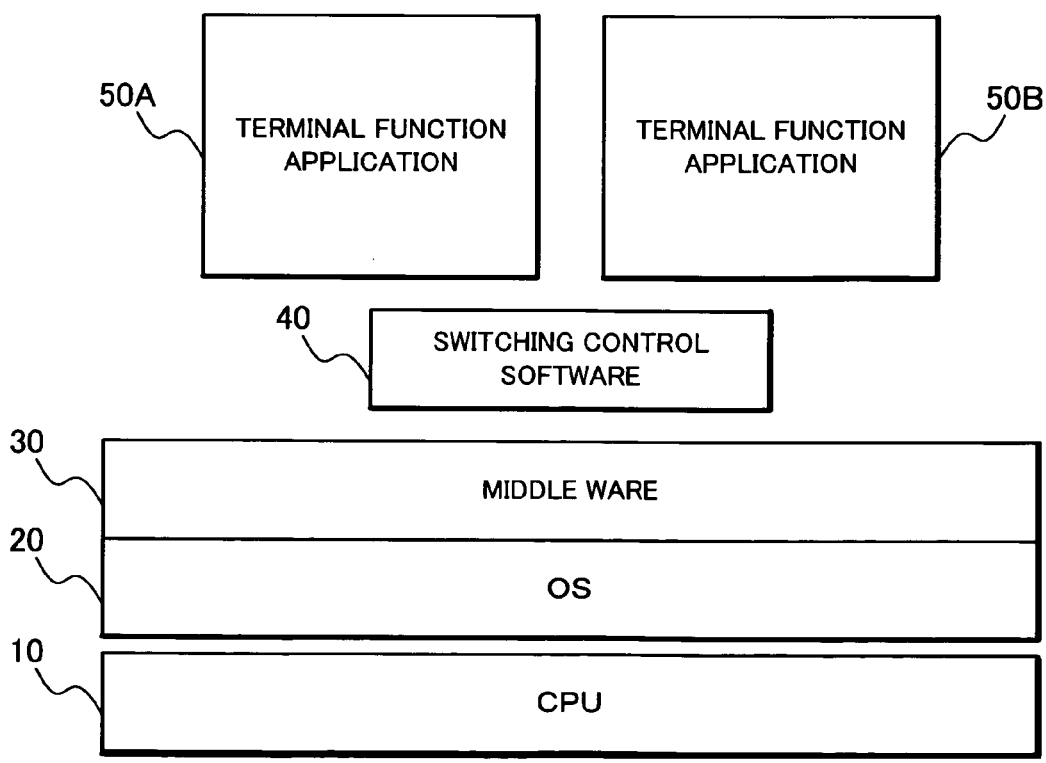
FIG. 59 is a diagram showing one example of a system structure according to related art.

FIG. 56 is a diagram showing one example of an arrangement for terminal function selection by the terminal user 40000 in an information communication system according to a sixteenth exemplary embodiment of the present invention. With reference to FIG. 56, the information communication system according to the present exemplary embodiment comprises a communication software 100000 having a function of notifying information to the assembly supplier 80000 which combines terminal functions in place of the terminal user 40000.

The communication software 100000 causes the terminal user 40000 to notify the assembly supplier 80000 of selection information of the information communication terminal 30000 which the user wants and information of a terminal function to be combined. In other words, the communication software 100000 may be software such as a browser having selection and browsing functions or may be software for sharing information.

The assembly supplier 80000 is allowed to supply the terminal user 40000 with a favorite information communication terminal 30000 having terminal functions meeting the user's desire combined according to an instruction from the communication software 10000.

The present embodiment enables the structure of the information communication system shown in FIG. 46 to be applied to the developer 60000 of the information communication terminal 30000 which combines terminal functions.

According to the present exemplary embodiment, as the communication software 100000, such a notification means as a telephone set or a facsimile can be used as long as it provides a function of notifying the assembly supplier 80000.

Since the information communication processing device according to the present invention, in which no application sharing OS or middle ware is switched, has a switching control unit for switching a terminal function environment including an application, OS and middle ware, it is not limited by an OS on which an application to be incorporated is already mounted or the like. Furthermore, since the switching control unit has a switching determination unit and a context control unit, execution of an application being executed can be realized in response to an external communication request without any problem and switching to an application necessary for communication contents can be realized at a high speed.

Furthermore, the information communication processing device according to the present invention comprises a communication unit which copes with each content of external communication and accepts each communication content independently. Thus, since the present invention comprises a communication unit corresponding to each communication content for a function environment, a plurality of communication contents can be accepted simultaneously regardless of whether they are of the same kind or of different kinds.

Independent acceptance represents, for example, that individual communication contents from outside fail to affect with each other and that requests related to a plurality of communication contents can be accepted simultaneously. In addition, communication contents can be recognized regardless of whether they are of the same kind such as telephone outgoing and incoming calls, and mail and mail transmission/reception, or of different kinds.

The above-described respective exemplary embodiments have been described with respect to the information communication processing device, the information communication terminal and the information communication system capable of switching and executing a plurality of terminal functions as an example, the above respective exemplary embodiments are not limited to such information communication processing device, information communication terminal and information communication system but applicable to arbitrary information communication processing device, information communication terminal and information communication system.

Although the present invention has been described in the foregoing with reference to the exemplary embodiments, the present invention is not limited to the structures and operation of the above-described exemplary embodiments. The structures and details of the present invention allow various modifications that those skilled in the art can understand within the scope of the present invention.

INCORPORATION BY REFERENCE

The present patent application claims priority based on Japanese Patent Application No. 2006-195192 filed on Jul. 18, 2006 and incorporates all its disclosure.

The invention claimed is:

1. An information communication processing device, comprising:
    at least one information processing device having a plurality of function environments each of which includes functions, operating system and middle ware;
    a switching control unit for switching said function environment;
    a communication unit which corresponds to each content of communication with the outside to independently receive each said communication content, and to correlate each said communication content received and each said function environment;
    a communication interpretation unit for interpreting said communication content received by said communication unit to notify said switching control unit of the content; and
    a resource separation unit which refers to the information of the function environment being currently executed from said switching control unit, and prevents said function environment being currently executed from accessing resources allocated for other function environments on a shared memory such that different function environments may not access a same memory region in the shared resource; where
    said switching control unit
    determines a function environment to be switched based on contents of communication with the outside, and
    sets context of said function environment to be switched at context of a function environment being executed to execute switching to said function environment to be switched,
    wherein said switching control unit comprising:
        a switching determination unit for determining a function environment to be switched based on contents of communication with the outside of said information communication processing device; and
        a context control unit for preserving context of a function environment being executed upon reception of a notification from said switching determination unit to set context of said function environment to be switched,
    wherein said switching control unit is configured to execute switching of said function environment so that a telephone call may be accepted at a time of switching of said function environment.

2. The information communication processing device according to claim 1, wherein said switching control unit executes switching to said function environment to be switched after said context control unit sets context of a function environment.

3. The information communication processing device according to claim 1, wherein said resource separation unit comprising:
    an address conversion unit for converting an address to said shared resource; and
    an access control unit for determining whether access by said address converted is allowed or not.

4. The information communication processing device according to claim 3, wherein said address conversion unit comprises an address calculation unit for calculating an address according to address conversion data corresponding to data for executing a function environment.

5. The information communication processing device according to claim 4, wherein said address conversion unit comprises a conversion data updating unit for automatically updating said address conversion data.

6. The information communication processing device according to claim 4, wherein said address calculation unit is an adder for an address offset or MMU (Memory Management Unit).

7. The information communication processing device according to claim 3, wherein said access control unit comprises an access allowance unit for determining whether access by said address converted is allowed or not based on access allowance data indicative of a range of accessibility to data related to said function environment.

8. The information communication processing device according to claim 7, wherein said access allowance unit comprises an allowance data updating unit for automatically updating said access allowance data.

9. The information communication processing device according to claim 7, wherein a unit for storing said access allowance data stores, for each said function environment, a range of addresses by which access is allowed and information related to allowance/non-allowance for each kind of access in said range of addresses.

10. The information communication processing device according to claim 1, wherein said communication interpretation unit comprises a communication connection unit for connecting said information processing device and said communication unit according to said communication contents based on a notification from said switching control unit.

11. The information communication processing device according to claim 1, wherein said switching control unit switches a function to be realized by said function environment upon receiving a notification from an input unit to which a user's instruction is applied or from said communication interpretation unit.

12. The information communication processing device according to claim 1, wherein said switching control unit switches said function according to communication contents of the same kind or different kinds from said communication interpretation unit.

13. The information communication processing device according to claim 1, wherein said switching control unit comprising:
    switching control data necessary for switching related to said function; and
    a switching notification unit for notifying said resource separation unit and said communication interpretation unit of switching.

14. The information communication processing device according to claim 13, wherein a unit for storing said switching control data comprises information for identifying a current function environment, information related to a switchable function environment, set data to said communication interpretation unit, set data to said resource separation unit and context of said information processing device.

15. The information communication processing device according to claim 14, wherein said switching determination unit is configured to determine said function to be switched next based on a notification from said input unit or from said communication interpretation unit according to a function switching policy and notifying said switching notification unit of said information related to said function environment to be switched next.

16. The information communication processing device according to claim 15, wherein said switching notification unit comprising:
    a switching notification control unit which cooperates with said context control unit; and
    a switching notification setting unit for setting data necessary for switching at said resource separation unit and said communication interpretation unit according to a notification from said switching determination unit.

17. The information communication processing device according to claim 16, wherein said switching notification control unit starts operation based on a request from said context control unit and notifies said context control unit of completion of operation of said switching notification setting unit.

18. The information communication processing device according to claim 7, wherein said address conversion unit corn rises an address calculation unit for calculating an address according to address conversion data corresponding to data for executing a function environment,
    wherein said switching notification setting unit notifies said resource separation unit of said address conversion data and said access allowance data and notifying said communication interpretation unit of said communication unit connected.

19. The information communication processing device according to claim 13, wherein said context control unit comprising:
    a context control linkage unit which cooperates with said switching notification unit upon receiving a notification from said switching determination unit; and
    a context extraction and setting unit for extracting and setting context of said information processing device.

20. The information communication processing device according to claim 19, wherein said context control linkage unit stops said information processing device based on a notification from said switching determination unit to notify said switching notification unit of the stop and notify said context extraction and setting unit of completion of operation of said switching notification unit.

21. The information communication processing device according to claim 19, wherein said context extraction and setting unit extracts context of said information processing device to preserve the context in a context preservation unit and reads context of said function to be executed next from said context preservation unit based on a notification from said context control linkage unit to set the context at said information processing device.

22. The information communication processing device according to claim 13, comprising a plurality of information processing devices, wherein said context control unit includes
    a context control linkage unit which cooperates with said switching notification unit upon receiving a notification from said switching determination unit and stops and resumes said information processing device.

23. The information communication processing device according to claim 1, which spontaneously switches a function environment in response to an instruction input by a terminal user.

24. The information communication processing device according to claim 1, which switches a function environment in response to a notification from said communication unit.

25. The information communication processing device according to claim 1, which newly adds or installs a function environment.

26. The information communication processing device according to claim 1, which deletes or uninstalls a function environment.

27. The information communication processing device according to claim 1, which switches a function environment to be executed according to a remaining amount of power supply.

28. The information communication processing device according to claim 1, comprising said input unit which can be dynamically and logically restructured, wherein at the time of switching to said function environment, said input unit is switched to one corresponding to said function environment.

29. The information communication processing device according to claim 28, wherein said input unit is dynamically and logically restructured by software processing.

30. The information communication processing device according to claim 1, wherein said function environment can be added or deleted.

31. An information communication terminal comprising said information communication processing device according to claim 1.

32. The information communication terminal according to claim 31, comprising an input unit to which a user's instruction is applied, wherein said input unit includes a key for designating said function to be switched next.

33. The information communication terminal according to claim 31, comprising a key, wherein said function to be switched next is designated by using said key through the input unit to which a user's instruction is applied.

34. The information communication terminal according to claim 31, comprising a key for blocking switching of said function.

35. The information communication terminal according to claim 31, comprising a key, wherein switching of said function is blocked by using said key through the input unit to which a user's instruction is applied.

36. An information communication system, wherein the information communication terminal according to claim 31 is prepared to/from which said function environment is added to or deleted from said information communication terminal.

37. The information communication system according to claim 36, wherein by using said function operating at said information communication terminal, said function environment is added to said information communication terminal.

38. The information communication system according to claim 36, wherein said function is combined through said information communication terminal.

39. The information communication system according to claim 36, wherein said functions are combined by a plurality of said information communication terminals.

40. The information communication system according to claim 36, wherein said functions of said information communication terminal are combined through an externally connected information apparatus.

41. The information communication system according to claim 36, wherein said functions of said information communication terminal are combined based on a notification using communication software.

42. A function switching method executed on an information communication processing device which comprises at least one information processing device having a plurality of function environments each of which includes functions, operating system and middle ware, including:
 a switching control step of switching said function environment;
 a communication step corresponding to each content of communication with the outside, of independently receiving each said communication content and correlating each said communication content received and each said function environment;
 a communication interpretation step of interpreting said communication content received by said communication step to notify said switching control step of the content; and
 a resource separation step of referring to the information of the function environment being currently executed in said switching control step, and preventing said function environment being currently executed from accessing resources allocated for other function environments on a shared memory such that different function environments may not access a same memory region in the shared resource;
 wherein said switching control step comprises:
 determining a function environment to be switched based on contents of communication with the outside, and
 setting context of said function environment to be switched at context of a function environment being executed to execute switching to said function environment to be switched,
 at said switching control unit,
 a switching determination step of determining a function environment to be switched, based on contents of communication with the outside of said information communication processing device, and
 a context control step of preserving context of a function environment being executed upon reception of a notification at said switching determination step to set context of said function environment to be switched,
 wherein said switching control unit executes switching of said function environment so that a telephone call may be accepted at a time of switching of said function environment.

43. The function switching method according to claim 42, wherein at said switching control unit, after said context control unit sets context of a function environment, switching to said function environment to be switched is executed.

44. The function switching method according to claim 2, wherein said resource separation step includes:
 an address conversion step of converting an address to said shared resource, and
 an access control step of determining whether access by said address converted is allowed or not.

45. The function switching method according to claim 44, wherein said access control step includes an access allowance step of determining whether access by said address converted is allowed or not based on access allowance data indicative of a range of accessibility to data related to said function environment.

46. The function switching method according to claim 42, wherein at said switching control step, a function to be realized by said function environment is switched upon reception of a notification of a user's instruction or a notification from said communication interpretation step.

47. The function switching method according to claim 46, wherein at said switching determination step, said function to be switched next is determined upon reception of a notification of a user's instruction or a notification from said communication interpretation step according to a switching policy of said function.

48. The function switching method according to claim 42, wherein function environment switching is executed in response to a notification from said communication step.

49. A non-transitory computer readable medium storing a function switching program executed on an information communication processing device which comprises at least one information processing device having a plurality of function environments each of which includes functions, operating system and middle ware, wherein said function switching program causes said information communication processing device to execute:
 a switching control function of switching said function environment to be executed on said information processing device;
 a communication function corresponding to each content of communication with the outside, of independently receiving each said communication content and correlating each said communication content received and each said function environment;
 a communication interpretation function of interpreting said communication content received by said communication function to notify said switching control step of the content; and a resource separation function of referring to the information of the function environment being currently executed from said switching control function, and preventing said function environment being currently executed from accessing resources allocated for other function environments on a shared memory such that different function environments may not access a same memory region in the shared resource;

wherein said switching control function comprises:
    determining a function environment to be switched based on contents of communication with the outside of said information communication processing device, and
    setting context of said function environment to be switched at context of a function environment being executed to execute switching to said function environment to be switched, wherein said switching control function includes
    a switching determination function of determining a function environment to be switched based on contents of communication with the outside of said information communication processing device, and
    a context control function of preserving context of a function environment being executed upon reception of a notification in said switching determination function to set context of said function environment to be switched, wherein said switching control function executes switching of said function environment so that a telephone call may be accepted at a time of switching of said function environment.

50. The non-transitory computer readable medium according to claim 49, wherein in said switching control function, after context of said function environment is set in said context control function, switching to said function environment to be switched is executed.

51. The non-transitory computer readable medium according to claim 49, wherein said resource separation function includes an address conversion function of converting an address to said shared resource, and an access control function of determining whether access by said address converted is allowed or not.

52. The non-transitory computer readable medium according to claim 51, wherein said access control function includes an access allowance function of determining whether access by said address converted is allowed or not based on access allowance data indicative of a range of accessibility to data related to said function environment.

53. The non-transitory computer readable medium according to claim 49, wherein at said switching control step, a function to be realized by said function environment is switched upon receiving a notification of a user's instruction or a notification from said communication interpretation function.

54. The non-transitory computer readable medium according to claim 49, wherein in said switching determination function, said function to be switched next is determined upon reception of a notification of an instruction of said user or a notification from said communication interpretation function according to a switching policy of said function.

55. The non-transitory computer readable medium according to claim 49, wherein a function environment is switched in response to a notification from said communication function.

56. The information communication processing device according to claim 1, wherein said access control unit comprises a switching instruction input unit which inputs spontaneous switching instruction of a function environment from a terminal user.

57. The information communication processing device according to claim 1, wherein said access control unit comprises an input unit which inputs switching instruction of a function environment according to a predetermined condition.

\* \* \* \* \*

UNITED STATES PATENT AND TRADEMARK OFFICE
CERTIFICATE OF CORRECTION

PATENT NO. : 8,718,629 B2
APPLICATION NO. : 12/309423
DATED : May 6, 2014
INVENTOR(S) : Inoue et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 759 days.

Signed and Sealed this

Twenty-ninth Day of September, 2015

Michelle K. Lee
*Director of the United States Patent and Trademark Office*